United States Patent
Ryan et al.

(10) Patent No.: US 9,991,956 B2
(45) Date of Patent: Jun. 5, 2018

(54) SYSTEM AND METHOD FOR COMMUNICATION WITH A MOBILE DEVICE VIA A POSITIONING SYSTEM INCLUDING RF COMMUNICATION DEVICES AND MODULATED BEACON LIGHT SOURCES

(71) Applicant: ABL IP Holding LLC, Conyers, GA (US)

(72) Inventors: Daniel Ryan, Atlanta, GA (US); Kelby Edward Green, Boston, MA (US); Emanuel Paul Malandrakis, Boston, MA (US); Konstantin Klitenik, Cambridge, MA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days. days.

(21) Appl. No.: 15/630,208

(22) Filed: Jun. 22, 2017

(65) Prior Publication Data
US 2017/0294964 A1    Oct. 12, 2017

Related U.S. Application Data

(63) Continuation of application No. 15/298,429, filed on Oct. 20, 2016, now Pat. No. 9,876,568, which is a
(Continued)

(51) Int. Cl.
*H04B 10/116*    (2013.01)
*H04W 48/16*    (2009.01)
(Continued)

(52) U.S. Cl.
CPC ............ *H04B 10/116* (2013.01); *H04L 67/12* (2013.01); *H04W 48/16* (2013.01); *H04B 17/318* (2015.01); *H04W 4/008* (2013.01)

(58) Field of Classification Search
CPC ..... H04B 10/116; H04B 17/318; H04L 67/12; H04W 4/008; H04W 48/16
(Continued)

(56) References Cited

U.S. PATENT DOCUMENTS

| 4,275,385 A | 6/1981 | White |
| 5,148,159 A | 9/1992 | Clark |

(Continued)

FOREIGN PATENT DOCUMENTS

| EP | 1715704 | 10/2006 |
| EP | 2737779 | 6/2014 |

(Continued)

OTHER PUBLICATIONS

"Chapter 28: Multilateral approaches for reliable mobile RFID service systems" In: S.A. Ashon et al: "RFID Handbook," 2008, Taylor and Francis Group, XP002753300, p. 513.
(Continued)

*Primary Examiner* — Dalzid Singh
(74) *Attorney, Agent, or Firm* — RatnerPrestia

(57) ABSTRACT

A light source emits a modulated light, and a radio-frequency transceiver disposed therewith emits a radio-frequency signal. A mobile device may receive either or both signals and determine its position based thereon. The light and radio-frequency sources may be disposed in node in a network of said sources, and the nodes may communicate via the radio-frequency transceivers.

20 Claims, 36 Drawing Sheets

Related U.S. Application Data continuation of application No. 15/146,186, filed on May 4, 2016, now Pat. No. 9,692,510, which is a continuation of application No. 14/553,424, filed on Nov. 25, 2014, now Pat. No. 9,509,402.

(60) Provisional application No. 62/052,207, filed on Sep. 18, 2014, provisional application No. 61/908,460, filed on Nov. 25, 2013.

(51) Int. Cl.
  *H04L 29/08* (2006.01)
  *H04W 4/00* (2018.01)
  *H04B 17/318* (2015.01)

(58) Field of Classification Search
  USPC .......................................................... 398/115
  See application file for complete search history.

(56) References Cited

U.S. PATENT DOCUMENTS

| | | | |
|---|---|---|---|
| 5,521,345 | A | 5/1996 | Wulc |
| 5,712,839 | A | 1/1998 | Aoki |
| 5,726,644 | A | 3/1998 | Jednacz |
| 6,044,062 | A | 3/2000 | Brownrigg |
| 6,198,230 | B1 | 3/2001 | Leeb |
| 6,249,516 | B1 | 6/2001 | Brownrigg |
| 6,400,482 | B1 | 6/2002 | Lupton |
| 6,426,599 | B1 | 7/2002 | Leeb |
| 6,437,692 | B1 | 8/2002 | Petite |
| 6,450,816 | B1 | 9/2002 | Gerber |
| 6,495,783 | B2 | 12/2002 | Rochon |
| 6,504,633 | B1 | 1/2003 | Hovorka |
| 6,539,400 | B1 | 3/2003 | Bloomfield |
| 6,548,967 | B1 | 4/2003 | Dowling |
| 6,590,687 | B1 | 7/2003 | Olsen |
| 6,608,453 | B2 | 8/2003 | Morgan |
| 6,614,126 | B1 | 9/2003 | Mitchell |
| 6,701,092 | B2 | 3/2004 | Doucet |
| 6,710,818 | B1 | 3/2004 | Kasahara |
| 6,794,831 | B2 | 9/2004 | Leeb |
| 6,807,478 | B2 | 10/2004 | Giannopoulos |
| 6,865,347 | B2 | 3/2005 | Perkins |
| 6,891,838 | B1 | 5/2005 | Petite |
| 6,914,893 | B2 | 7/2005 | Petite |
| 6,954,591 | B2 | 10/2005 | Lupton |
| 6,985,744 | B2 | 1/2006 | Katagishi |
| 7,016,115 | B1 | 3/2006 | Leeb |
| 7,022,928 | B2 | 4/2006 | Watanabe |
| 7,053,767 | B2 | 5/2006 | Petite |
| 7,054,271 | B2 | 5/2006 | Brownrigg |
| 7,103,511 | B2 | 9/2006 | Petite |
| 7,123,159 | B2 | 10/2006 | Giannopoulos |
| 7,230,196 | B2 | 6/2007 | Toyama |
| 7,265,307 | B2 | 9/2007 | Miyasaka |
| 7,309,965 | B2 | 12/2007 | Dowling |
| 7,352,972 | B2 | 4/2008 | Franklin |
| 7,415,212 | B2 | 8/2008 | Matsushita |
| 7,446,276 | B2 | 11/2008 | Plesko |
| 7,446,671 | B2 | 11/2008 | Giannopoulos |
| 7,449,654 | B2 | 11/2008 | Tsuduki |
| 7,468,661 | B2 | 12/2008 | Petite |
| 7,471,315 | B2 | 12/2008 | Silsby |
| 7,525,059 | B2 | 4/2009 | Masuda |
| 7,547,858 | B2 | 6/2009 | Nagata |
| 7,583,901 | B2 | 9/2009 | Nakagawa |
| 7,683,954 | B2 | 3/2010 | Ichikawa |
| 7,697,492 | B2 | 4/2010 | Petite |
| 7,724,301 | B2 | 5/2010 | Alakarhu |
| 7,738,884 | B2 | 6/2010 | Cheung |
| 7,741,573 | B2 | 6/2010 | Masuda |
| 7,796,780 | B2 | 9/2010 | Lipton |
| 7,912,377 | B2 | 3/2011 | Koga |
| 7,969,297 | B2 | 6/2011 | Haartsen |
| 7,970,537 | B2 | 6/2011 | Ann |
| 7,973,819 | B2 | 7/2011 | Shimada |
| 8,013,732 | B2 | 9/2011 | Petite |
| 8,107,825 | B2 | 1/2012 | Rajagopal |
| 8,131,154 | B2 | 3/2012 | Murayama |
| 8,195,054 | B2 | 6/2012 | Son |
| 8,213,801 | B2 | 7/2012 | Nien |
| 8,248,467 | B1 | 8/2012 | Ganick |
| 8,334,898 | B1 | 12/2012 | Ryan |
| 8,334,901 | B1 | 12/2012 | Ganick |
| 8,379,107 | B2 | 2/2013 | Chen |
| 8,416,290 | B2 | 4/2013 | Ryan |
| 8,432,438 | B2 | 4/2013 | Ryan |
| 8,436,896 | B2 | 5/2013 | Staats |
| 8,457,502 | B2 | 6/2013 | Ryan |
| 8,463,130 | B2 | 6/2013 | Ma |
| 8,494,218 | B2 | 7/2013 | Chen |
| 8,520,065 | B2 | 8/2013 | Staats |
| 8,732,031 | B2 | 5/2014 | Martin |
| 8,866,391 | B2 | 10/2014 | Ganick |
| 8,947,513 | B2 | 2/2015 | Ganick |
| 8,957,603 | B2 | 2/2015 | Kim |
| 8,957,951 | B1 | 2/2015 | Ganick |
| 8,964,016 | B2 | 2/2015 | Ganick |
| 8,994,799 | B2 | 3/2015 | Ganick |
| 8,994,814 | B2 | 3/2015 | Ganick |
| 9,054,803 | B1 | 6/2015 | Ganick |
| 9,055,200 | B1 | 6/2015 | Ganick |
| 9,198,230 | B2 | 11/2015 | Miura |
| 2001/0035905 | A1 | 11/2001 | Auffret |
| 2004/0013314 | A1 | 1/2004 | Peli |
| 2004/0204848 | A1 | 10/2004 | Matsuo |
| 2004/0256211 | A1 | 12/2004 | Chen |
| 2005/0177423 | A1 | 8/2005 | Swanson |
| 2005/0232642 | A1 | 10/2005 | Egner |
| 2006/0038916 | A1 | 2/2006 | Knoedgen |
| 2006/0045311 | A1 | 3/2006 | Shibuya |
| 2006/0056855 | A1 | 3/2006 | Nakagawa |
| 2006/0119287 | A1 | 6/2006 | Campbell |
| 2006/0157760 | A1 | 7/2006 | Hayashi |
| 2006/0275040 | A1 | 12/2006 | Franklin |
| 2006/0287113 | A1 | 12/2006 | Small |
| 2007/0103007 | A1 | 5/2007 | Miki |
| 2007/0139405 | A1 | 6/2007 | Marcinkiewicz |
| 2007/0254694 | A1 | 11/2007 | Nakagwa |
| 2007/0275750 | A1 | 11/2007 | Nakagawa |
| 2008/0028013 | A1 | 1/2008 | Kamegawa |
| 2008/0077326 | A1 | 3/2008 | Funk |
| 2008/0131140 | A1 | 6/2008 | Shin |
| 2008/0185969 | A1 | 8/2008 | Vegter |
| 2008/0205477 | A1 | 8/2008 | Hama |
| 2009/0026978 | A1 | 1/2009 | Robinson |
| 2009/0040367 | A1 | 2/2009 | Zakrzewski |
| 2009/0045955 | A1 | 2/2009 | Ulrich |
| 2009/0085500 | A1 | 4/2009 | Zampini |
| 2009/0102962 | A1 | 4/2009 | Miyata |
| 2009/0157309 | A1 | 6/2009 | Won |
| 2009/0171571 | A1 | 7/2009 | Son |
| 2009/0218951 | A1* | 9/2009 | Weaver .............. H05B 37/0272 315/154 |
| 2009/0245788 | A1 | 10/2009 | Varshneya |
| 2009/0269073 | A1 | 10/2009 | Kitaji |
| 2009/0284366 | A1 | 11/2009 | Haartsen |
| 2009/0310971 | A1 | 12/2009 | Kim |
| 2010/0006763 | A1 | 1/2010 | Lentering |
| 2010/0014136 | A1 | 1/2010 | Haussler |
| 2010/0035905 | A1 | 2/2010 | Schmidt |
| 2010/0053342 | A1 | 3/2010 | Hwang |
| 2010/0093359 | A1 | 4/2010 | Gallagher |
| 2010/0151903 | A1 | 6/2010 | Yamamoto |
| 2010/0156907 | A1 | 6/2010 | VanderSpek |
| 2010/0159943 | A1 | 6/2010 | Salmon |
| 2010/0171875 | A1 | 7/2010 | Yamamoto |
| 2010/0176732 | A1 | 7/2010 | Schenk |
| 2010/0204847 | A1 | 8/2010 | Leete |
| 2010/0207544 | A1 | 8/2010 | Man |
| 2010/0208236 | A1 | 8/2010 | Damink |
| 2010/0208986 | A1 | 8/2010 | Cobb |
| 2010/0219774 | A1 | 9/2010 | Bianco |

(56) References Cited

U.S. PATENT DOCUMENTS

| | | |
|---|---|---|
| 2010/0244726 A1 | 9/2010 | Melanson |
| 2010/0244746 A1 | 9/2010 | Van de Sluis |
| 2010/0250185 A1 | 9/2010 | Marshall |
| 2010/0328490 A1 | 12/2010 | Kurane |
| 2010/0328940 A1 | 12/2010 | Huang |
| 2011/0026918 A1 | 2/2011 | Kim |
| 2011/0032230 A1 | 2/2011 | Sun |
| 2011/0069951 A1 | 3/2011 | Son |
| 2011/0069962 A1 | 3/2011 | Castor |
| 2011/0085494 A1 | 4/2011 | Ji |
| 2011/0105069 A1 | 5/2011 | Gaal |
| 2011/0105134 A1 | 5/2011 | Kim |
| 2011/0115816 A1 | 5/2011 | Brackney |
| 2011/0135317 A1 | 6/2011 | Chaplin |
| 2011/0136536 A1 | 6/2011 | Garudadri |
| 2011/0137881 A1 | 6/2011 | Cheng |
| 2011/0153201 A1 | 6/2011 | Park |
| 2011/0176803 A1 | 7/2011 | Song |
| 2011/0266959 A1 | 11/2011 | Taipale |
| 2011/0298886 A1 | 12/2011 | Price |
| 2012/0001567 A1 | 1/2012 | Knapp |
| 2012/0019171 A1 | 1/2012 | Firhoj |
| 2012/0080944 A1 | 4/2012 | Recker |
| 2012/0091896 A1 | 4/2012 | Schenk |
| 2012/0126909 A1 | 5/2012 | McCune |
| 2012/0133815 A1 | 5/2012 | Nakanishi |
| 2012/0155889 A1 | 6/2012 | Kim |
| 2012/0200226 A1 | 8/2012 | Knibbe |
| 2012/0218978 A1 | 8/2012 | Ishidoshiro |
| 2012/0307842 A1 | 12/2012 | Petrov |
| 2012/0328302 A1 | 12/2012 | Iizuka |
| 2013/0013091 A1 | 1/2013 | Cavalcanti |
| 2013/0026224 A1 | 1/2013 | Ganick |
| 2013/0026940 A1 | 1/2013 | Ganick |
| 2013/0026941 A1 | 1/2013 | Ganick |
| 2013/0026942 A1 | 1/2013 | Ryan |
| 2013/0026945 A1 | 1/2013 | Ganick |
| 2013/0027528 A1 | 1/2013 | Staats |
| 2013/0027576 A1 | 1/2013 | Ryan |
| 2013/0028475 A1 | 1/2013 | Ganick |
| 2013/0028609 A1 | 1/2013 | Staats |
| 2013/0028612 A1 | 1/2013 | Ryan |
| 2013/0029682 A1 | 1/2013 | Ganick |
| 2013/0029718 A1 | 1/2013 | Saito |
| 2013/0030747 A1 | 1/2013 | Ganick |
| 2013/0040380 A1 | 2/2013 | Hunt |
| 2013/0126713 A1 | 5/2013 | Haas |
| 2013/0141554 A1 | 6/2013 | Ganick |
| 2013/0141555 A1 | 6/2013 | Ganick |
| 2013/0208132 A1 | 8/2013 | Ryan |
| 2013/0234607 A1* | 9/2013 | Kim ............... H05B 33/0854 315/158 |
| 2013/0293877 A1 | 11/2013 | Ramer |
| 2013/0297212 A1 | 11/2013 | Ramer |
| 2014/0001963 A1 | 1/2014 | Chobot |
| 2014/0045549 A1 | 2/2014 | Ryan |
| 2014/0086590 A1 | 3/2014 | Ganick |
| 2014/0139744 A1 | 5/2014 | Ryan |
| 2014/0153923 A1* | 6/2014 | Casaccia ........... H04B 10/1149 398/58 |
| 2014/0211681 A1 | 7/2014 | Chan |
| 2015/0003832 A1* | 1/2015 | Yamasaki ........... H04B 10/116 398/115 |
| 2015/0043425 A1 | 2/2015 | Aggarwal |
| 2015/0147069 A1 | 5/2015 | Brandt-Pearce |
| 2015/0188629 A1* | 7/2015 | Oshima ............. H04B 10/116 398/118 |
| 2015/0263808 A1* | 9/2015 | Kondo ............... H04B 10/116 398/115 |
| 2016/0028477 A1 | 1/2016 | Jovicic |
| 2017/0176964 A1 | 6/2017 | O'Keeffe |

FOREIGN PATENT DOCUMENTS

| | | |
|---|---|---|
| JP | 2008224536 | 9/2008 |
| KR | 20080022298 | 3/2008 |
| WO | 2007110791 | 10/2007 |
| WO | 2010146519 | 12/2010 |
| WO | 2011064332 | 6/2011 |
| WO | 2012093241 | 7/2012 |
| WO | 2012127439 | 9/2012 |
| WO | 2012165800 | 12/2012 |
| WO | 2014063150 | 4/2014 |

OTHER PUBLICATIONS

Davies, C. "VLC D-Light LED Networking Takes on Wifi and GPS," [Video] http://www.slashgear.com/vlc-d-light-led-networking-takes-on-wifi-and-gps-video-08170160/> Speech given Jul. 2011, Published to the Internet Aug. 8, 2011, Transcript attached, 3 pages.

Entire patent prosecution history of U.S. Appl. No. 14/553,424, filed Nov. 25, 2014, entitled, "System and Method for Communication With a Mobile Device Via a Positioning System Including RF Communication Devices and Modulated Beacon Light Sources."

Entire patent prosecution history of U.S. Appl. No. 15/146,186, filed May 4, 2016, entitled, "System and Method for Communication With a Mobile Device Via a Positioning System Including RF Communication Devices and Modulated Beacon Light Sources."

Extended European Search Report dated May 12, 2017 for European Application No. 14864167.3, 8 pages.

Extended European Search Report received for European Patent Application No. 12817835.7, dated Mar. 23, 2015, 4 pgs.

Gursoy, et al., "On-Off Frequency-Shift Keying for Wideband Fading Channels," EURASIP Journal on Wireless Communications and Networking, Article 98564, pp. 1-15 (2006).

Haruyama, S., "Visible Light Communications: Recent Activities in Japan," Smart Spaces: A Smart Lighting ERC Industry—Academia Day at BU Photonics Center, Boston University (Feb. 8, 2011) (49 pages).

International Preliminary Report on Patentability received for PCT Patent Application No. PCT/US2012/048164, dated Jan. 28, 2014, 8 pages.

International Preliminary Report on Patentability received for PCT Patent Application No. PCT/US2013/065923, dated Apr. 21, 2015, 5 pages.

International Preliminary Report on Patentability received for PCT Patent Application No. PCT/US2014/067390, dated Jun. 9, 2016, 10 pages.

International Search Report and Written Opinion for PCT/US12/48164, dated Nov. 29, 2012, 13 pages.

International Search Report received for PCT Patent Application No. PCT/US2013/065923, dated May 7, 2014, 4 pages.

Khan, T.A., "Visible Light Communications Using Wavelength Division Multiplexing," Thesis for Univ. of Engineering and Technology Lahore, Dept. of Elec. Engineering, (82 pages) (2006).

Liu, H.S. and Pang, G. "Positioning Beacon System Using Digital Camera and LEDs," IEEE Trans. Vehic. Tech., vol. 52(2): 403-419 (Mar. 2003).

Masaki Yoshino, Shinichiro Harauyama, and Masao Nakagawa; High-accuracy Positioning System using Visible LED Lights and Image Sensor, pp. 439-442, Radio and Wireless Symposium, 2008 IEEE, Date of Conference: Jan. 22-24, 2208, 4 pages.

Non Final Office Action dated Jul. 1, 2015 in U.S. Appl. No. 14/210,832, 41 pages.

Non Final Office Action dated Jun. 11, 2015 in U.S. Appl. No. 13/718,233, 39 pages.

Non Final Office action dated Jun. 15, 2015 in U.S. Appl. No. 14/019,376, 28 pages.

Non Final Office Action dated Jun. 16, 2015 in U.S. Appl. No. 14/490,207, 22 pages.

Notice of Allowance for U.S. Appl. No. 14/553,424, dated Jul. 22, 2016, 17 pages.

(56) References Cited

OTHER PUBLICATIONS

Notice of Allowance for U.S. Appl. No. 15/298,429, dated Sep. 13, 2017, 28 pages.
Notice of Allowance for U.S. Appl. No. 15/298,510, dated Sep. 19, 2017, 29 pages.
Notice of Allowance for U.S. Appl. No. 15/146,186, dated Feb. 21, 2017, 26 pages.
Notice of Allowance dated Jun. 12, 2015 in U.S. Appl. No. 13/369,144, 12 pages.
Osborne, D., "New LED Ceiling Lights transmit data using visible light," http://www.geek.com/articles/chips/new-led-ceiling-lights-transmit-data-using-visible-light-20110117/ (Jan. 17, 2011) (2 pages).
PCT International Patent Application No. PCT/US2014/067390, International Search Report and Written Opinion dated Mar. 12, 2015, 13 pages.
Pohlmann, "Visible Light Communication," Seminar Kommunikationsstandards in Medizintechnik, Jun. 29, 2010 (14 pages).
Steven P. Nicklin, Robin D. Fisher, and Richard H. Middleton; Rolling Shutter Image Compensation; pp. 402-409; RoboCup 2006: Robot Soccer World Cup X, Lecture Notes in Computer Science, vol. 4434, 2007, 8 pages.
Tanaka et al. "New Position Detection Method Using Image Sensor and Visible Light LEDs," Second International Conference on Machine Vision, 2009, pp. 150-153.
Tjan, B.S., et al., "Digital sign system for indoor wayfinding for the visually impaired" Proceedings of the 2005 IEEE Computer Society Conference on Computer Vision and Pattern Recognition (CVPR)—Workshops, 3, 30A. San Diego, CA (8 pages), Jun. 25, 2005.
Visible Light Communication (Vlc) Systems; (Retrieved Mar. 10, 2012)—7 pages.
International Search Report and Written Opinion issued for PCT/US2012/048164, dated Nov. 29, 2012, 13 pgs.
Visible Light Communication (Vlc) Systems; <http://bemri.org/visible-light-communication.html> (Retrieved Mar. 10, 2012)—7 pages.
Notice of Allowance for U.S. Appl. No. 13/718,233, dated Mar. 16, 2016, entitled "Recognition Information." (17 pages).
Partial Supplementary European Search Report dated Apr. 7, 2016 for European Application No. 13847543.9, 7 pages.
Notice of Allowance dated Oct. 9, 2015 in U.S. Appl. No. 13/369,144 filed Feb. 8, 2012, entitled "Independent Beacon Based Light Position System." (9 pages).
Notice of Allowance dated May 3, 2016 for U.S. Appl. No. 14/058,678 entitled "Self-Identifying One-Way Authentication Method Using Optical Signals." (40 pages).
Notice of Allowance dated Jan. 12, 2016 for U.S. Appl. No. 14/163,772 entitled "Method and System for Video Processing to Remove Noise From a Digital Video Sequence Containing a Modulated Light Signal." (15 pages).
Notice of Allowance dated Apr. 13, 2016 in U.S. Appl. No. 14/210,832, filed Mar. 14, 2014 entitled "Location-Based Mobile Services and Applications." (14 pages).
Notice of Allowance dated Dec. 3, 2015 for U.S. Appl. No. 14/490,207 entitled "Self Identifying Modulated Light Source." (16 pages).
Non Final Office action dated Jan. 14, 2016 for U.S. Appl. No. 13/526,781 entitled "Method and System for Modifying a Beacon Light Source for Use in a Light Based Positioning System." (33 pages).
Final Office Action dated Nov. 17, 2015 issued in U.S. Appl. No. 13/718,233, 13 pages.
EP Search Report for Application No. 12817835.7 dated Nov. 27, 2015, 3 pages.
Entire patent prosecution history of U.S. Appl. No. 14/490,207, filed Sep. 18, 2014, entitled, "Self Identifying Modulated Light Source."
Entire patent prosecution history of U.S. Appl. No. 15/298,429, filed Oct. 20, 2016, entitled "System and Method for Communication With a Mobile Device Via a Positioning System Including RF Communication Devices and Modulated Beacon Light Sources."
Notice of Allowance for U.S. Appl. No. 15/630,263, dated Feb. 13, 2018, 24 pages.

\* cited by examiner

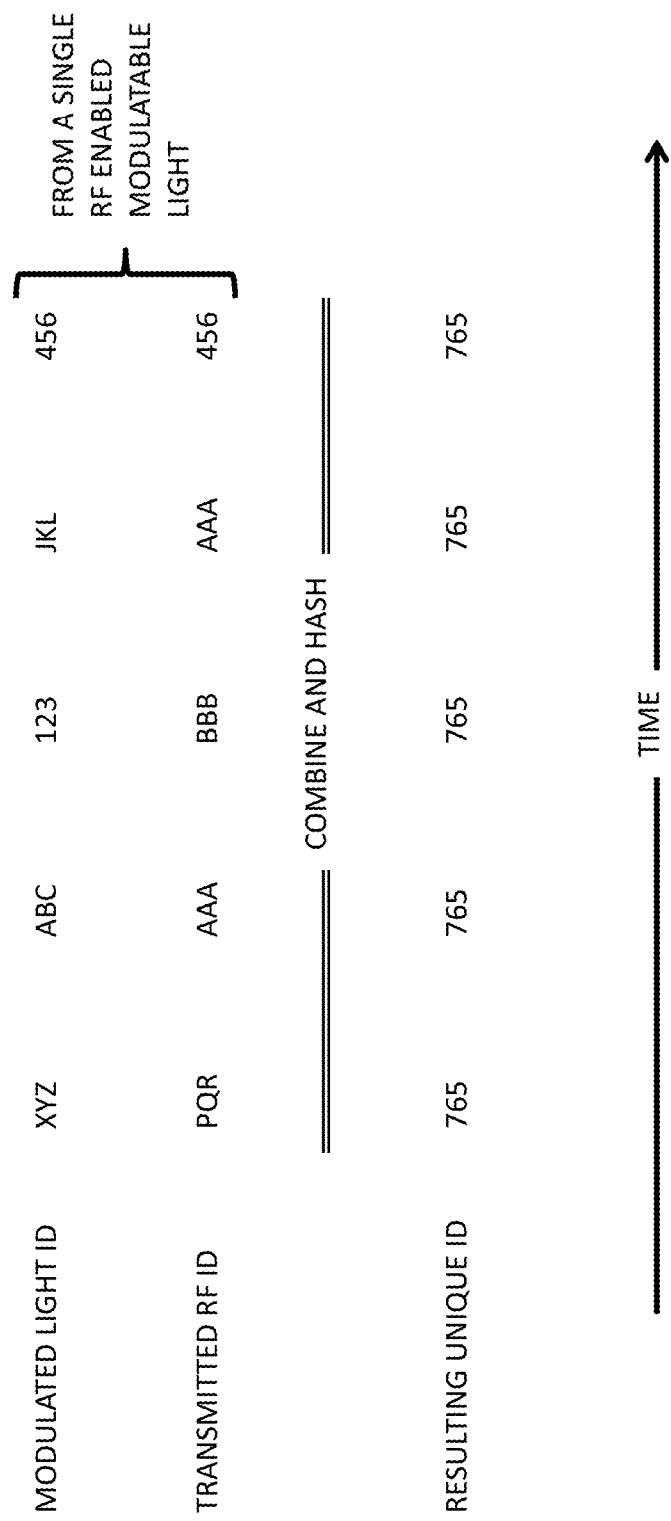

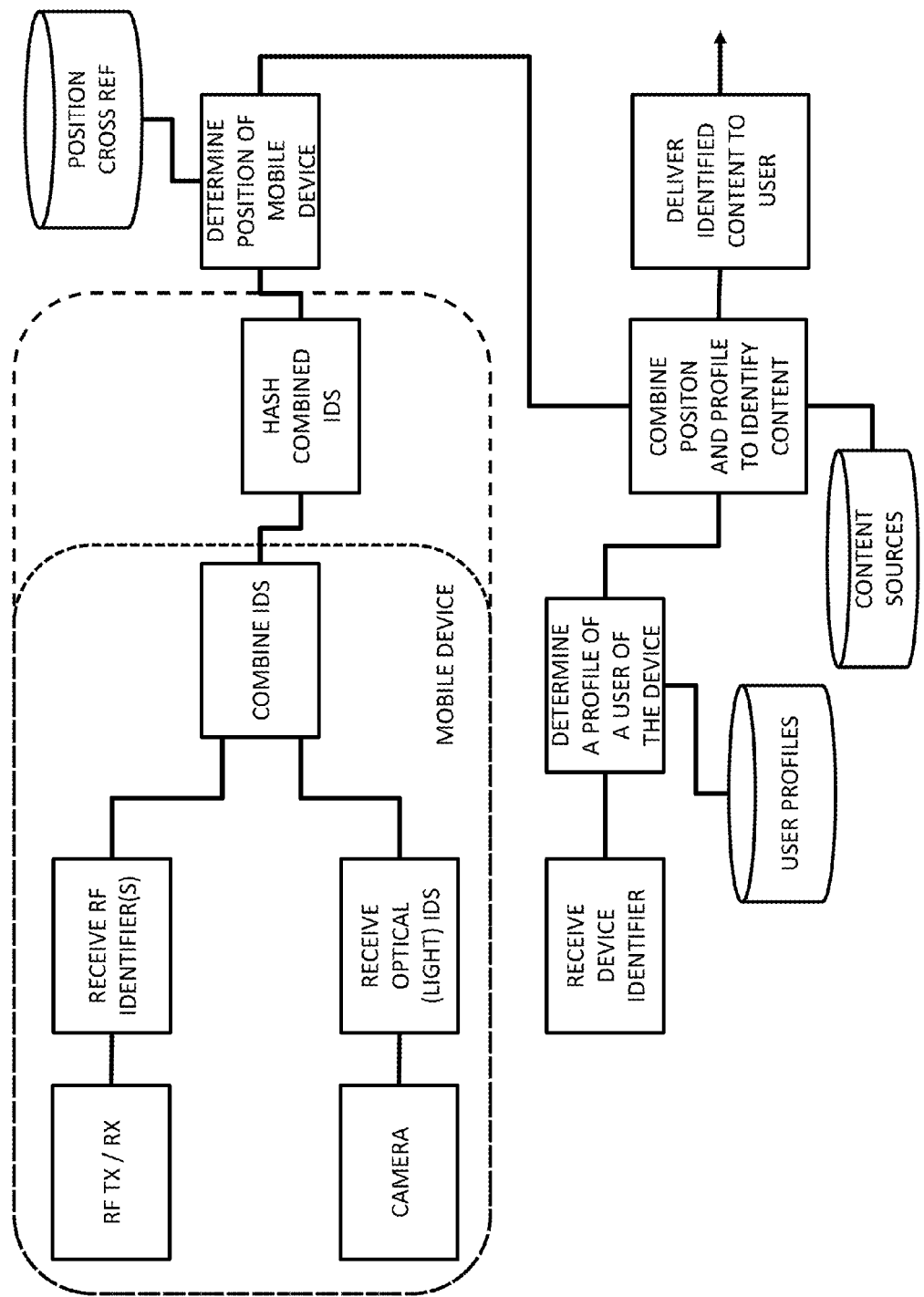

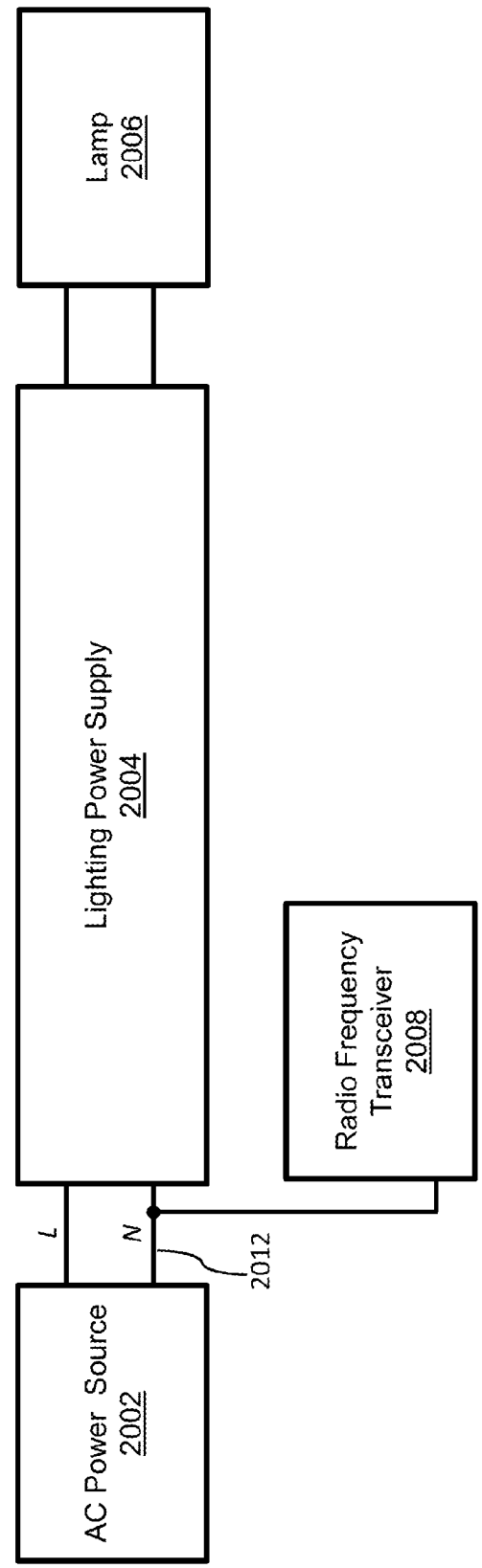

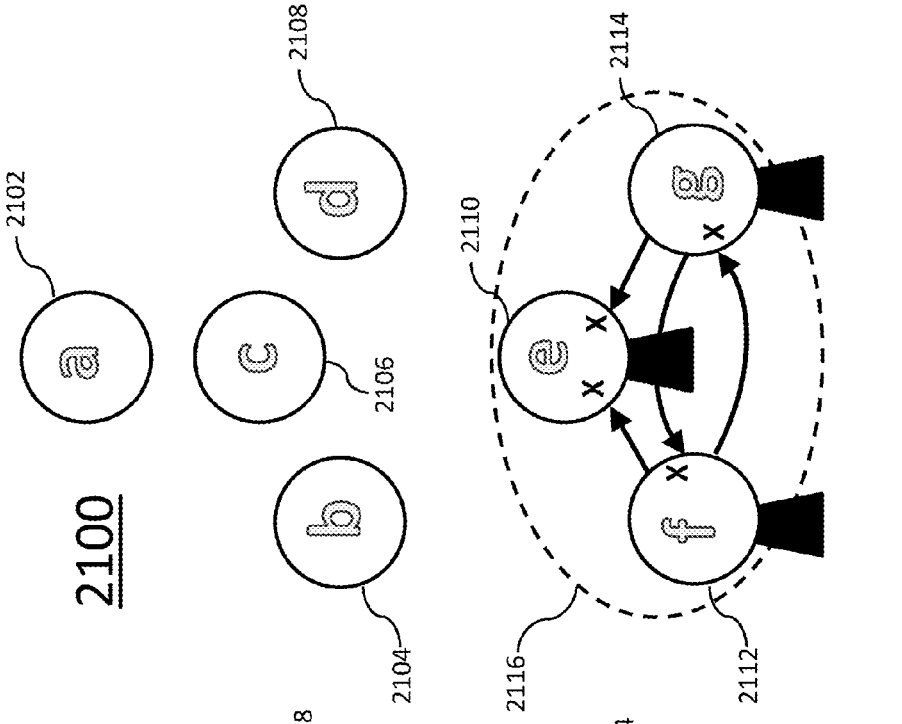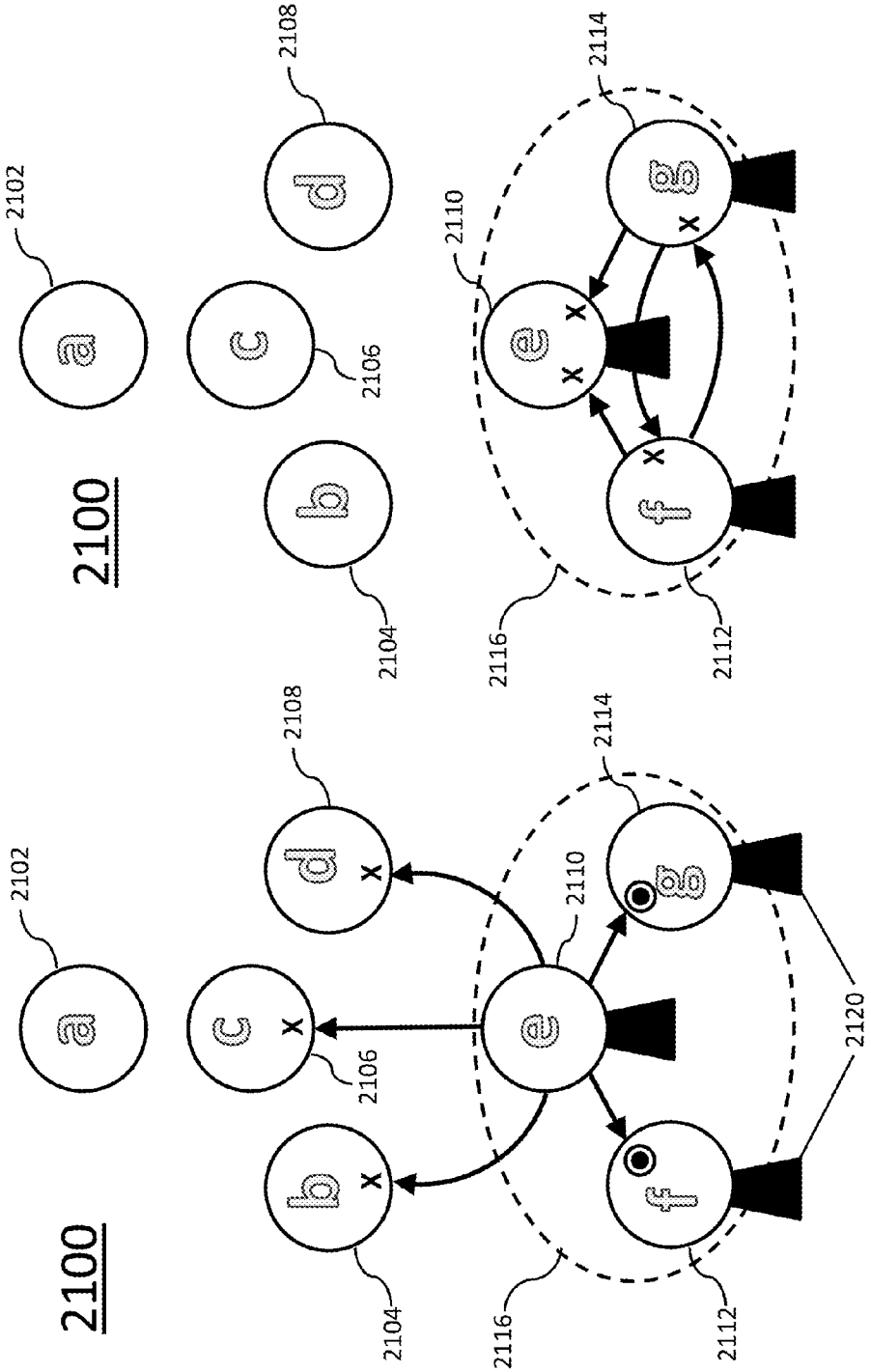
FIG. 21D
FIG. 21C

2200

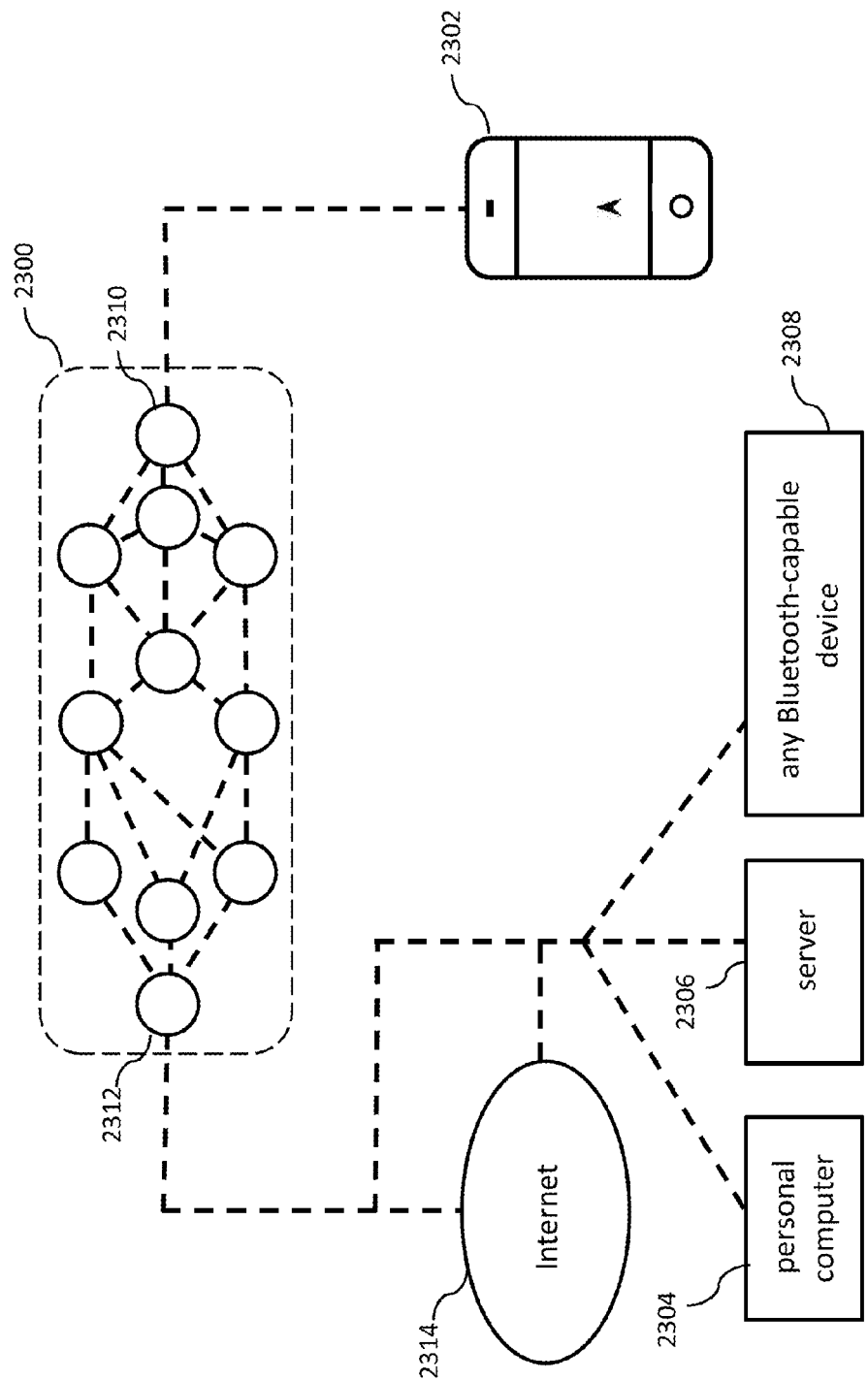

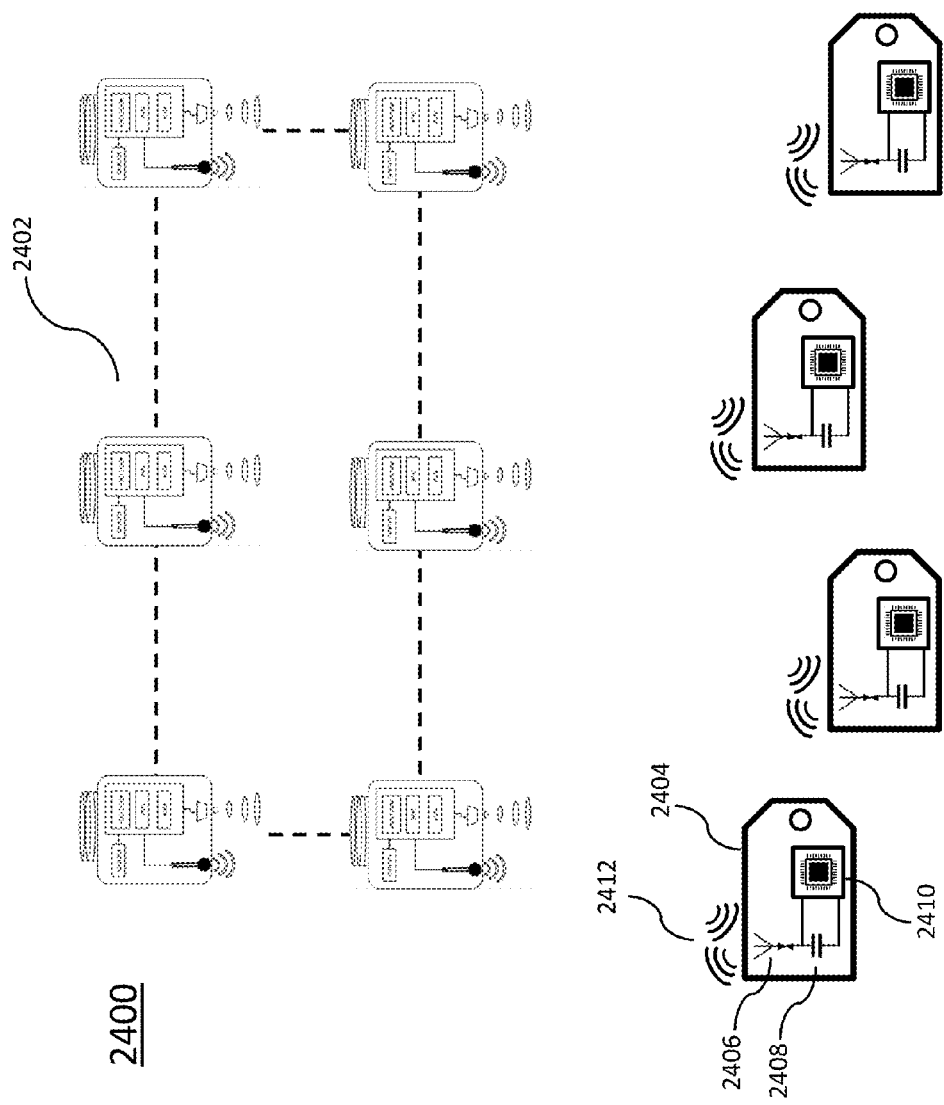

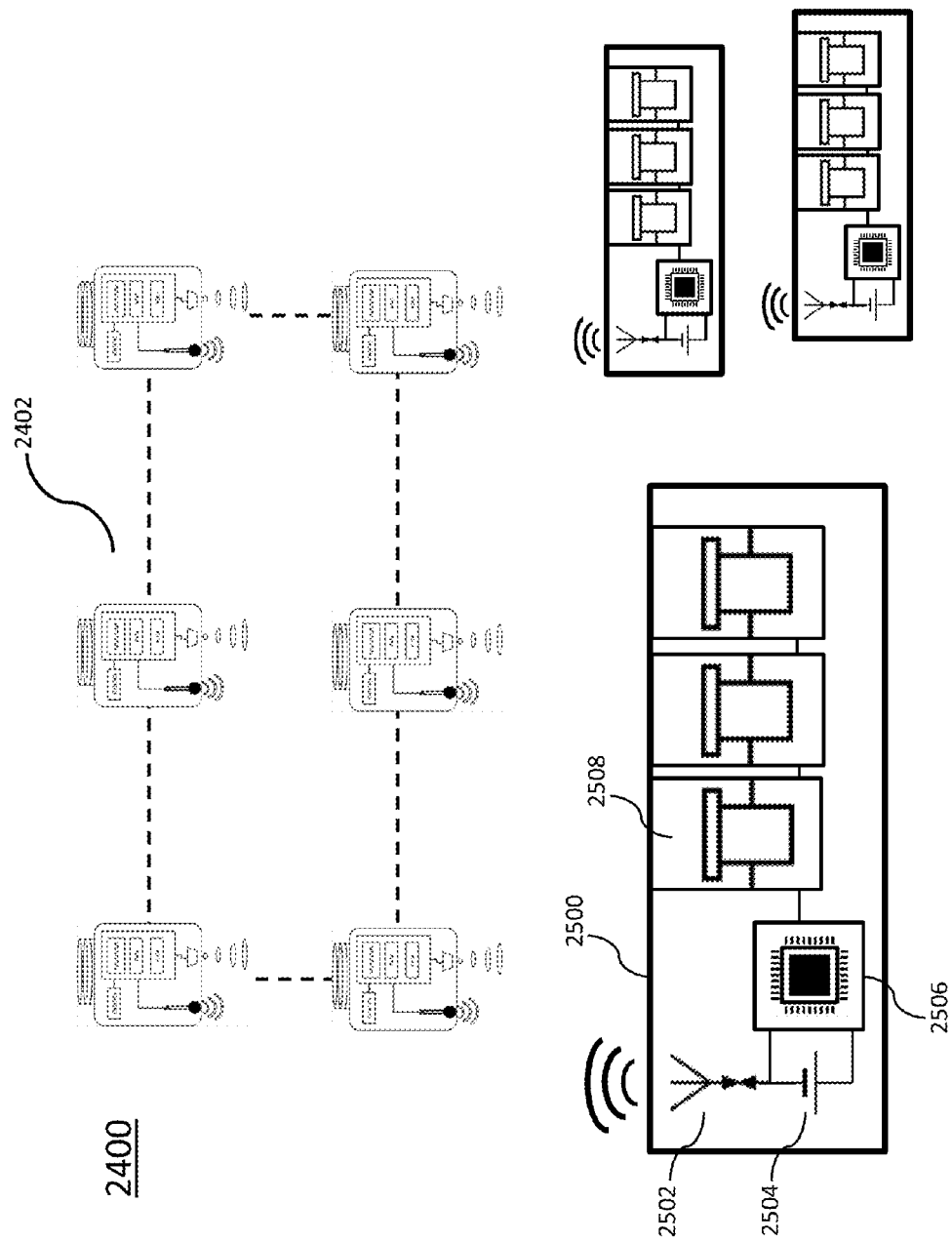

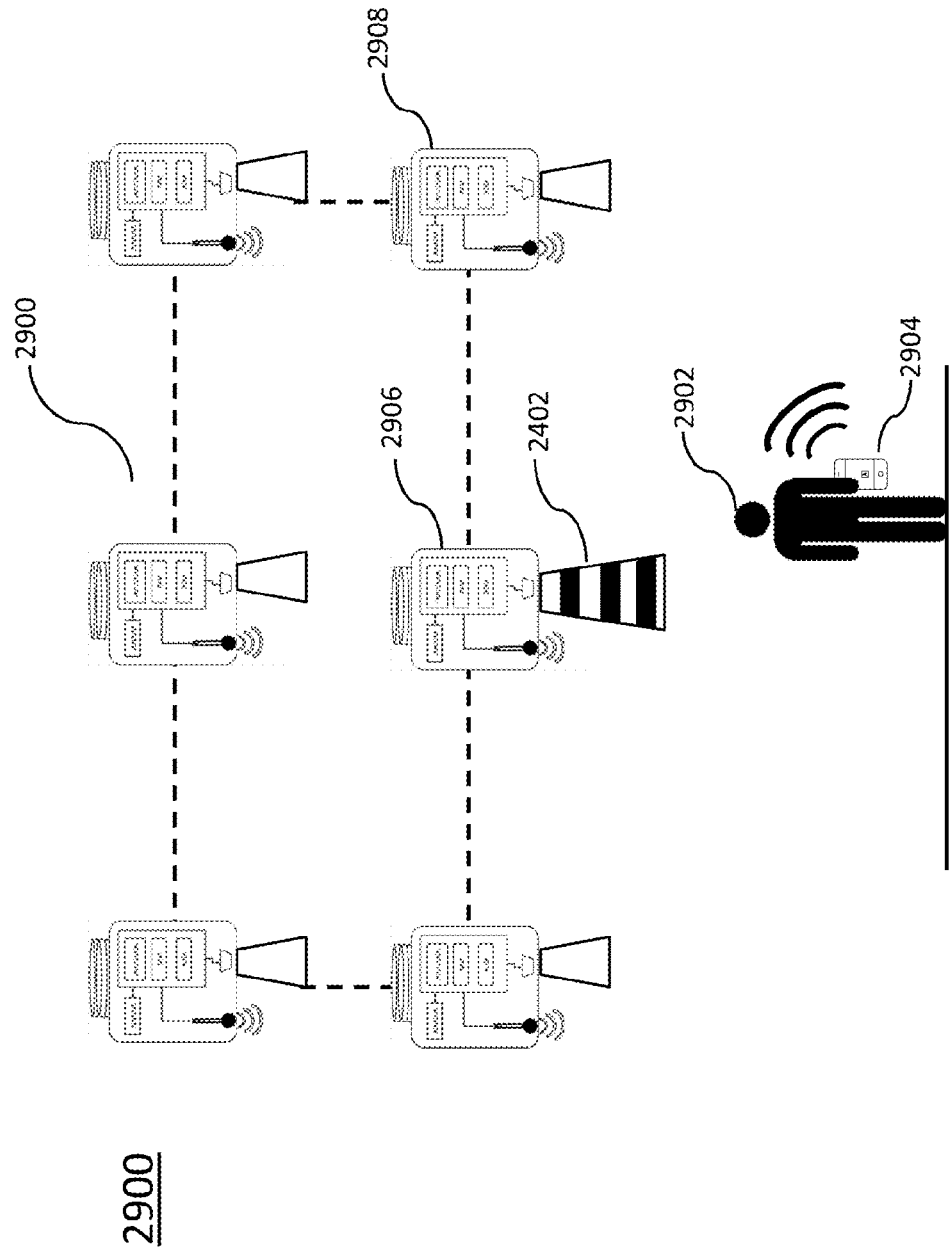

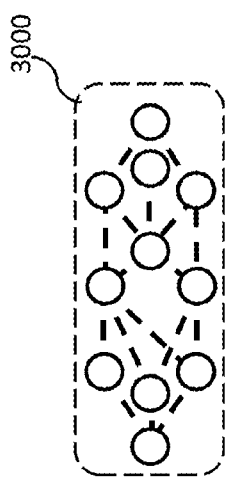
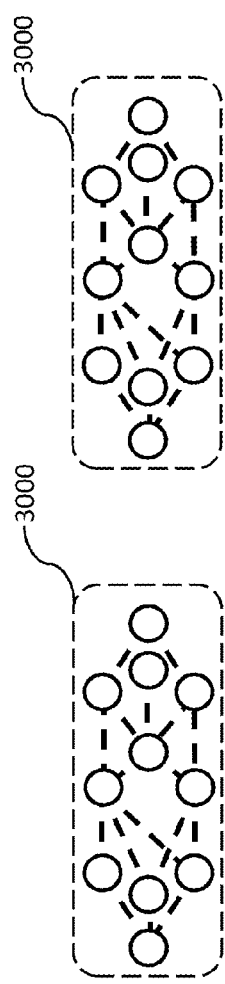
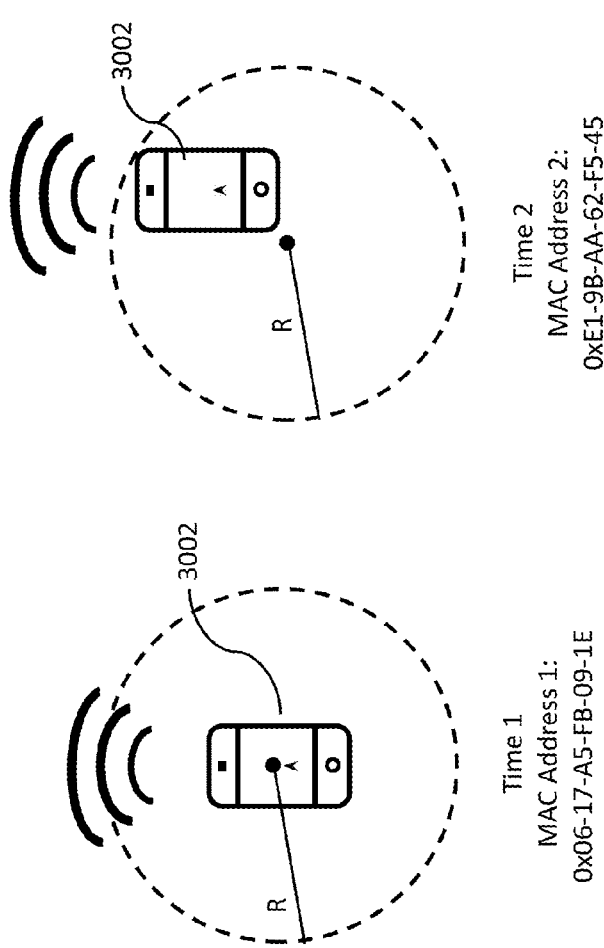

SYSTEM AND METHOD FOR COMMUNICATION WITH A MOBILE DEVICE VIA A POSITIONING SYSTEM INCLUDING RF COMMUNICATION DEVICES AND MODULATED BEACON LIGHT SOURCES

CROSS-REFERENCE TO RELATED APPLICATIONS

This application is a continuation of application Ser. No. 15/298,429 filed Oct. 20, 2016, which is a continuation of application Ser. No. 15/146,186 filed May 4, 2016, which is a continuation of application Ser. No. 14/553,424 filed Nov. 25, 2014 (now U.S. Pat. No. 9,509,402 issued on Nov. 29, 2016), which claims priority to and the benefit of U.S. Provisional Patent Application Ser. Nos. 62/052,207, filed Sep. 18, 2014, and 61/908,460, filed Nov. 25, 2013, which are all hereby incorporated herein by reference in their entirety.

FIELD OF THE INVENTION

In various embodiments, the present invention relates generally to systems and methods for communicating with a mobile device via a positioning system that includes both radio-frequency (RF) transceivers and modulated beacon light sources, and among the nodes constituting such a system.

BACKGROUND

Provided herein are descriptions of methods and systems for the use and application of RF communication devices integrated with light sources for position detection of mobile devices, control of a lighting system, and for communication with mobile and stationary devices, preferably in spaces of relatively limited extent (e.g., retail store interiors, convention floors, libraries, airport terminals, roofed sports stadiums, courtyards) that are illuminated by lights capable of communicating information by visible light communication (VLC). In various embodiments, these methods and systems enable the RF communications devices to enhance and support the position-determination function and other functions of a system or network of one or more VLC-capable lights. Also in various embodiments, these methods and systems advantageously co-locate the RF communications devices with VLC lights powered by standard mains lighting power, obviating the use of batteries or the installation of special wiring to power the RF communications devices.

Indoor positioning services relate to systems and methods whereby the locations of mobile devices and their users within buildings are estimated. Such services may be based on various physical modalities, including light, radio waves, ultrasonic waves, and floor vibrations. Indoor positioning is a key component of location-aware computing, which relates to applications that utilize the location of a mobile device to provide the device's user with content relevant to their location. Some location-aware computing functions pertain to entertainment, marketing, and management. An example of an entertainment function supported by indoor positioning is augmented reality, technology that functionally overlays a virtual space onto a physical space. Marketing functions supported by indoor positioning include advertising and content distribution through mobile devices (e.g., tablets, cell phones, wearable computers, smart tags). Herein, "marketing" refers to content distribution even in nonprofit settings. Indoor marketing functions differ importantly from those for off-site environments: for example, for a retail enterprise, indoor marketing can include unique aspects such as alerting a customer via their mobile device of discounts on items in the store. In an example, a customer not in the store sees an ad in general media for a product at a given location. They then travel to that location. Upon entry they are prompted by a radio-frequency (RF) capability of the store's lighting network to view their mobile device. This exposes the mobile device to ambient light and enables visible light communication (VLC)-supported position estimation for the device. The customer is then alerted to a special discount coupon, available to them at that time only, for a product in the store, and may interact with a map displayed on their device that employs the device's VLC position estimate and directs them to the product. In general, in-store content and ad distribution capabilities are enabled by indoor location services that are not feasible in the prior art.

An illustrative management function for indoor positioning is inventory navigation: e.g., in a warehouse, the indoor positioning system can direct a person equipped with a mobile device to where a particular item is located. Inventory tracking is also possible: e.g., if the person removes the item (an event that may be either logged by the device user on their mobile device, or automatically detected as motion of an electronic tag on the item), a back-end server can update inventory databases to reflect this change.

In another exemplary management function, a mobile device using a light-based indoor position positioning technique in conjunction with a wireless connection (e.g., WiFi) can enable non-intrusive data collection on customers. For example, data collection on how customers move through a store and where they spend time can be collected and used to improve layout and merchandise displays.

Light-based indoor positioning systems have various advantages over systems employing other physical modalities. Signals from Global Positioning System (GPS) satellites, often used for determining the location of mobile computing devices, lose significant power when passing through construction materials and suffer from multi-path propagation effects, making GPS unsuitable for indoor navigation. Techniques based on received signal strength indication (RSSI) from radio transceivers (e.g., WiFi and Bluetooth wireless access points) have been explored for indoor positioning, but positioning accuracy of RSSI-based systems is limited to the multi-meter range. Ultrasonic techniques, which transmit inaudible acoustic waves to microphones, can also be used to approximate indoor position; however, ultrasound tends to be more limited in range than radio and commonplace devices and networks are not configured for communicating via ultrasound.

VLC indoor positioning techniques employ optical signals, either visible or infrared, typically emitted by lights also performing an illumination function, and can be used to accurately locate mobile devices indoors. Optical techniques are more accurate and/or reliable than other approaches: since light waves are highly directional and do not pass through most materials, a light-detecting device can be presumed proximate to a light source if the source is robustly detectable. Moreover, many mobile devices are inherently equipped with cameras that may be exploited for optical indoor positioning, and are simultaneously in contact via radio with one or more communications networks (e.g., telephone, Internet). Herein, "mobile devices" includes all portable devices having a computational capability (e.g., phones, tablets, wearable computers, electronic tags, etc.).

Also, light-based indoor positioning systems are easy and low-cost to set up: e.g., to install, a building operator may need only to swap out existing bulbs for VLC bulbs. No new socket hardware or power wiring is required, and no scheduled battery maintenance need be instituted.

However, optical indoor positioning techniques have several limitations or drawbacks. For example, VLC signals cannot be sent or received directly by many computing devices or networks (e.g., servers, the cell phone network, the Internet); standardized protocols do not exist for the exchange of data, commands, and other information between VLC beacons and other computing devices or networks; VLC signals are not detectable by devices lacking light sensors or whose light sensors are not exposed to ambient light (e.g., a cell phone stowed in a user's pocket); the bandwidth of VLC beacons is low relative to that of various other communications modalities; and, because of the tendency of light to be attenuated by even flimsy objects, any intercommunicating network of VLC devices (e.g., ceiling lights in a retail space) would likely be unreliable and subject to isolation of portions of the network by architectural or other barriers. All of these drawbacks, as well as others not named, arise from the innate character of VLC signaling. Techniques are therefore desired by which the advantageous aspects of VLC indoor positioning may be combined with those of one or more other communications modalities. Also desired are methods for remote control, monitoring, and diagnosis of a lighting network that may feature non-VLC lights and/or VLC lights.

BRIEF DESCRIPTION OF THE FIGURES

The claimed invention and the following detailed description of certain embodiments thereof may be understood by reference to the following figures:

FIG. 18 depicts the generation of a common unique position identifier from multiple combinations of radio frequency and light identifiers in accordance with various embodiments of the invention;

FIG. 19 depicts a flow chart for generating user-targeted content based on detecting a radio frequency identifier and a modulated light identifier from a light in accordance with various embodiments of the invention;

FIG. 20C depicts an RF capability of a VLC+RF node powered by attachment to the neutral wire of an AC power source of a light in accordance with various embodiments of the invention;

FIG. 21C schematically depicts an illustrative VLC+RF mesh in a third state of packet transmission in accordance with various embodiments of the invention;

FIG. 21D schematically depicts an illustrative VLC+RF mesh in a fourth state of packet transmission in accordance with various embodiments of the invention;

FIG. 23 schematically depicts a mesh network acting as a transparent range extender for an RF in accordance with various embodiments of the invention;

FIG. 24A depicts a mesh network with passively powered tags in accordance with various embodiments of the invention;

FIG. 25 depicts communication between a modular sensor and a lighting mesh in accordance with various embodiments of the invention;

FIG. 29 depicts a use of the coordinated lighting capability of a mesh in commission the mesh in accordance with various embodiments of the invention; and FIGS. 30A-30C depict location tracking of a user device despite random changing of MAC address in accordance with various embodiments of the invention.

DETAILED DESCRIPTION

In FIGS. 1-10 and discussion thereof, systems and methods are disclosed that disclose providing a positioning service for devices based on light received from one or more light sources. FIGS. 11-30 pertain to the integration of VLC and radio capabilities in a lighting system.

In some embodiments, light sources are used to provide an indoor positioning service to mobile devices. Each light source is given a distinctive identification (ID) code, and database associates each ID code with specific location data (coordinates). The ID code is broadcast by modulating the visible-light output of the LED light source. This modulation occurs at speeds undetectable by the human eye yet detectable by a camera-equipped mobile device as modulation artifact in images acquired by the camera. Since robust detection of ID information broadcast by a point source of light is feasible only the vicinity of the source, the mobile device can be presumed to be in the vicinity of a light whose ID it detects. Detected light IDs can therefore be used to estimate the mobile device's location, e.g., by matching detected IDs to spatial coordinates using a database on a server. When a mobile device identifies light from more than one light source, the position of the device can be geometrically estimated with even greater accuracy.

In various embodiments, hashing or other encryption techniques may be used to obscure ID codes from third-party observers (e.g., competitors who wish to map a store and its VLC system). Herein, "hashing" denotes the unique mapping of a digital string to a data string of fixed size, with slight differences in input data producing large differences in output data. The hashed output for a given input string constitutes an encryption of the input string. For example, in an illustrative embodiment hashed ID codes may be detected by a mobile device and transmitted to a server for de-hashing; the hash function itself is never exposed to third-party examination by being entrusted to the mobile device.

Figure 1:
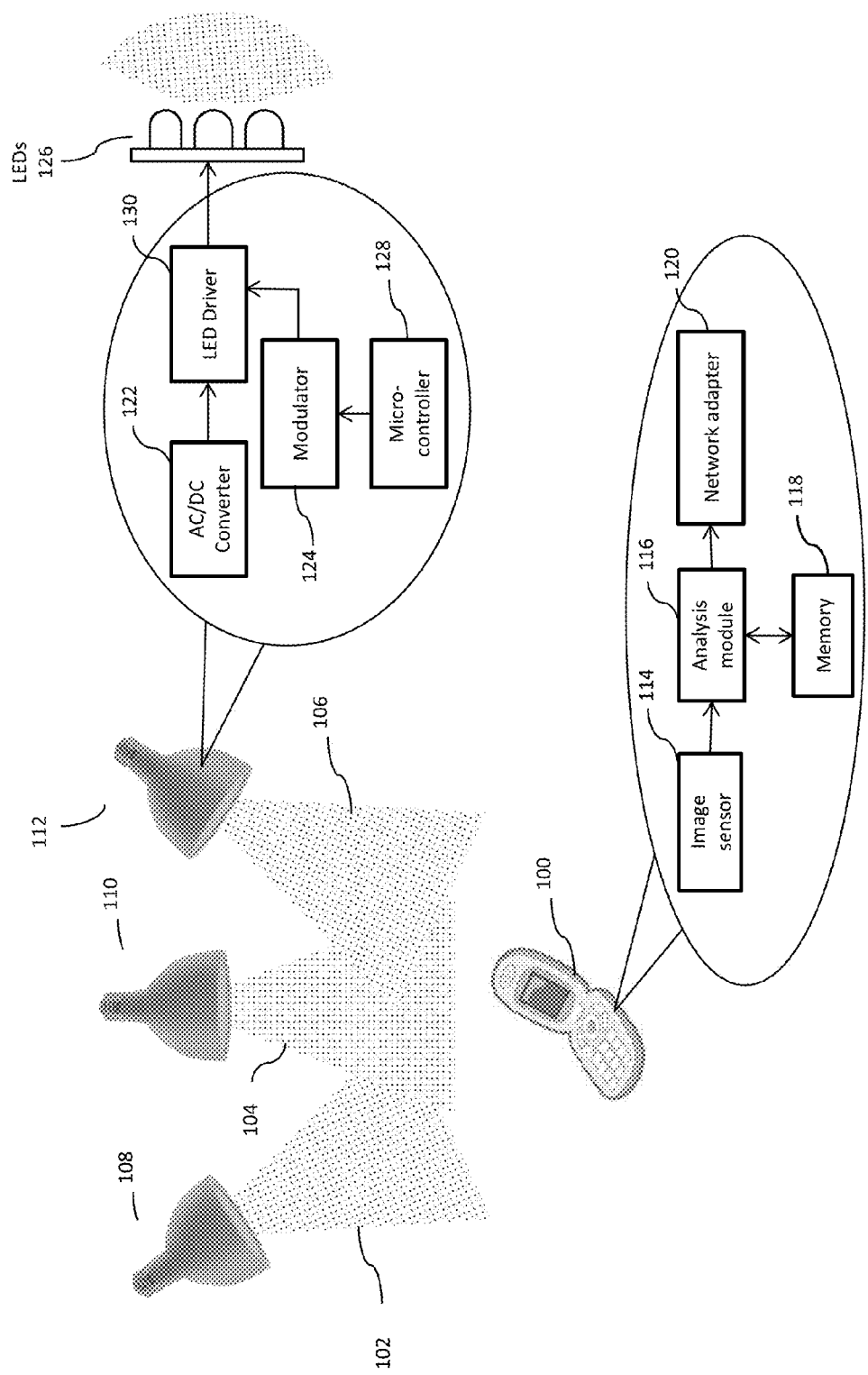
FIG. 1 is a representation of a mobile device receiving modulated light from LED light sources.

FIG. 1 schematically depicts portions of an illustrative embodiment of indoor VLC positioning in which a mobile device 100 is illuminated by one or more LED light sources. Having detected the IDs of the one or more light sources, the device 100 communicates (e.g., via a radio means of communication) with a database that associates light IDs with light location coordinates and, potentially, other content. The location of the illustrative embodiment may be any space capable of being illuminated by VLC light sources in a readily detectable manner.

In the illustrative embodiment of FIG. 1 a mobile device 100 receives light 102, 104, 106 from three light sources 108, 110, 112. Each light source 108, 110, 112 can be any lighting source used for general-purpose illumination, spot illumination, or backlighting that is capable of transmitting information by means of visible light communication (VLC). For the purposes of this disclosure, we consider any form of light capable of being suitably modulated (e.g., an LED light source) as a VLC light source: LED light sources are referred to extensively herein, but such references are illustrative and technologically nonrestrictive.

LEDs can be dimmed and brightened (i.e., modulated) more rapidly than the human eye can detect. LED light is therefore a medium through which data can be transmitted to devices equipped with appropriate light-sensing capability, e.g., a digital camera. As will be clear to persons familiar with the art of communications engineering, many forms of digital (two-state) and analog (continuous-state) modulation may be applied to an LED's light output, including amplitude-shift keying, amplitude modulation, frequency modulation, and many others. For example, the brightness of a light source may be modulated by one or more sinusoidal signals. All modulation techniques that can be applied to visible light are contemplated and within the scope of the invention, subject only to the condition that the modulation is of a degree and/or frequency not detectable by a human observer. Moreover, modulation of forms of light not generally detectable by a human observer (e.g., low-level infra-red light), which not constrained by limits on flicker perception, is also contemplated and within the scope of the invention and intended whenever "VLC" and similar terms are used.

An example of a modulation technique employed in various embodiments is Digital Pulse Recognition (DPR). This technique exploits the rolling shutter mechanism of a complementary metal-oxide-semiconductor (CMOS) image sensor such as is found in many mobile-device cameras. As shall be further clarified with reference to FIGS. 6-12, a rolling-shutter CMOS camera sequentially captures portions of each image frame, whether a still photograph or a video frame, on a rolling (time-sequential) basis. These portions are typically rows of sensors (e.g., charge-coupled devices [CCDs]) corresponding to lines of image pixels that are exposed for successive periods of time. (A CCD may be "exposed" under electronic control—that is, may accumulate light-induced electrical charges—for only for a fraction of the time that it is actually illuminated by a light source. Herein, "exposure" refers to a period of charge accumulation, not a period of illumination by light.) Because rows of CCDs are exposed sequentially, illumination may be of a different brightness during the exposure of each row. Accordingly, a time-varying light source may produce row-wise striping in an image frame. For example, a light source modulated by a periodic waveform will tend to produce stripes of even width across a CMOS image, stripe width being a function of waveform period and rolling-shutter exposure timing. The frequencies of one or more distinct VLC tones can be deduced from striping patterns in an image.

For example, consider the three light sources 108, 110, 112 of the illustrative VLC beacon light-based indoor positioning system of FIG. 1 with the output of lights 108, 110, and 112 sinusoidally modulated at, respectively, 500 Hz, 600 Hz, and 700 Hz. These frequencies are well above the human flicker fusion threshold (i.e., about 60 Hz; rarely, as high as ~120 Hz), therefore undetectable to the eye. Mobile device 100 within view of lights 108, 110, 112 can detect DPR tones in light 102, 104, 106; correlate detected tones with light IDs by accessing a database that links IDs to light locations (as shall be shown more fully in FIG. 2); and then geometrically calculate (or receive the results of such a calculation from a server, not shown in FIG. 1) an estimate of its own location based on the locations of the detected lights 108, 110, 112. Even a single light detection would suffice for an estimate of the position of device 100.

The illustrative device 100 comprises an image sensor 114, analysis module 116, and digital memory 118 in order to capture images and analyze the images to determine if VLC information is present therein. To detect information encoded in ambient light, the mobile device 100 can analyze one or more image frames captured by the sensor 114 by using the module 116, whose logic can be implemented in any combination of hardware and software. For example, the module 116 can be an application that runs on a computational capability of the device 100. A network adapter 120 enables the mobile device 103 to connect to, for example, cellular telephone, Bluetooth, and WiFi networks. The network connection 120 can be used to access a data source containing light ID codes linked to location data and location-dependent content. Linking of ID codes to location data can also be accomplished by storing location data in the mobile device memory 118, but the network adapter 120 allows for greater flexibility and decreases the internal device resources needed.

Estimation of position as described above, and/or by other means, can occur with little to no user input, and can be employed in a number of ways, depending on the desired application. In an illustrative case of an indoor navigation application, the user would see an identifying "you are here" marker overlaid on a map of the indoor space they are in. In the case of content delivery, the user might see on their mobile device 100 images, text, videos, recorded audio, or other information about objects they standing near.

FIG. 1 also depicts internal components commonly found in a typical, illustrative LED light source (e.g., light 112) with the addition of components to allow for the transmission of optical signals via VLC. The VLC LED light source 112 connects (e.g., via Edison socket or other standard socket) to alternating current (AC) electrical power (e.g., mains power at 120 V, 60 Hz or other standard power) via a converter 122 that converts AC power into an direct-current (DC) power appropriate for most electronic devices. Light 112 also comprises a modulator 124 that increases and decreases power to one or more LEDs 126 to modulate their brightness, a microcontroller 128 which controls the rate and shape of modulation of the LEDs 126, and an LED driver circuit 130 which provides appropriate voltage and current to the LEDs 126.

The microcontroller 128 contains a nonvolatile memory storage area (e.g., programmable read only memory, electrically erasable programmable read only memory, or Flash) that stores the ID code of the light 112. The task of the microcontroller 128 is to send a predetermined (e.g., programmed) sequence of signals to the modulator 124, which in turn interfaces with the LED driver 130 to modulate the visible light from the LEDs 126. The sequence of signals sent from the microcontroller 128 determines the form of modulation imposed on the light from the LEDs 126 and the information conveyed by such modulation.

Figure 2:
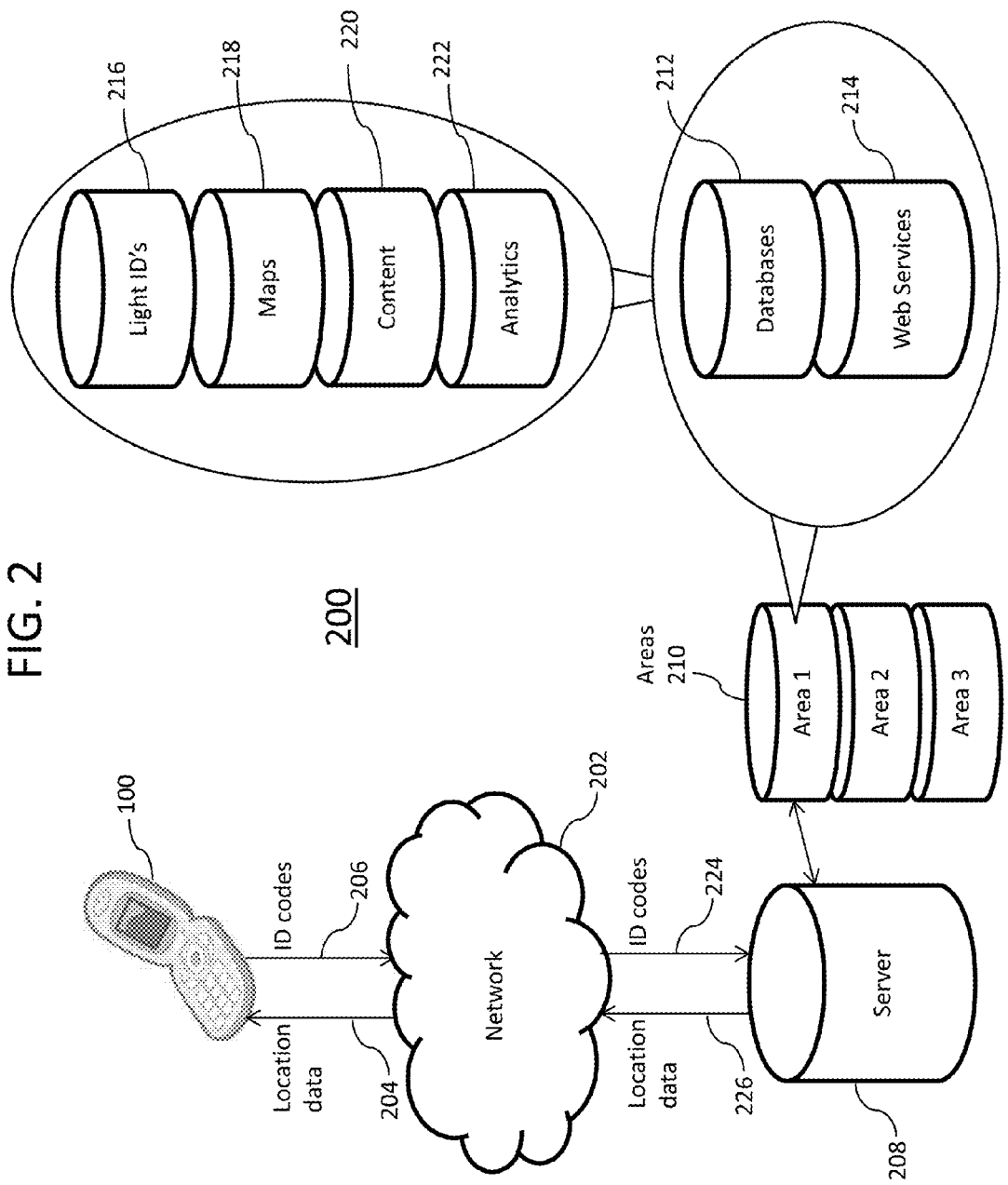
FIG. 2 illustrates a block diagram of a mobile device exchanging identification information and location information with a server via a network.

FIG. 2 is a schematic depiction of an illustrative system 200 in which a mobile device 100 that is illuminated by one or more VLC lights (not shown) is connected wirelessly via its network adaptor (e.g., adaptor 120 of FIG. 1) to a network 202. A multiplicity of mobile devices (not shown) illuminated by VLC lights may communicate with the network 202, as may other devices and networks (not shown). The network 202 can consist of a wired or wireless local area network with a method to access a larger wide area network or a cellular data network (e.g., Edge, 3G, 4G, LTS). In essence, the mobile device 100 sends VLC detected light-source ID codes 206 through the network 202 to a server 208. The server 208 returns location information 204 to the device 100.

In various embodiments, the network 202 may comprise a hierarchy of networks. Such a hierarchy of networks may include a network of radio-frequency (RF) devices (e.g., Bluetooth low-energy transceivers) that are co-located with the VLC lights in an indoor space, that are powered from the power source of the VLC lights, and that intercommunicate with each other in a mesh topology or other network topology. The VLC lights may be controlled through the nodes of the low-level RF mesh (e.g., the lights' ID codes, modulation schemes, and on-off behaviors may be thus controlled). Such VLC-integrated RF mesh may relay data between any devices capable of suitable RF communication with the nodes of the mesh, including mobile devices, stationary computers, sensors, smart tags, robots, drones, and other devices.

Communications from the device 100 to the network 202 can include data additional to or other than light ID codes 206, including sensor data such as but not limited to GPS coordinates, compass measurements, and accelerometer/gyroscope data. Communications from the network 202 to the device 100 could include data additional to or other than location data, including but not limited to recorded audio, videos, text, and images, and the selection of such data may depend on criteria that include one or more of (but are not limited to) device location, temporal criteria, historical criteria, and user-specific criteria. Temporal criteria can include, for example, time of day, week, month, or year; for example, seasonal marketing and content could be automatically presented to the user of device 100, or content in the form of morning, evening, or nightly specials could be presented at particular times throughout a day. Historical criteria can include user location history (e.g., locations visited frequently), Internet browsing history, retail purchases, or any other information recorded about a mobile device user. User-specific criteria can include age, gender, past buying habits, and other information, as well as policies or rules set up by a user to specify the type of content they wish to receive or actions the mobile device should take based on location information. In an example of content provision based on user-specific criteria, a 20-year-old male user may receive different advertisements and promotions than a 60-year-old female user.

Illustratively, the capability of the server 208 may be physically and/or logically divided into portions or "areas"

210, each of which performs functions pertaining to a distinct service location. Distinct service locations are physical zones, either within a single structure or at diverse locations, that are served by distinct VLC systems. Each location-specific server area 210 contains databases 212 and web-service resources 214 devoted to the location. Databases 212 consist essentially of information pertaining to a specific service installation (e.g., light IDs 216, maps 218, content 220, analytics 222). The installation-specific web-service resources 214 enable services which allow users, customers, administrators, and developers access to ID codes, indoor locations, and other information.

In an illustrative VLC indoor location service, the server 208 handles incoming ID codes 224 to appropriately return indoor location data 226 to the network for transmission to the mobile device 100. Handling of ID codes can include receiving incoming ID codes 224, searching service-location-specific databases 212 to enable code-to-light matches, calculating position coordinates based on ID codes 224, and communicating indoor location data 226.

In a typical VLC-enabled installation, tens to hundreds of LED light sources broadcast distinctive ID codes. The purpose of the Light IDs database 216 is to record where the ID codes are physically assigned at the installation. These records can take the form of but are not limited to GPS coordinates mapped into an indoor space. Maps in a location-specific Maps database 218 can take various physical and digital forms, being obtained either directly from the service location or from third-party vendors or other outside sources. A location-specific Content database 220 may contain, for example, ads and inventory information, and a location-specific Analytics database 222 may contain, for example, records of user shopping behavior. Databases may in general contain static, user-based, and/or dynamic content. Static content is unchanging information associated with the specific area 210, e.g. audio recordings, streaming or stored video files, texts, images, or links to local or remote websites. User-based content is dependent on user criteria, e.g., user age, sex, preference, habits, etc. Dynamic content changes with varying frequency, e.g., daily, weekly, monthly, etc.

At a typical VLC service location there is a small possibility of having duplicate ID codes, since there are in practice a finite number of available codes. To deal with duplicate ID codes, additional distinguishing information can be contained in the individual log records of the Light IDs data base 216, e.g., records of ID codes of lights in physical proximity to each other. The probability of a pattern of ID code proximities being inadvertently duplicated at a single location, or at more than one location, can be made vanishingly small by appropriate ID generation and assignment procedures. Distinguishing information may also include sensor data, including but not limited to accelerometer or gyroscope data, WiFi triangulation or fingerprinting data, GSM signature data, infrared or Bluetooth data, and ultrasonic audio data.

In various embodiments, "calibration" of a light-based positioning system herein refers minimally to the population of the Light IDs database 216 with light IDs installed at a given service location and physical location information for those lights. In an example, calibration of a light-based positioning system, either upon first installation or after the addition or replacement of VLC lights, is performed by having a user of a mobile device equipped with an application having a calibration capacity walk around the indoor service space of the positioning system. The mobile calibration application contains map information for the indoor space, with the positions of the LED light sources overlaid on the map. As the user changes position, they will receive ID codes from various lights. When the user receives an ID code, they will use the map on the mobile app to select which LED light source that they are standing under. Specific lights may be made to blink (e.g., by commands sent through an integrated Bluetooth mesh) in order to facilitate identification of lights by the user. After the user confirms the identity of a light, the mobile application sends a request to the server 208 to match the ID code detected with the light location contained in the lighting plan. In various embodiments, the calibration may be automated by using robots or flying drones to quarter the indoor space, associating light IDs with physical locations and potentially undertaking other calibration-related functions as well, e.g., performing automated, laser-based indoor-surveying operations in order to produce highly accurate position measurements for association with light ID detections. Manual or automated calibration procedures may also be employed to acquire finely-space measurements of light fields, radio fields (e.g., radiated by a mesh of Bluetooth transceivers), or other variables throughout the volume of a served space, a process herein termed "fingerprinting." Thus, calibration minimally includes the association of light IDs with light locations, but may also include the gathering of other data, including fingerprinting.

Calibration of LED light locations can also be achieved via crowd-sourcing. In this method, as mobile devices carried by users move around an indoor space receiving ID codes 206, they send requests to the server 208 containing the light ID code 206 received. The server knows the device's current approximate position based on other positioning techniques such as WiFi, GPS, GSM, inertial sensors, etc. Given enough users, machine learning algorithms running on the server 208 can be used to accurately infer the position of each LED light source. The accuracy of this calibration method depends upon several variables, including number of mobile application users. Various computational techniques, including Bayesian techniques, can be used to combine spatial information from a variety of sources to produce light location estimates that are improved or updated at intervals: for example, light-location estimates from a manual or automated commissioning process can be made more accurate and complete over time by incorporating crowd-source information in an iterative Bayesian process. For example, a light-based positioning system that was manually commissioned at first startup may be subsequently updated by crowd-sourcing as lights are replaced or added.

Figure 3:
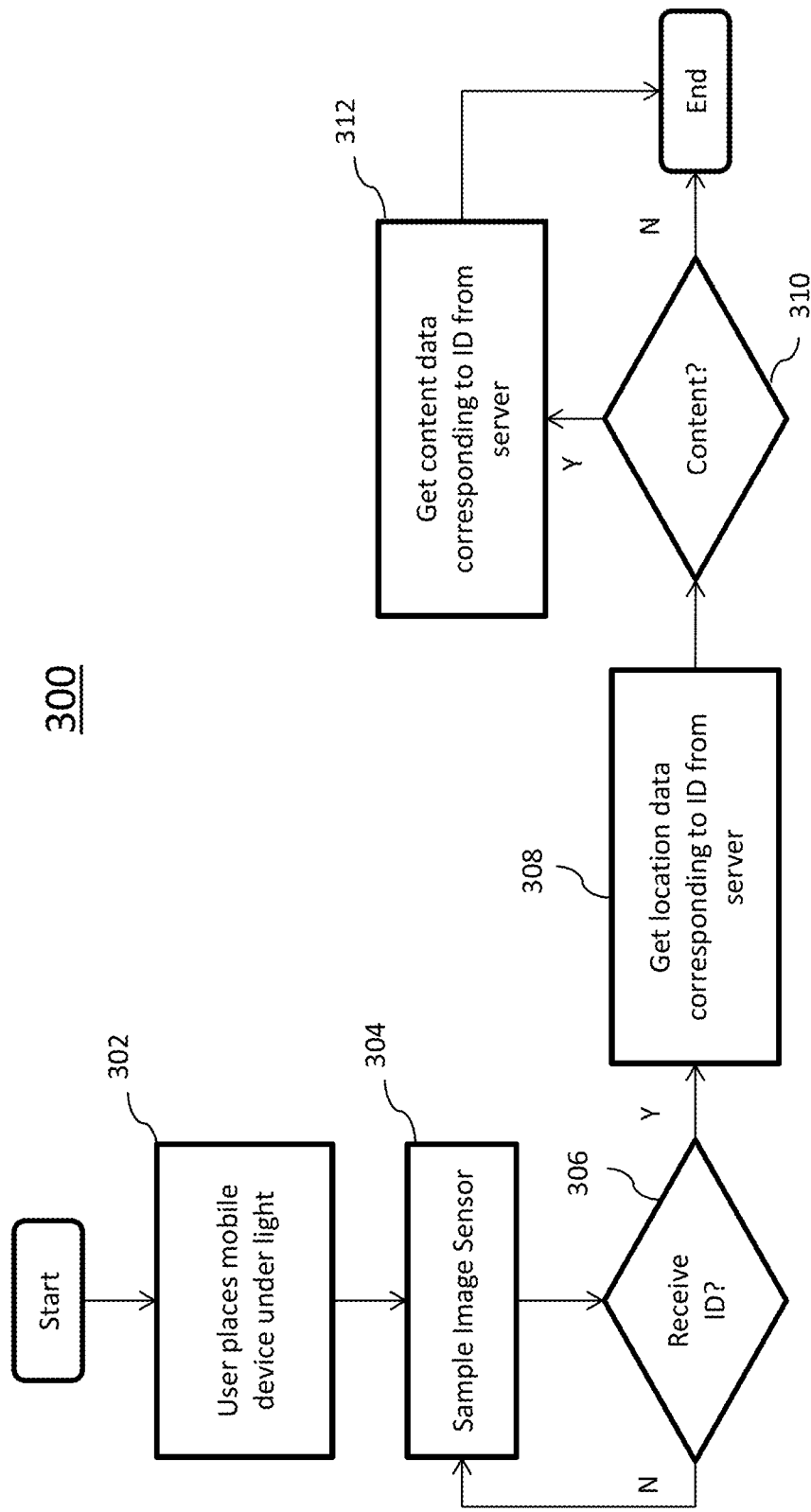
FIG. 3 illustrates the process of a mobile device receiving location and content information via a light-based positioning system.

FIG. 3 is a schematic depiction, according to an illustrative embodiment, of the process 300 of receiving location and content information through visible light. Block "User places mobile device under light" 302 corresponds to the act of physically placing a camera-equipped mobile device underneath a VLC-enabled LED light source, e.g., by pulling the device out of a pocket. The user happens to be standing approximately underneath or adjacent to the LED light source. Block "Sample image sensor" 304 denotes the action, by an app installed on the mobile device, of commanding the embedded digital image sensor of the mobile device to acquire an image and reading the image data from the sensor. Block "Receive ID?" 306 denotes the conditional action to either move forward (if one or more light IDs are detected in the image), or return to "Sample image sensor" 304. Block "Get location data" 308 denotes the transmission of the one or more light IDs to a server and receipt from the server of a location estimate for the mobile device. Block "Content?" 310 denotes an inquiry by the server as to whether content (e.g., ads) exists that is associated with the received one or more ID codes (and/or the location estimate derived from the one or more ID codes) and meets criteria for transmission to the mobile device app. If transmissible content is available, the procedure continues to block "Get content data" 312, where the content is accessed and transmitted to the mobile device; if not, the process ends.

Figure 4:
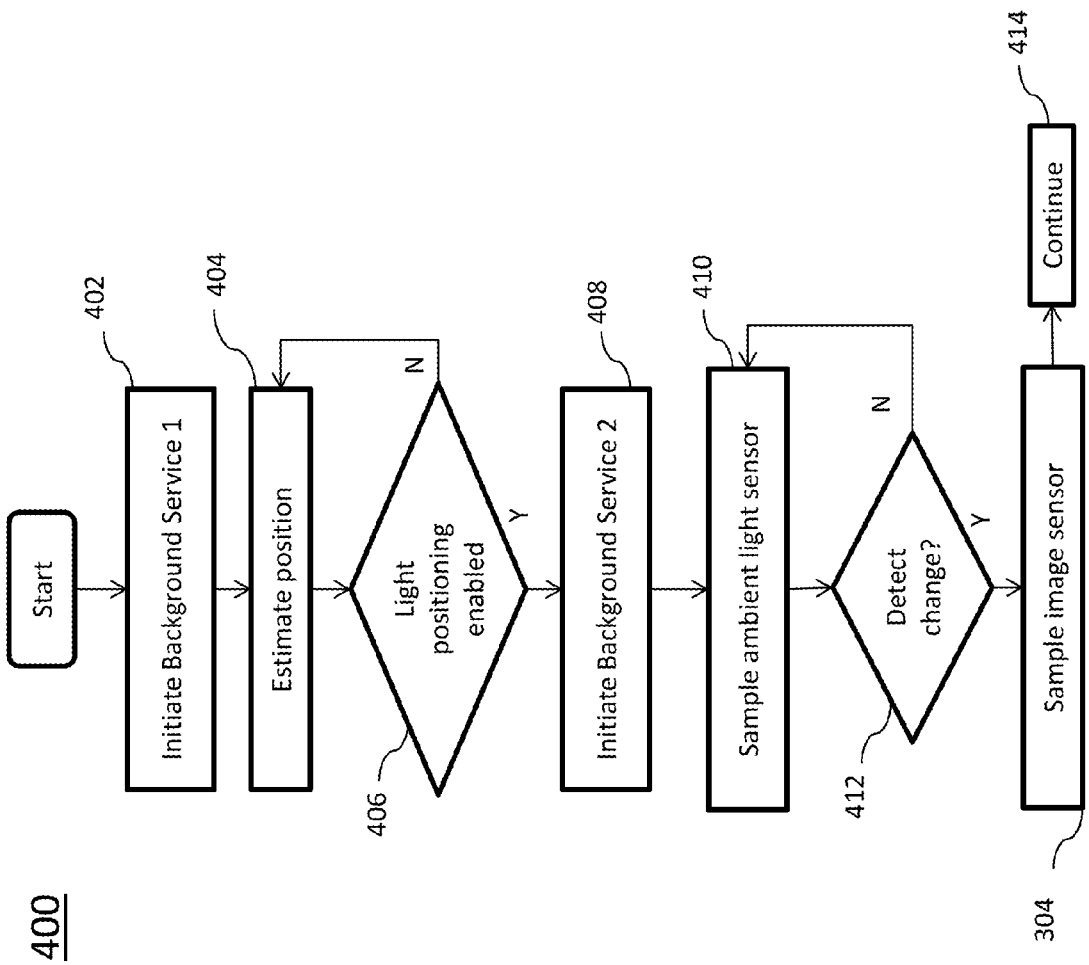
FIG. 4 is a process illustrating background services and how they activate various sensors contained inside the mobile device.

FIG. 4 is a schematic depiction of a method 400, according to an illustrative embodiment, for turning on background services of a VLC location service application running on a mobile device and for determining when to sample an image sensor of the mobile device. Block "Initiate Background Service 1" 402 denotes activation of the first background service running on the mobile device (as, e.g., a capability of a VLC app running on the device). Service 1 is tasked with communicating wirelessly to determine if the mobile device is close to a VLC-enabled area. The wireless communication may comprise radio-frequency communication techniques such as global position system (GPS), cellular communication (e.g., LTE, CDMA, UMTS, GSM), WiFi communications, or other. Block "Estimate Position" 404 denotes a function that samples the wireless communication signal and, based on sampled observations (e.g., RF signal strength measurements, RF transmitter ID codes) decides whether or not the mobile device is close enough to a VLC-enabled area to move to the next service.

Block "Light positioning enabled?" 406 denotes a conditional action to move forward if the mobile device is estimated to be within a VLC-enabled area or to repeat the "Estimate position" function if not. Block "Initiate Background Service 2" 408 is activated if the mobile device is estimated to have entered a VLC-enabled enabled area. Service 2 is tasked with performing the functions that obtain location information from modulated light. Block "Sample ambient light sensor" 412 denotes a function to order the ambient light sensor to begin acquiring images at its inherent frame rate. Block "Detect change?" 412 is a conditional action that moves forward if the Service 2 determines that the sequential image frame data show a change in observed light. The purpose of this conditional is to determine when the sensor has gone from dark to light (e.g., when the user has taken the device out of a pocket). Alternatively or additionally to measuring changes in image content, Service 2 can also look for absolute brightness values in image content (obviating the need to compare images) and can test for mobile-device accelerometer measurements above a fixed threshold (e.g., to determine when the user has taken the device out of their pocket). If "Detect change?" produces an affirmative, the method 400 moves to block 304 "Sample the image sensor," after which block 414 "Continue" denotes continuation of the method of FIG. 3 from block 304.

Figure 5:
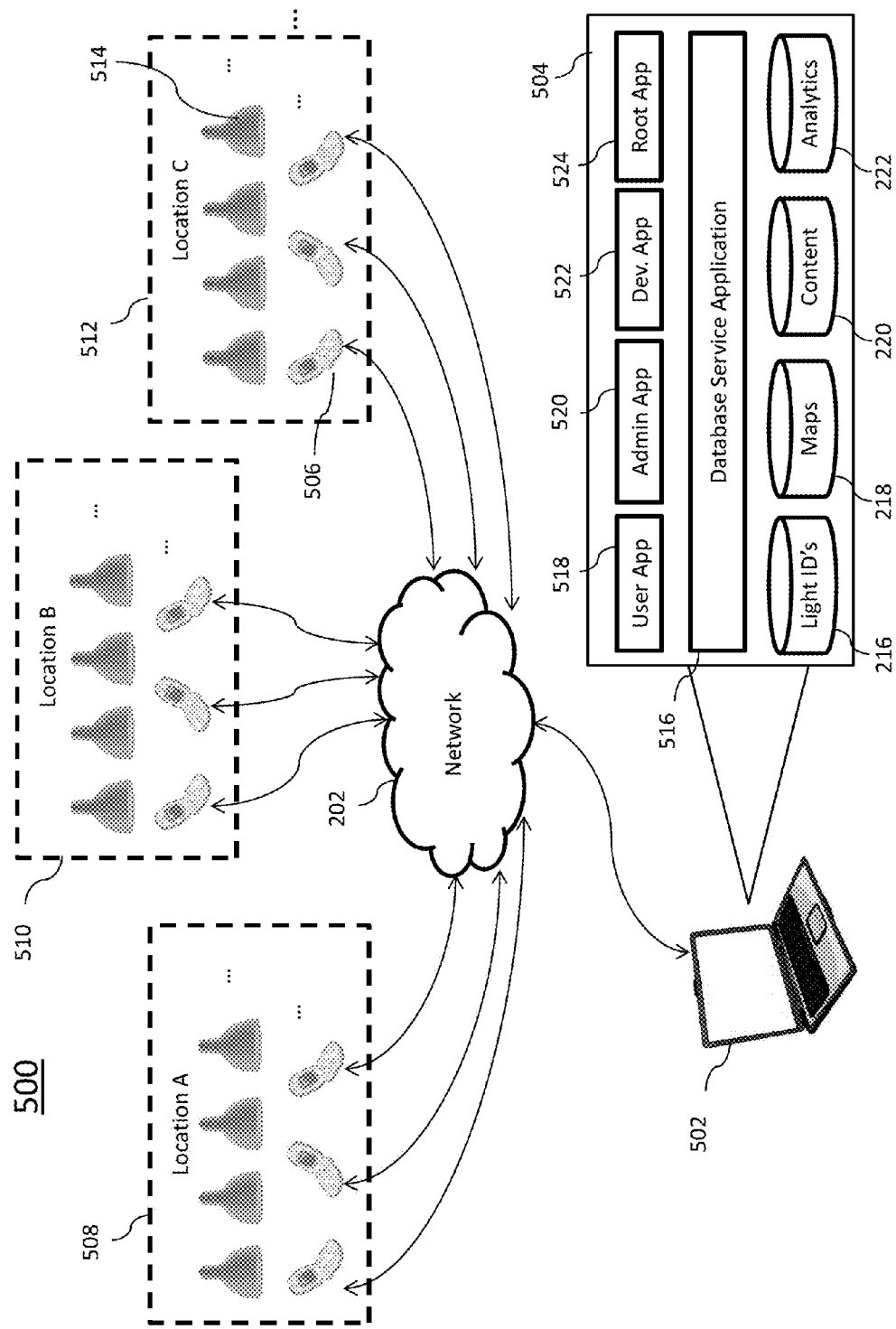
FIG. 5 illustrates a light-based positioning system in which a client device implements an informational service capability.

FIG. 5 schematically depicts, according to an illustrative embodiment, aspects of a light-based positioning system 500 in which a client device 502 implements an informational service capability 504 of the system 500. The network 202 is a generic local or remote network, or hierarchy of networks, used to connect mobile devices (e.g., mobile device 506) at locations A 508, B 510, and C 512 with the service capability 504. Each location 508, 510, 512 contains multiple LED light sources (e.g., source 514), each of which broadcasts a unique VLC ID code. The client 502 can access a database service application 516 that implements multiple client privilege levels for different levels of access to databases 216, 218, 220, 222. These access levels are implemented by corresponding apps. These access apps include User 518, which serves general front-end system users; Administrator 520, serving users usually at an IT or operations management level at an installation; Developer 522, enabling access to the application programming interfaces of the system for custom application development; and Root 524, which enables master control over other user categories and access to everything contained in the databases 216, 218, 220, 224.

In typical operation of the system 500, mobile devices in locations 508, 510, 512 detect ID codes from lights and send the codes through the network 202 to the Database Service Application 516 through User app 518. A mobile device thus obtains read-only access to Maps 218 and (conditional on various criteria administered by the Database Service Application) Content 220. The Database Service Application has built-in write access to Analytics 222 in order to record the behaviors of the accessing mobile device.

In another mode of operation of system 500, the client 502 connects to the Database Service Application via an appropriate access app 518, 520, 522, or 524, enabled via a password-authorized login screen. Clients with administrator permissions have read/write access to Light IDs 216, read access to maps 218, read/write access to Content 220, and read access to Analytics 222. Clients with developer permissions have read access to Light IDs 216, read access to Maps 218, read/write access to Content 220, and read access to Analytics 222. A client with root permissions has read/write access to all databases. In various embodiments, a user may access the client device 502 at any permissions level through a device communicating with the network 202, e.g., a mobile device or a computer at a remote location.

DPR Demodulation Techniques

VLC light sources may produce patterns of stripes in rolling-shutter CMOS camera images. Image processing can be used to extract transmitted signal from striping. For example, consider a room containing five VLC light sources that are sinusoidally brightness-modulated at 500 Hz, 600 Hz, 700 Hz, 800 Hz, and 900 Hz respectively. Each sinusoid, also known as a DPR tone, can be used to identify its distinctive source (and thus proximity to the source and thus the approximate location of the camera). Herein, we presume that the exposure parameters of the CMOS camera exposed to light from the five VLC light sources are such as to enable the appearance of unaliased, detectable striping artifact in the resulting images (e.g., the CMOS camera exposure time is not so short as to undersample any of the sinusoidal light signals).

Described herein are two illustrative methods for extracting DPR tone information from a rolling-shutter CMOS images. One possibility, when a single tone is present, is to use line-detection algorithms to identify the pixel width of the stripes, which directly corresponds to the transmitted DPR tone frequency. This stripe width is then used to access a lookup table that associates width and transmitted frequency and determines the transmitted tones.

Figure 6:
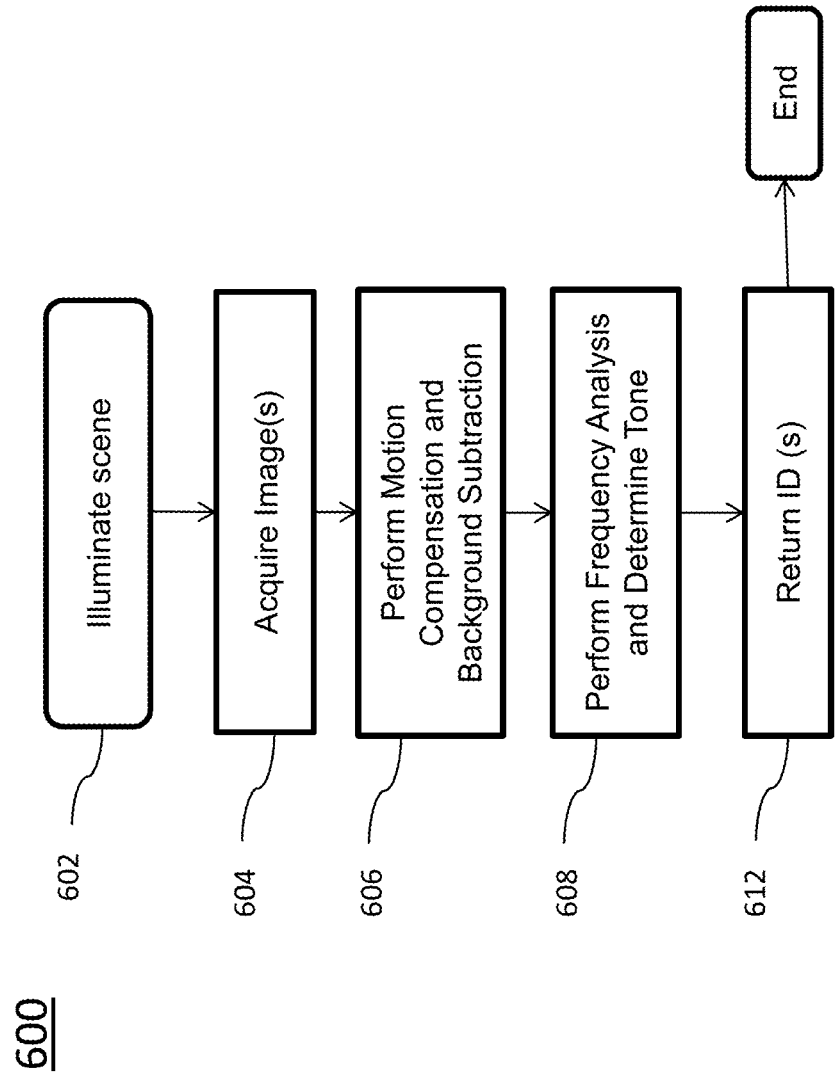
FIG. 6 is a high level flow chart of an algorithm for determining tones embedded within a DPR illuminated area, according to some embodiments of the present disclosure.

FIG. 6 schematically depicts a second method 600 for performing DPR demodulation according to one illustrative embodiment, based on image pre-processing and Fourier frequency analysis (i.e., fast Fourier transform, "FFT"). Block "Illuminate scene" 602 denotes the illumination of a scene, e.g. a portion of a store interior, by one or more VLC light sources and the exposure of a rolling-shutter CMOS image sensor of a mobile device to a lighted scene. In this context, "scene" refers to any area within view of the camera. Block "Acquire Image(s)" 604 denotes acquisition of one or more images by the image sensor. In the one or more images, the brightness of any given pixel is partly scene-dependent, that is, depends on both the details of the scene as well as on the time-varying VLC illumination. Scene dependence means that pixels in the same row of the image (exposed simultaneously, thus not exposed to different levels of time-varying VLC illumination) will not all have the same brightness, and also that the relative brightness of different image rows is not solely dependent on the modulated illumination. If one calculates the FFT of such an image, the frequency content of both the scene and of any DPR tones modulating the illumination will be present.

To recover DPR frequency content independently of the scene, a background subtraction algorithm may be employed to essentially remove the scene, leaving (ideally) only DPR striping artifact. In an example, an implementation of a background subtraction method uses a video sequence of images. For any DPR tone frequency that is not an exact multiple of the video frame rate, the DPR bands will shift position from one frame to another. Therefore, if a sufficient number of video frames are averaged, the banding effect due to periodic modulated modulation will be reduced to a constant value added to all pixels of the averaged image. If the video is of a motionless scene, the averaged image will reveal only the underlying scene. This underlying scene (i.e., the background) may be subtracted from any individual frame to leave only the banding from illumination modulation. The effects of background scenes may also be mitigated, alternatively or additionally, by deliberate defocusing of the mobile device camera (a form of low-pass image filtering).

For video of a scene in motion, simple averaging of video frames will not accurately yield the underlying scene background. In such a case, motion compensation is necessary. By using standard feature-recognition techniques (e.g., phase correlation) that will be familiar to persons versed in the art of image processing, scene motion between video frames (for example, shifting or rotation of the whole scene due to camera movement) may be detected, after which each video frame may be shifted or transformed to cause it to approximately overlie the previous frame as much as possible. After performing these compensatory transforms on each frame in a series, the resulting frames may be averaged to produce a scene background image that may be subtracted from one or more of the frames to reveal DPR striping. In FIG. 6, block "Perform Motion Compensation and Background Subtraction" 606 denotes these operations.

After background subtraction, analysis of an FFT can be used to recover DPR tone or tones from any one frame or from an averaged frame. As will be clear to persons familiar with the science of signal processing, given a series of amplitude measurements of a signal containing one or more periodic components, the FFT of the series will feature peaks at the frequencies of the periodic components. Automated peak-finding techniques may be applied to such an FFT to identify the frequencies of any periodic components. Block "Perform Frequency Analysis to Determine Tone(s)" 608 denotes the performance of such analysis. In FIG. 6, the block "Return ID(s)" 610 denotes the matching of one or more detected DPR tones to specific VLC light ID numbers, which can in turn be associated with physical light locations.

Figure 7:
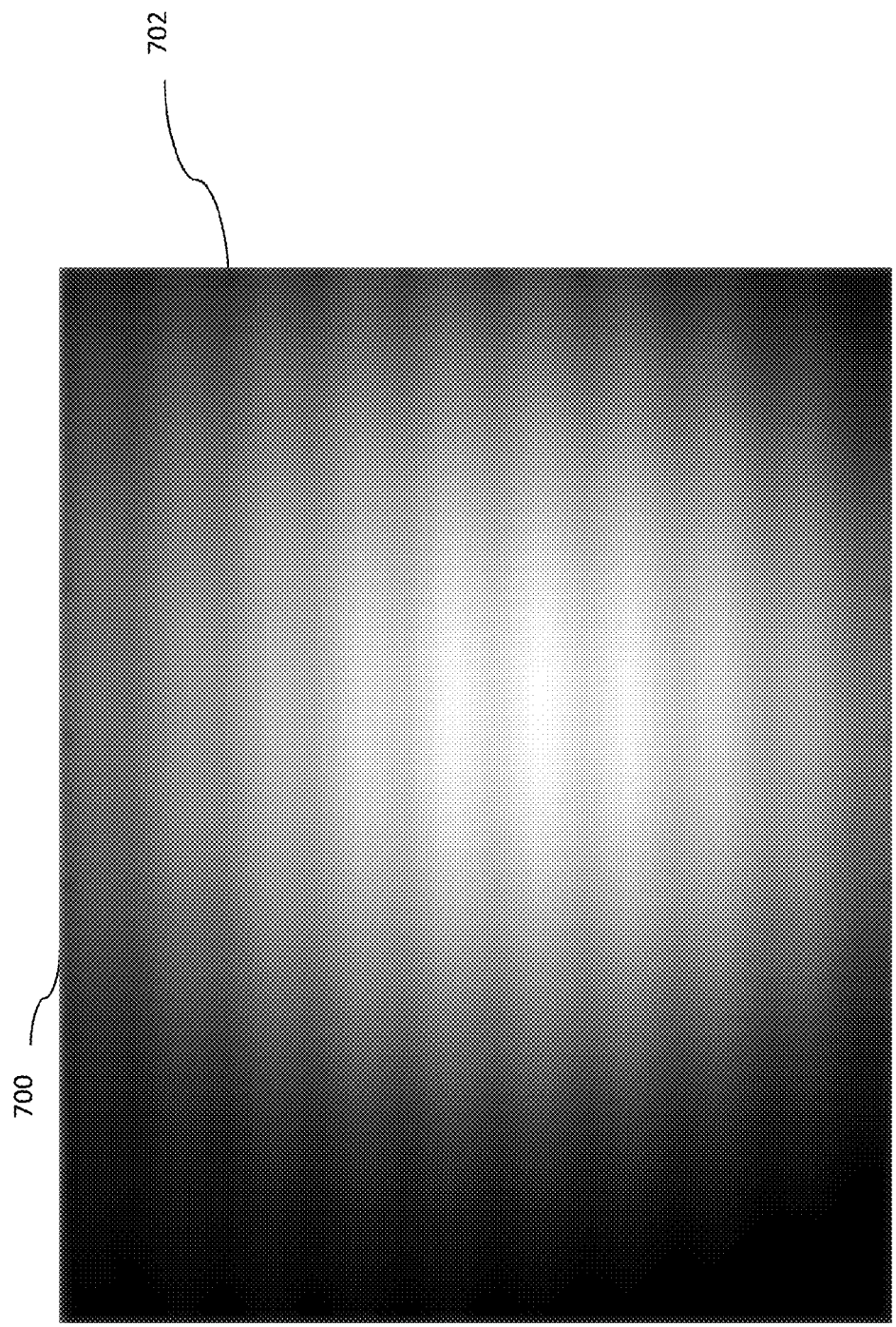
FIG. 7 is a photograph of a surface under illumination from DPR modulated signals, according to some embodiments of the present disclosure.

FIG. 7 contains a sample image 700 of a surface illuminated by a light source undergoing single-tone (in this case, 700 Hz) sinusoidal DPR modulation. The image 700 was recorded from a mobile device using a rolling shutter CMOS camera. The stripes (e.g., stripe 702) on the image 700 are DPR artifact.

Figure 8:
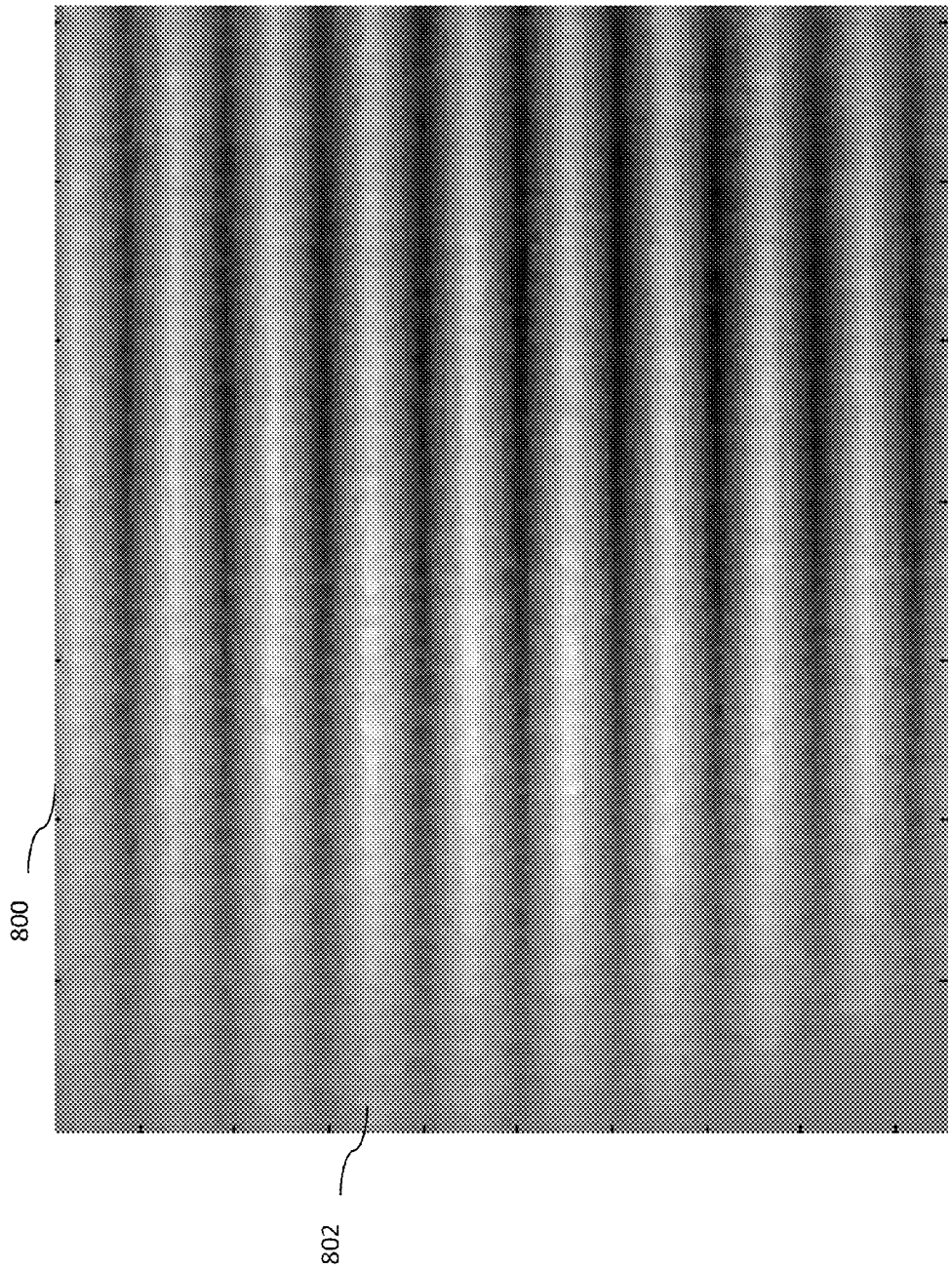
FIG. 8 is a post-processed image of a DPR modulated scene after performing background subtraction, according to some embodiments of the present disclosure.

FIG. 8 shows an image 800 derived by performing background subtraction on the raw image data of FIG. 7. The result is an image 800 of alternating dark and light stripes (e.g., stripe 802) that reflect sampling of the transmitted DPR signal. Thanks to background subtraction, the stripes are more pronounced than in the raw image data of FIG. 7.

Figure 9:
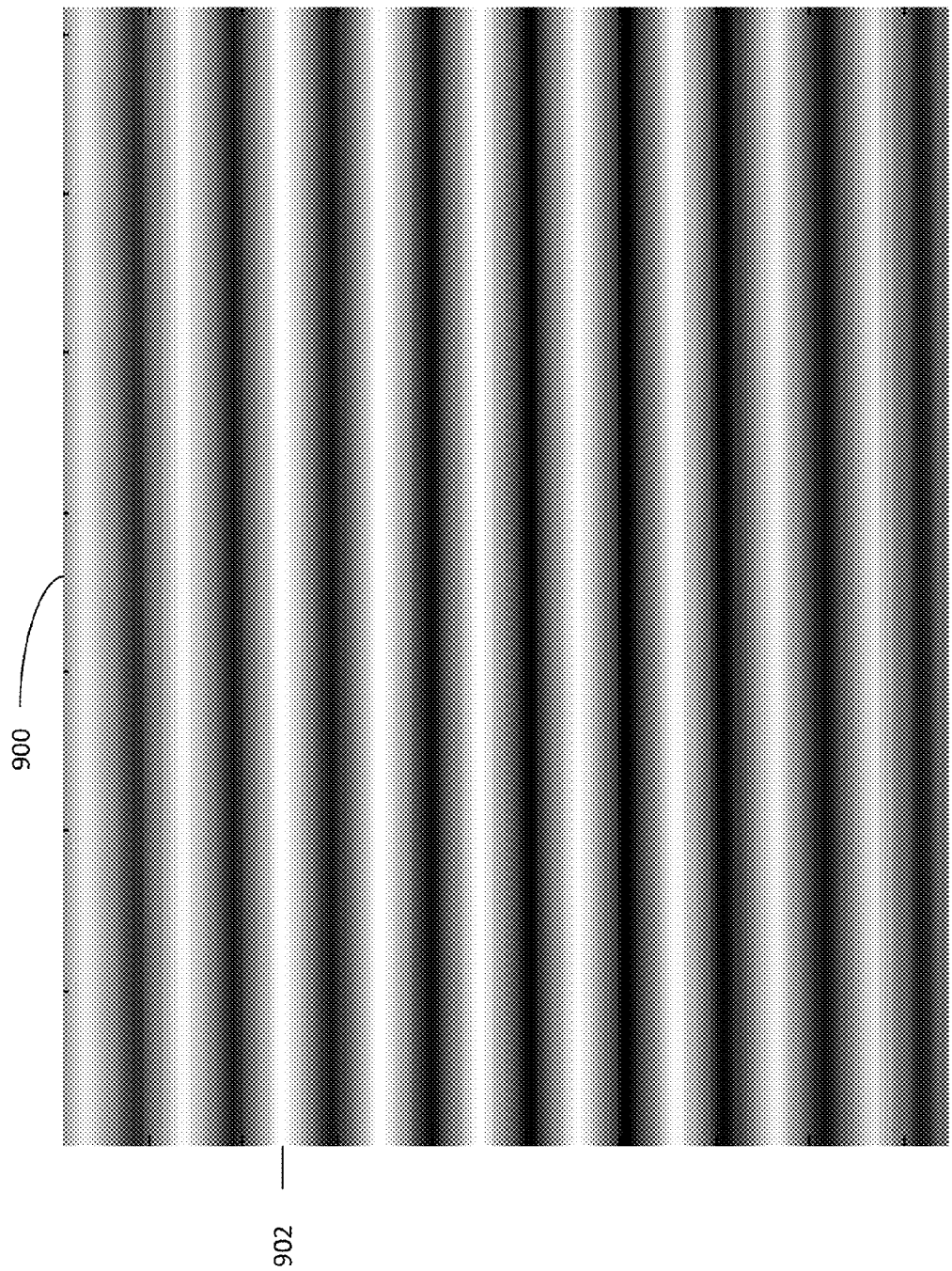
FIG. 9 is a post-processed image of a DPR-modulated scene after row averaging, according to some embodiments of the present disclosure.

Imperfect background subtraction and/or nonuniform illumination may lead to non-identical pixel values across DPR stripes: this effect is visible in image 800 as non-uniform brightness along each stripe. Taking FFTs of row values along different columns of such an image may produce different results, leading to ambiguity. One compensatory method is to assign the average pixel value for any given row to every pixel in that row. FIG. 9 displays the image 900 that results from applying row averaging to the background-subtracted image 800 of FIG. 8. DPR stripes (e.g., stripe 902) are highly visible and consistent. All columns of image 900 contain the same information, i.e., are simply repetitions of a single, averaged column, so only the averaged column need be retained for FFT.

Figure 10:
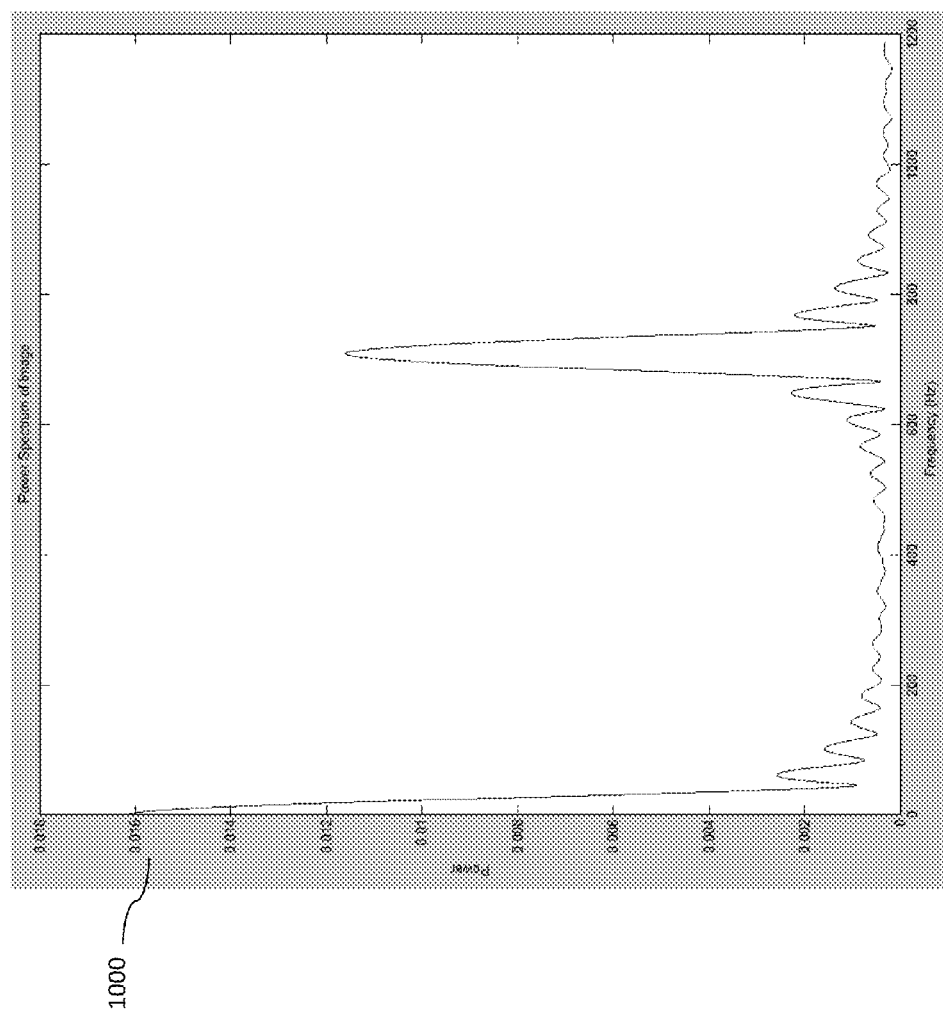
FIG. 10 is a plot of the 1-D spectral content of a DPR-modulated image, according to some embodiments of the present disclosure.

FIG. 10 shows the FFT 1000 of a column from row-averaged image 900 of FIG. 9.

There is a peak at the DPR tone frequency of 700 Hz and a peak at 0 Hz. The 0 Hz (DC) peak does not correspond to a DPR signal; it may be removed either by low-pass filtering of the amplitude data of FIG. 9 or by employing a peak-detection algorithm that discards peaks at or near 0 Hz.

Figure 11:
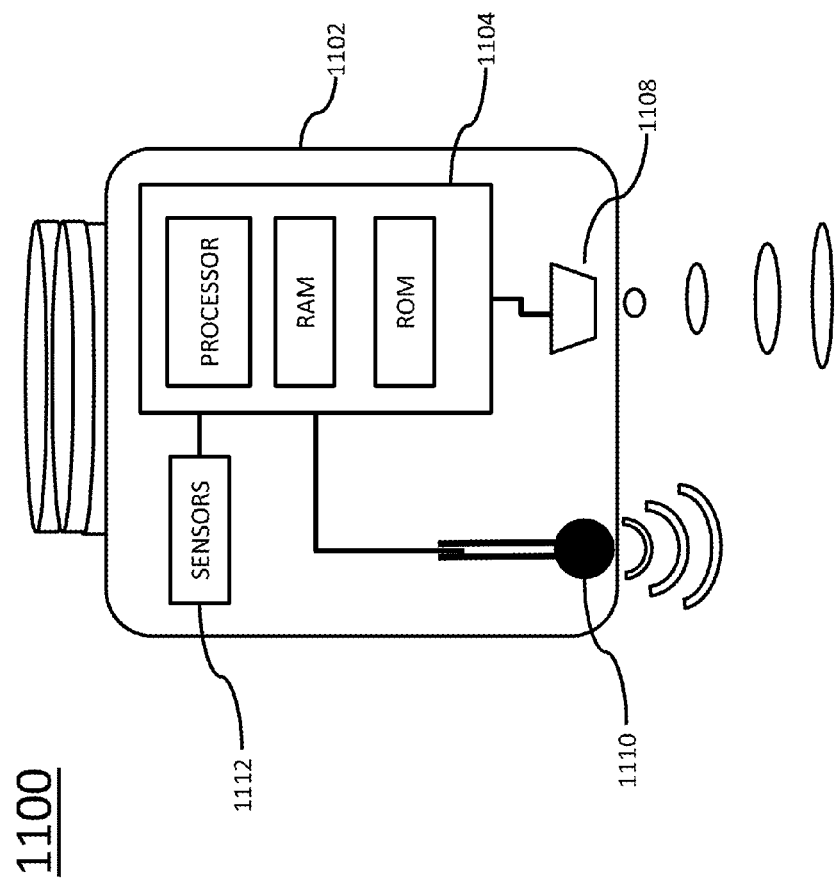
FIG. 11 depicts an embodiment of a radio frequency communication enabled light for transmitting modulated light in accordance with various embodiments of the invention.

FIG. 11 depicts an embodiment of a radio frequency communication enabled lighting device 1100 for transmitting modulated light to facilitate position determination of proximal computing devices, such as mobile phones, tablets, and the like. A modulating beacon light source may be combined with an RF communication capability, such as a Bluetooth capability or the like, to facilitate combined light and radio frequency (e.g., wireless) signal communication between the light and proximal devices. Detailed embodiments of a radio frequency communication means (e.g., a WiFi signal function) advantageously combined with a modulating beacon light for position determination of proximal mobile devices are described herein.

Modulating light source 1102 may include a processor 1104, such as a microcontroller, that may be configured to execute programs and process data that facilitate modulation of light from one or more LED lights 1108. The processor 1104 may be connected to a radio frequency (RF) transmit/receive antenna 1110 that may facilitate communication over wireless RF signals to other similarly equipped proximal devices, such as other modulating light sources, personal mobile devices, computing devices generally, RF equipped items such as appliances, tools, entertainment devices, RF tags, RF enabled network access points, multi-radio devices, and the like.

The modulating light source 1102 of FIG. 11 may further include one or more sensors 1112 for detecting aspects of the environment, including electromagnetic emissions from nearby computing devices. The sensors 1112 may be connected to the processor 1104 to facilitate collection, analysis, and communication of sensor data and/or data derived from the sensor data. Sensors may include ultrasonic sensors, video sensors, audio sensors, image sensors, optical sensors, temperature sensors, humidity sensors, air quality sensors, motion detection sensors, chemical sensors, radio frequency sensors, and the like. While the aforementioned sensor examples are contemplated, so are any other types of sensor that may detect an aspect of an environment into which the modulating light source 1102 may be deployed.

An RF enabled modulating light source 1100, such as the one depicted in FIG. 11, may facilitate simultaneous Bluetooth transmission and light modulation. Position detection is one particular example of an application for such an RF enabled modulating light source 1100. In an example, RF communication between the RF capability of the light 1100 and nearby mobile devices may facilitate enhanced position detection, as will be described herein. Communication among RF enabled modulating lights 1100 as well as communication between an RF enabled modulating light 1100 and a mobile device that is adapted for communication with an RF enabled modulating light 1100 may enable capabilities in position detection that may not possible or at least not as efficient with modulation of light alone. One exemplary capability is bi-directional communication. While position detection via modulating light enables mobile devices to determine and thereby report their position over a network (e.g., WiFi or cellular) to web servers, bi-directional RF communication allows the detection of particular mobile devices by the light 1100. When combined with a potential mesh-type network of RF enabled modulating lights, it is envisioned that a wide variety of data, content, inquiries, promotions, and the like may be effectively distributed among mobile devices that have been identified as connected to at least one RF enabled light 1100.

More generally, a network including or consisting essentially of RF enabled modulating light sources 1100 may enable the control and sensing of numerous aspects of the VLC and non-VLC aspects of the lighting function of such a network: any form of control and sensing that would be possible through direct, hard-wired connections to the nodes of such a network will in general be feasible through the RF aspect of a network of RF enabled modulating light sources.

RF communication capabilities typically comply with some network-like standard, such as Bluetooth. As an example, a Bluetooth network standard includes unique identifiers for each Bluetooth device that is connected to a network. In a similar way, each RF enabled modulating light 1100 may be configured with a unique RF identifier. This RF identifier may be used when determining a position of a properly equipped personal mobile device (e.g., a personal mobile device with an RF capability, a camera capability, and a mobile device application for interacting with at least these two capabilities). While a capability to receive and process such an RF identifier may facilitate coarse device location, it is quite common for two or more RF identifiers to be detectable in any of several positions due to the natural overlap of RF signals from nearby lights. Therefore RF identifiers alone may not be sufficient for fine position resolution. However, by combining RF identifier detection with modulating light detection techniques, improved accuracy and performance may be achieved.

One such way that improved performance may be achieved is through light namespace sharing. Because detection of a light identifier from a modulated light might require repeatedly receiving the modulated light to detect the specific identifier, when an RF identifier is used in combination with a modulated light identifier, determination of the modulated light identifier may be accelerated. This may be based on a known relationship between RF identifiers and modulated light identifiers, such as through a lookup function that accesses a dataset of identifiers that associates RF identifiers with modulated light identifiers. Even if two or more RF identifiers are simultaneously detected due to RF signal overlap, determination of the corresponding modulated light identifier may be much faster because the possible number of modulated light identifiers can be limited to those found in the lookup function for the simultaneously detected RF identifiers.

Figure 12:
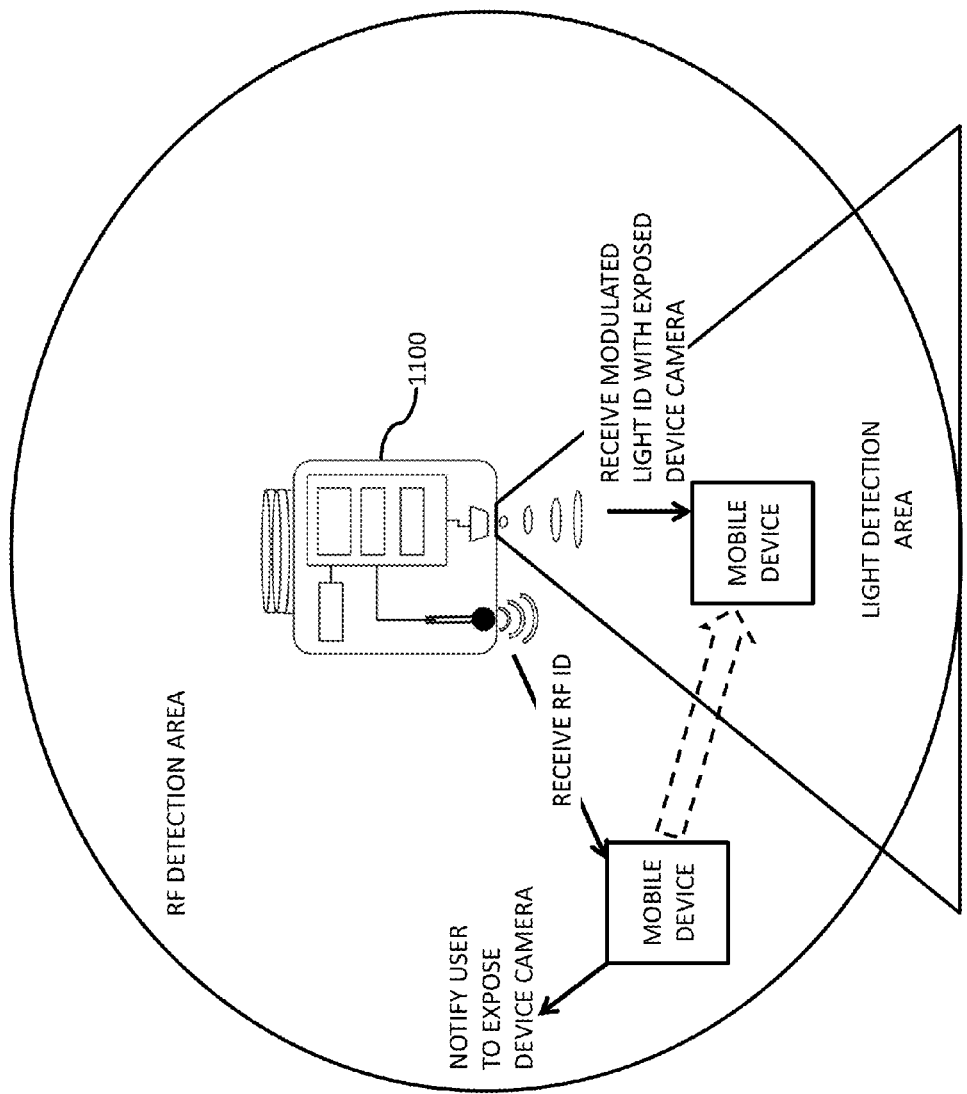
FIG. 12 depicts early detection of a radio frequency identifier to facilitate detection of a modulated light identifier in accordance with various embodiments of the invention.

FIG. 12 depicts techniques for taking advantage of a wide ranging radio frequency communication detection area to enhance the performance of position detection based on light emissions from a modulated beacon light 1100. Another benefit of combining RF identification with modulated light identification involves a capability to push notifications to a user of a mobile device that is coming into proximity of a modulated lighting environment due to the generally wider area of access to RF communication signals than modulated light signals. Therefore, detection of an RF identifier transmitted from an RF enabled modulating light, such as the light 1100 of FIGS. 11 and 12, may enable activation of a mobile-device function, such as a mobile device application and the like, to notify the user of his/her proximity to a modulating light for position detection. User notification may include pushing a notification to a user of a mobile device to enable modulated light-based position detection when a function on the mobile device detects the presence of a transmitted identifier of an RF module that is integrated into the light. Such notification may include at least one of an audio and a video notification to the user to expose the mobile device's camera so that a modulated light detection application that uses the device's camera may receive the modulated light.

Figure 13:
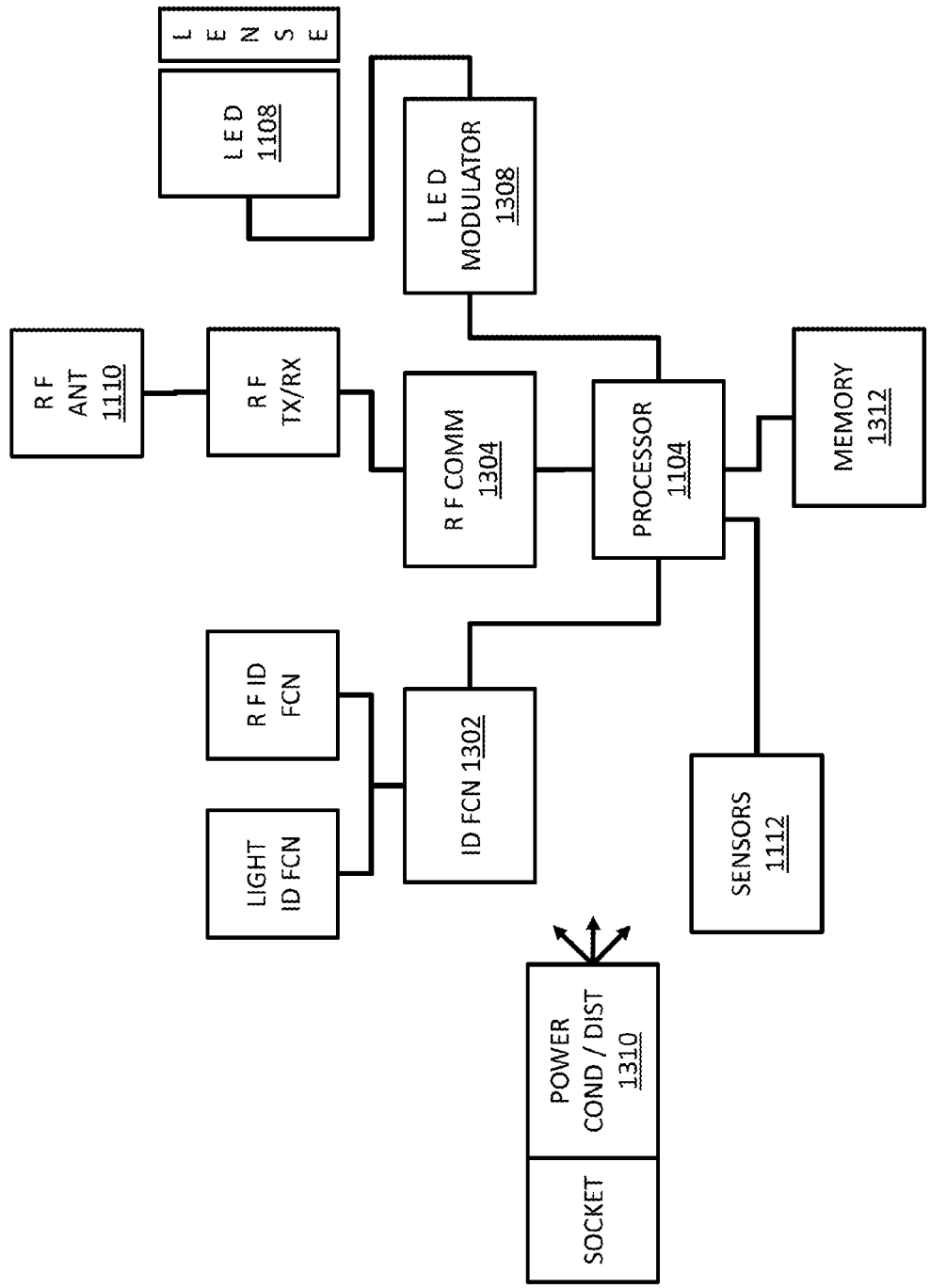
FIG. 13 depicts a schematic of logical functions and features of a radio frequency communication enabled light for transmitting modulated light in accordance with various embodiments of the invention.

FIG. 13 depicts logical, functional, and structural features of a radio frequency communication enabled modulating beacon light source 1100, including a processor 1104, LED light 1108, RF antenna 1110, sensors 1112, ID function 1302 that may handle modulated light and RF identifier functionality, RF communication features 1304 for communicating over the RF radio signal with other lights 100 and/or mobile devices, LED light modulator 1308, power distribution 1310 for providing power to the light features from the power mains provided to the light through its socket connection, and a memory 1312 that may be used for program storage, data storage, and the like. In an example, RF ID function data and Light ID function data that may be used by ID function 1302 may be stored in the memory 1312. In another example, sensor data captured via sensors 1112 may be stored in the memory 1312. In yet another example, data received from mobile devices via the RF transceiver (TX/RX) interface may be stored in the memory 1312.

Figure 14A:
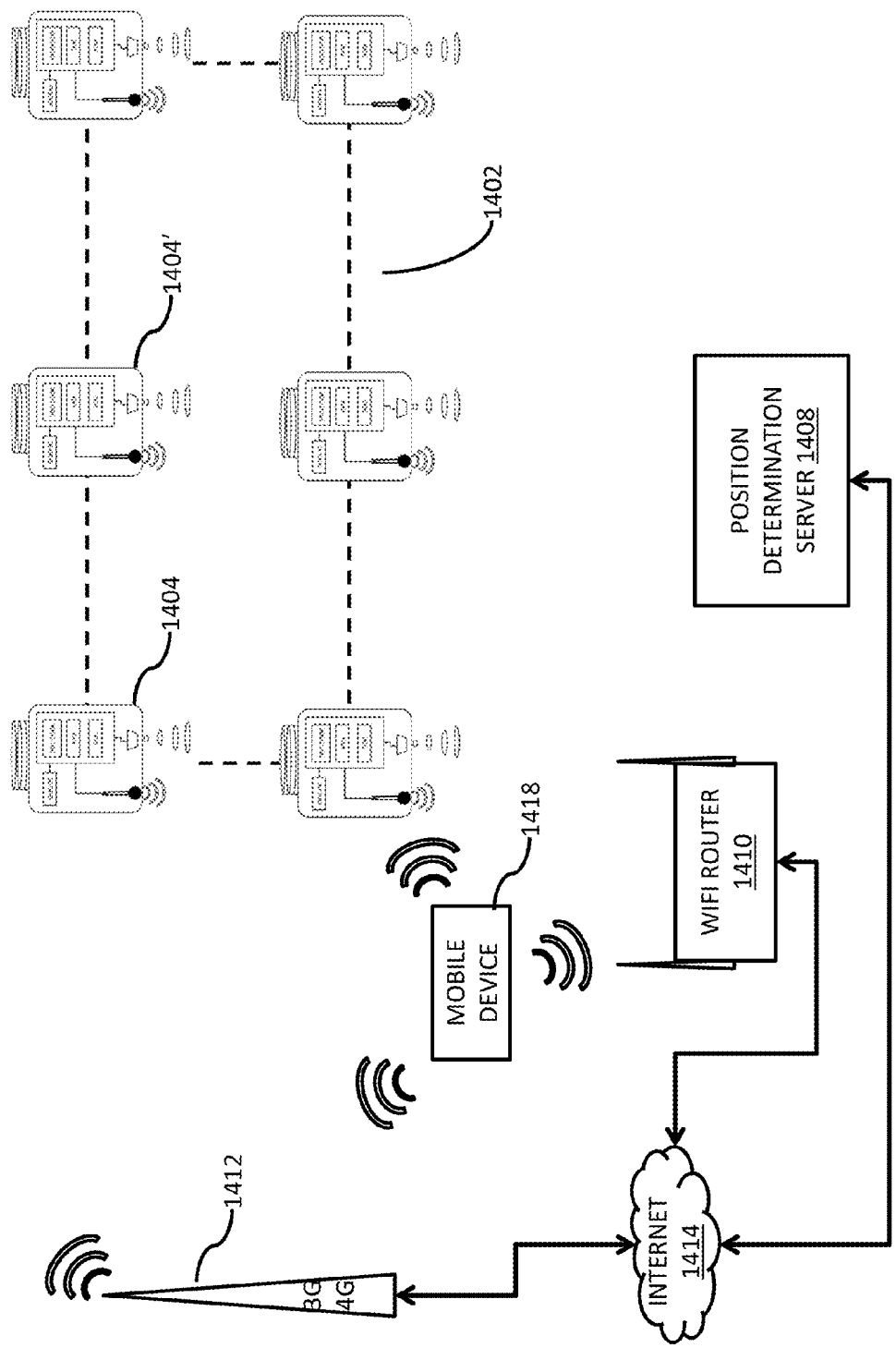
FIG. 14A depicts a configuration of RF enabled modulatable beacon lights arranged in an ad hoc mesh-type network and optionally/temporarily connected to Internet resources through a nearby mobile device in accordance with various embodiments of the invention.

FIG. 14A depicts a configuration of RF enabled modulatable beacon lights arranged in an ad hoc mesh-type network 1402 and optionally/temporarily connected to Internet resources through a nearby mobile device 1418. Modulatable lights may be configured so that a modulated light signal provided from each light may be distinguished from modulated light signals produced by nearby lights, such as by lights in the same building, room, hallway, and the like. When such modulating lights are configured with RF capability they may communicate configuration information from light to light.

A network capability as depicted in FIG. 14A may include access through a mobile device or other RF enabled device to external (non-mesh) networks. In the example of FIG. 14A, a mobile device that may have Bluetooth and WiFi and/or cellular communication capabilities may act as a gateway for communicating data to/from RF enabled modulatable beacon lights. If the lights are configured into a network, it may be possible for an Internet resource, such as a position determination server 1408, to communicate to a networked light 1404 or 1404' by passing data through the Internet 1414 and a network access point, such as a cellular tower 1412 or a WiFi router 1410 that may be in communication with a mobile device 1418. If and/or when the mobile device 1418 is in Bluetooth radio signal proximity to one of the networked lights, an indirect connection may be made between the server 1408 and a light 1404. This may allow communication of information collected from mobile devices via the RF capability (e.g., identities of devices/users that pass through the area) by one of the lights to a remote server, such as server 1408. Although a mobile device 1418 is described as the primary gateway from the light mesh network to a wider area network, any other suitable network-network gateway may be used. A network-network gateway may be configured in close proximity to one of the networked lights that may enable communication from at least one of the lights through networks such as Ethernet, PoE, Zigbee, and the like. In various embodiments, software installed on a mobile device that is in contact with a non-mesh communications network (e.g., an app voluntarily installed on a smart phone that is connected to the Internet via WiFi and/or to a cell phone network) facilitates the mobile device to act as a network-to-network gateway. In an illustrative embodiment, BLE packets sent by a VLC+RF mesh node to a phone are retransmitted (undecrypted) as payload via the telephone capability of the phone to a server/controller associated with the mesh. The packets may contain any data which the mesh is capable of circulating. In another illustrative example, a mobile device (e.g., tablet computer) contains both (a) a Zigbee transceiver capable of communicating with MESH of Zigbee low-power nodes, (b) an RF transceiver capable of communication with the RF capability of nodes in a VLC+RF mesh, (c) an app enabling the translation between the Zigbee informational format and the informational format of the VLC+RF mesh. In effect, items in communication with the VLC+RF mesh would be enabled to "appear" as Zigbee items to the Zigbee network, and vice versa. In these and various other embodiments that comprise a "bridging" capability, whether through mobile devices or dedicated, stationary, multi-radio devices, a VLC+RF mesh may be compatibly combined with a wide range of extant or traditional wireless/control systems that may coexist with the VLC+RF mesh in a working space or that may be non-collocated with the VLC+RF mesh.

Use of mobile devices as gateways between a VLC+RF system and another network (e.g., wireless mesh) may be opportunistic: e.g., mobile devices of customers who have installed an app related to the VLC+RF mesh may be opportunistically enlisted as gateways as the devices move in and out of the mesh's working space. Such a gateway function may be used, for example, to effectively increase the bandwidth of data reporting by mesh nodes to a server/controller, since under various conditions packets can be communicated more quickly through a gateway than through a series of mesh-node retransmissions as per the illustrative protocol discussed herein with reference to FIGS. 21A-21D. Gateway transmission may be used alternatively or additionally to transmission through a mesh controller node connected to a non-mesh network: e.g., upon failure of an external-connection node or device, a mesh may still be enabled to communicate with a server/controller by means of a gateway function, carrying on its various functions while calling for diagnosis and repair of the failure. The bridging and gateway functions of various embodiments are exemplified in FIG. 23.

In various embodiments, the position determination server 1408 is a general-purpose mesh server and controller (back end) that performs functions other than or additional to position determination, issuing commands to the RF and/or lighting capabilities of one or many network nodes, polling network nodes for information garnered from sensors, and so on. A general-purpose back end may be enabled to understand the locations, movements, and other aspects of mobile devices and other assets within the service area of the VLC+RF network mesh. Illustrative capabilities include inventorying, assisted navigation and reality augmentation, RF asset tag location tracking, robot and drone tracking, time-of-day-based control, real-time user-tailored control of active assets (e.g., video displays), security management, routine customer assistance, emergency assistance, ambience adjustment (e.g., music, lighting, and other environmental adjustments in response to sensed user behaviors), and more. In another example, routine scan (advertising) packet broadcasts from Bluetooth-capable mobile devices are detected by the RF capability of nodes, enabling a mode of position estimation of the mobile device based on received signal strength indication (RSSI) and/or node detection pattern. Such estimates may be combined with estimates based on detection of VLC beacons by a light-sensing capability of the mobile device, e.g., after the device user is prompted to expose their device to light based on detection of their presence by the RF mode.

Figure 14B:
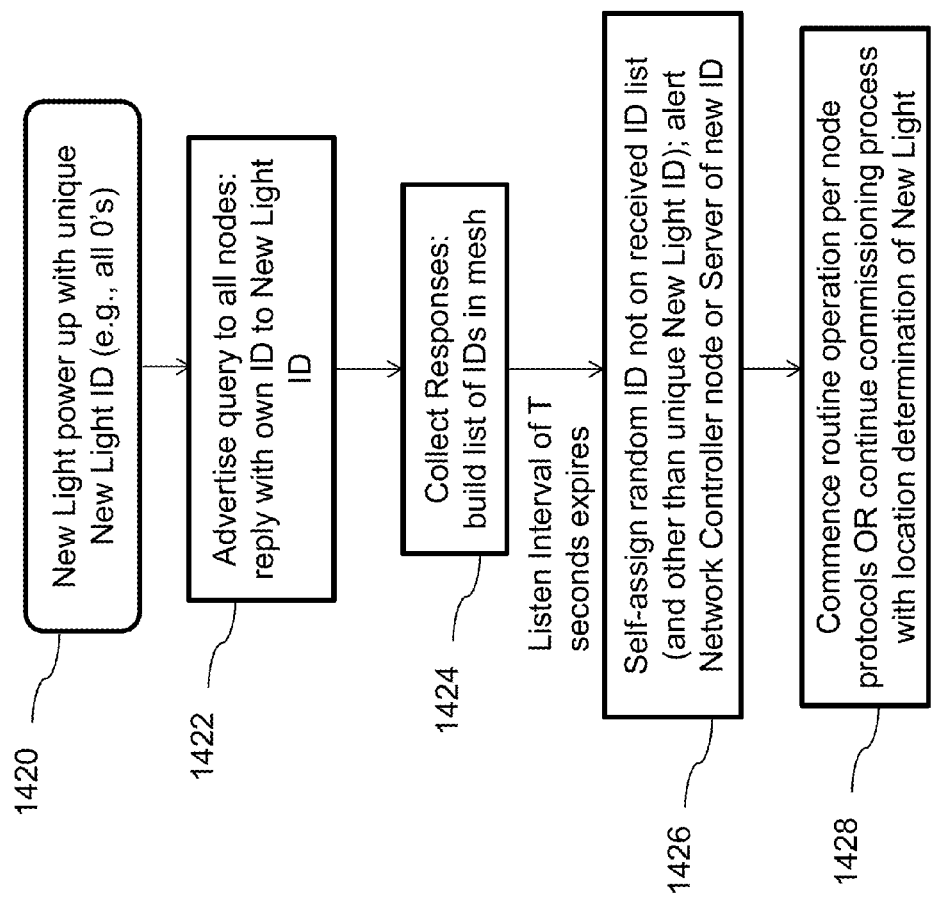
FIG. 14B depicts the logic flow of an illustrative method for self-ID assignment of a light newly installed in a mesh in accordance with various embodiments of the invention.

Reference is now made to FIG. 14B. Communication from light to light, and of the light network 1402 with a server 1408 as described above with reference to FIG. 14A, may allow automatic configuration of identification data for each light so that when a new or replacement light is added to an existing ad hoc network of lights, the processor in the light may communicate via the RF capability with other lights to determine which light identifiers are already in use and so ensure that the new light adopts a distinctive identifier (ID). Automatic configuration of a light may facilitate determination by a newly added light that it is new to the network and may also facilitate determining which light was most recently added by communicating initialization and/or configuration data over the mesh-like network with the other lights. This may also facilitate determining a positioning of the light if the lights are installed in a known order, such as starting at one end of an aisle and proceeding down the aisle. Similarly, RF IDs may be changed dynamically yet remain unique within a configuration via light-to-light RF ID communication via such a network. FIG. 14B schematically depicts steps of an illustrative method, according to some embodiments, of self-commissioning of a light (i.e., New Light) just added to an existing network 1402 of one or more lights already commissioned. Upon first power-up 1420, New Light possesses a factory default ID (e.g., a string of zeroes) possessed by all new lights, and a firmware pointer causing New Light to undertake Action One 1422: Advertise a query to all nodes in network, asking them to reply with own ID with packets addressed to New Light ID. New Light then performs Action Two 1424: For a time interval T (e.g., one minute), long enough to give all nodes in a mesh 1402 of maximal size time to reply, listen for responses from mesh nodes with IDs, and during that interval, collect a list of all IDs delivered. After interval T, New Light undertakes Action Three 1426: self-assign a random ID other than its factory default and all IDs (if any) received, alert the server 1408 of its new ID, and proceed to Action 1428. In Action 1428, New Light commences routine node operation per mesh protocols and/or continues a commissioning process whereby the physical location of New Light is determined and stored in the server 1408. Various embodiments may employ other steps in a self-commissioning process of a new light, e.g., steps that enable (a) automatic determination of new-to-this-mesh status by a previously used but newly installed light (i.e., a light not possessing factory settings), (b) automatic determination of First Node in New Mesh status, and (c) automatic positional determination of a new light (e.g., "I am in fixture 12, Aisle 3") based on measurements of radio signal strength from other nodes in the network 402, as described elsewhere herein.

Figure 15:
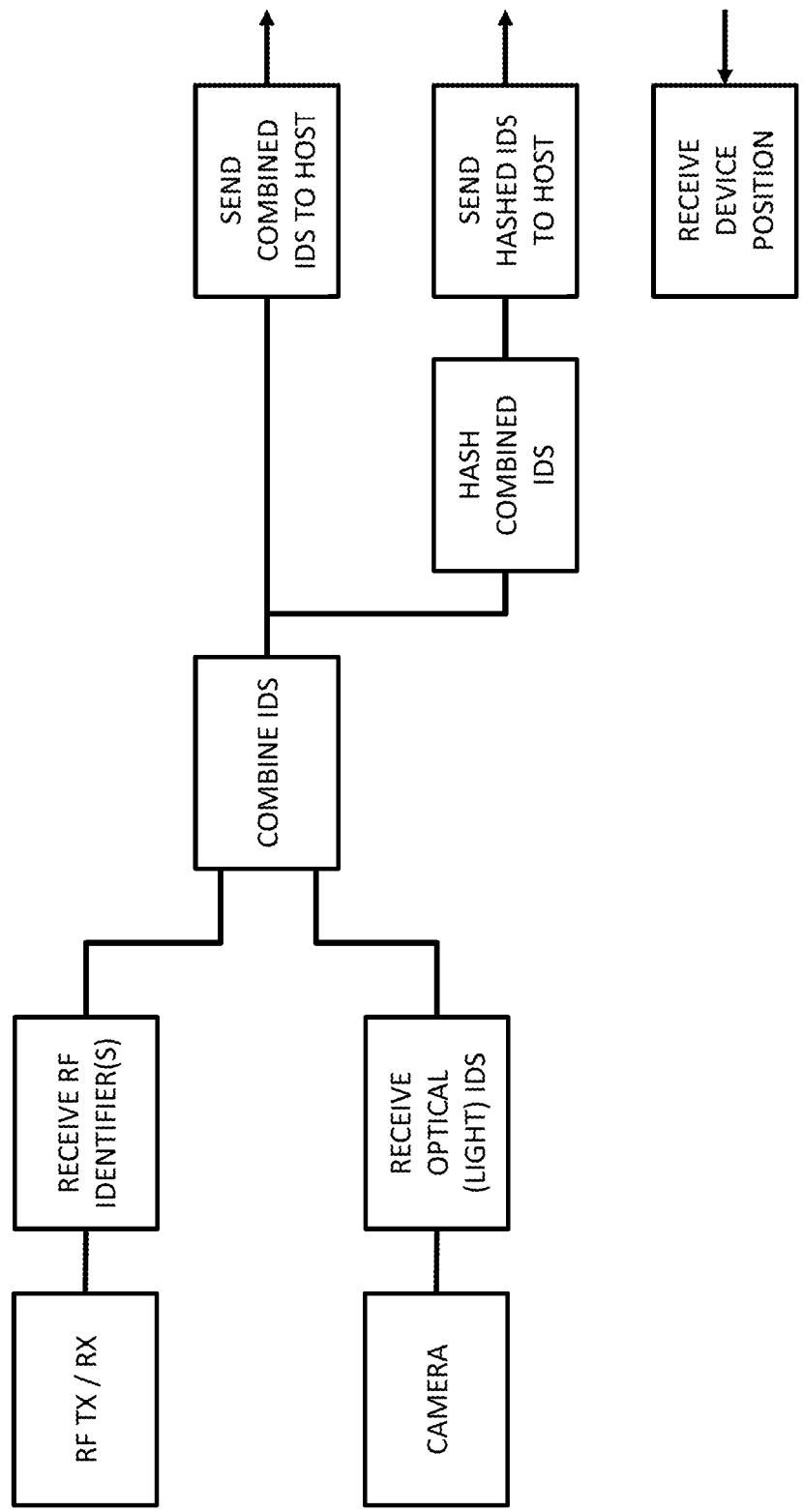
FIG. 15 depicts a flow chart for generating a unique position identifier from a combination of a radio frequency identifier and a light identifier in accordance with various embodiments of the invention.

FIG. 15 depicts exemplary functional steps for using radio frequency and modulated light identifiers to receive an indication of a position of a mobile device relative to a modulating beacon light source. In the embodiment of FIG. 15, a mobile device may receive via a modulated light captured by a mobile device camera an ID for a light. The mobile device may also receive an RF ID from an RF capability of a light. These IDs may be combined and sent to a host, such as a position determination server. Alternatively or in addition, the combined IDs may be processed through a hash function and the output of the hash function may be sent to a position detection server. The mobile device may receive position information from the server in response to the transmitted combined ID and/or hashed combined ID.

Figure 16:
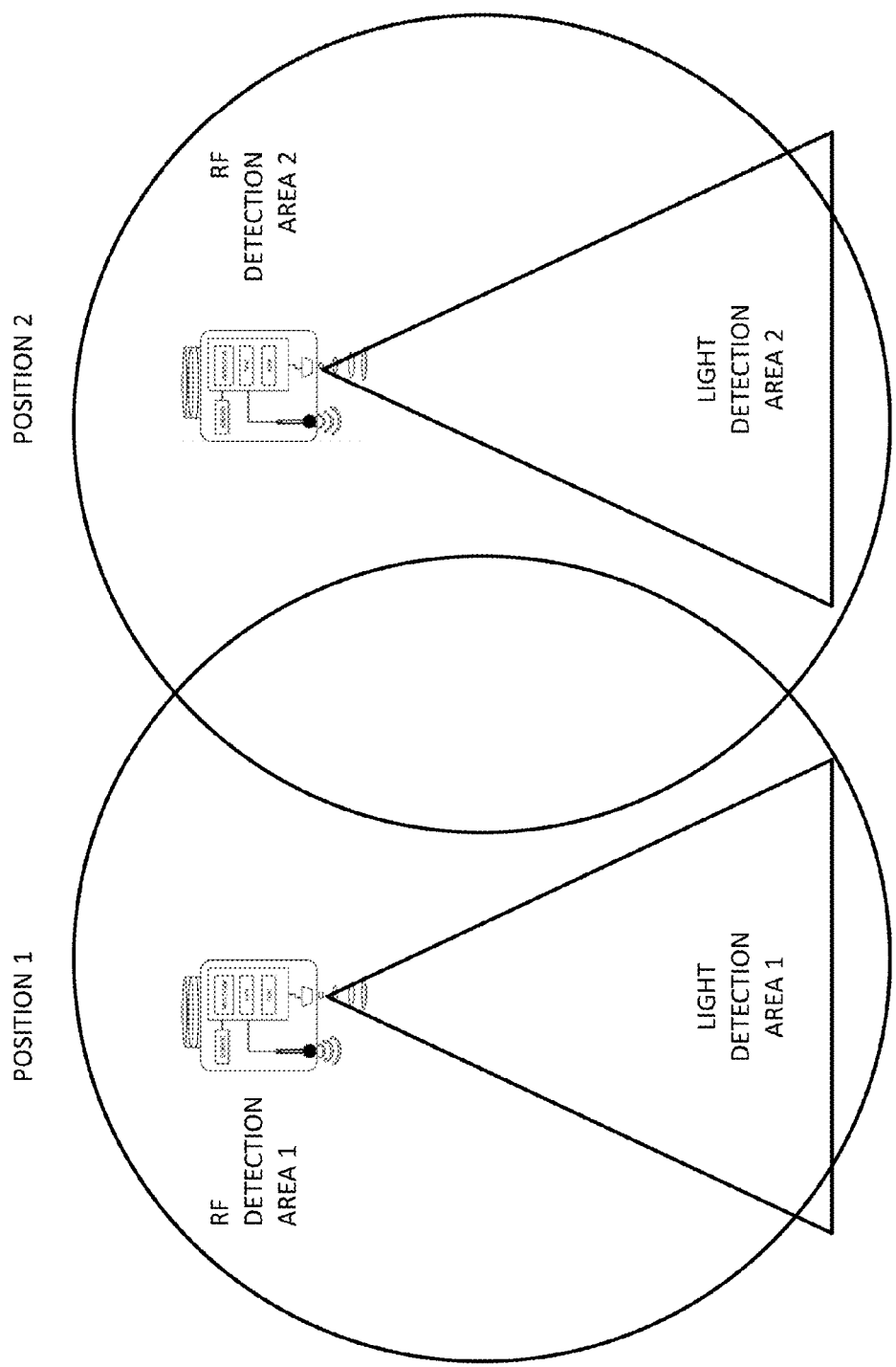
FIG. 16 depicts a representative schematic of detection areas of two radio frequency communication enabled lights for transmitting modulated light in accordance with various embodiments of the invention.

FIG. 16 depicts two radio frequency communication enabled modulating beacon light sources that are close enough for the radio frequency communication detection areas overlap so that a single mobile device in an overlapping region may need further information to disambiguate which light the mobile device is closest to. The narrower modulated light detection regions may facilitate disambiguation of a light in position 1 from a light in position 2, as in this illustrative a mobile device cannot simultaneously detect a light in position 1 and a light in position 2.

Figure 17:
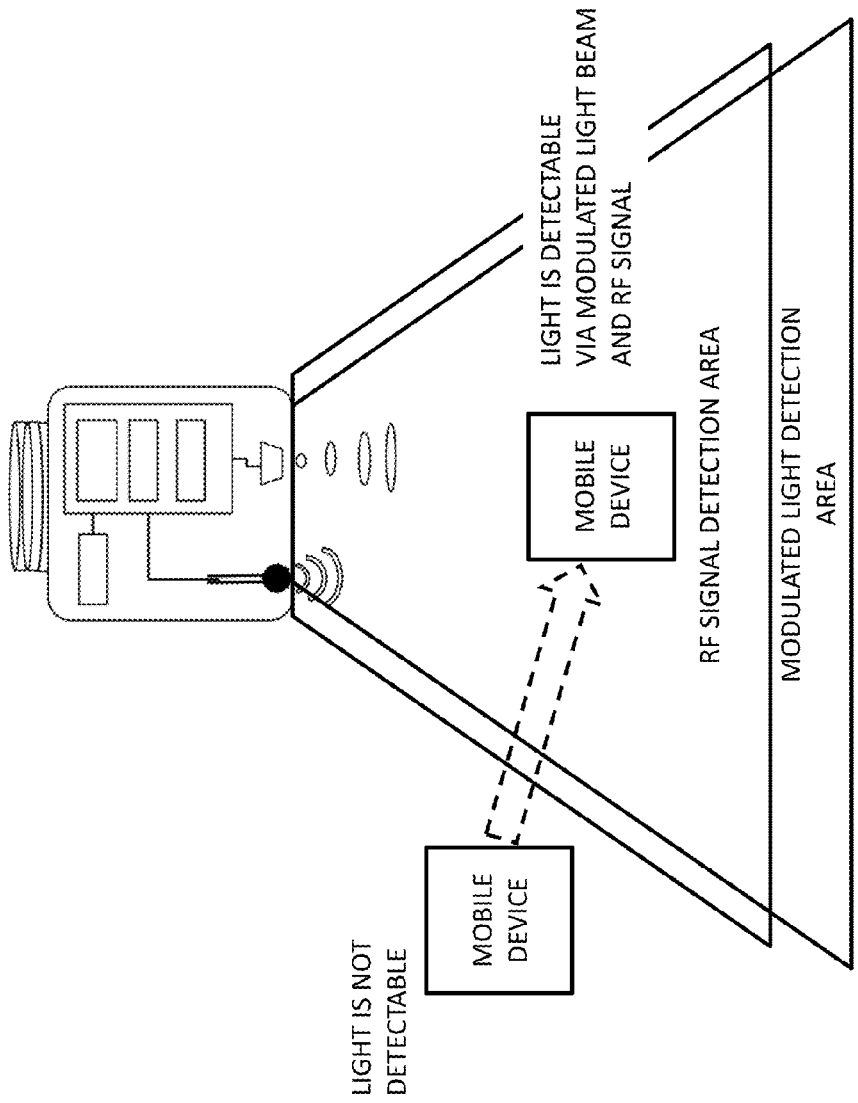
FIG. 17 depicts directional transmission of radio frequency communication from a light for providing modulated light in accordance with various embodiments of the invention.

FIG. 17 depicts an embodiment of a radio frequency communication enabled modulated beacon light with directionally limited RF emissions, such as by use of a directional antenna. Directionality of RF transmission may be achieved by a fixed directional antenna design: e.g., a conformal antenna design may be combined with a lighting fixture reflector that combines visible light direction with RF signal direction in a single unit. Or, a separate directional antenna (e.g., panel antenna) may be mechanically steered by actuators. Or, a phased array antenna (e.g., antenna employing microelectromechanical systems (MEMS) phase shifters) may be incorporated in a light. Some phased array antennas can programmably shape antenna radiation pattern, alter radiation pattern orientation, and modulate broadcast intensity; similar flexibility applies to signal reception. In various embodiments employing phased array antennas, the broadcast power, reception sensitivity, radiation pattern, direction, and other features of an antenna of an RF capability of a VLC+RF node may be dynamically reprogrammed through the VLC+RF mesh, or by a local controller in response to changing conditions, or by another device (e.g., mobile phone). Such programmable antenna characteristics may also be set to vary throughout a working space, statically or variably, from node to node. If statically programmed, RF antenna characteristics may be chosen, for example, to optimize overall VLC+RF performance over a working space that is oddly shaped, noncontiguous, or occupied by light-blocking, light-reflecting objects and other obstacles (e.g., partial walls, large metal objects) that may cause VLC and/or RF device-locating performance to vary or degrade from point to point. Such adjustments may be set during a commissioning or space-fingerprinting process, either manually or automatically (e.g., by quartering the space with a small RF-equipped and/or VLC-equipped flying drone or crawling robot to characterize system response throughout the space). If re-settable, system RF characteristics may be altered in a regular manner, or in response to measured characteristics of system environment such as usage patterns, RF interference, or by other criteria. In sum, the performance of a VLC+RF system may be improved, and its possible functions increased in number, by the inclusion of a configurable RF antenna capability.

FIG. 18 depicts a hashing function that facilitates generating a common unique position identifier for a plurality of combinations of modulated light and transmitted radio frequency identifiers. This capability prevents third parties from surveying a deployment of modulatable lights and generating a competing map of the lights. Without the hashing function, it may appear that the light and RF IDs being emitted from a single light are nearly random, thereby defeating any attempt to determine the unique position identifier for each light.

The number of light and RF IDs and hashes producible by a finite number of bits is finite by definition. Therefore, given the manufacture of sufficiently large numbers of VLC+RF nodes, the repetition of possible identifiers, both pre- and post-hash, is inevitable. It follows that with some probability, non-unique identifiers may, absent potentially burdensome tracking techniques, be deployed within a single working space or in multiple working spaces. A mobile device that seeks, for example, to identify what store it is in by detecting a single node identifier may be caused to err by ID repetition. The likelihood of such errors can be reduced to an insignificant level by using combinations of two or more light and/or RF IDs as position identifiers presumed to be unique. If IDs are randomly assigned and located in an independent manner, and that the probability of the probability of any single combination of a number P IDs being identical to any other single combination of P IDs is approximately proportional to $p_{ID}^P$, where $p_{ID}$ is the probability of an ID repetition occurring in a given working space. Thus, for example, if $p_{ID}=1\times10^{-9}$, then the probability of repeating a group of P=4 IDs is $p_{ID}^P \propto (1\times10^{-9})^4=1\times10^{-36}$, a number sufficiently small to ignore in real-world applications.

FIG. 19 depicts a system for accessing user-targeted content based on position information received from a mobile device of the user, where the position information is derived from a combination of radio frequency identification data and modulated beacon light data and the content is targeted based on the determined position and an identifier of the user's mobile device that facilitates access to a user profile.

Figure 20A:
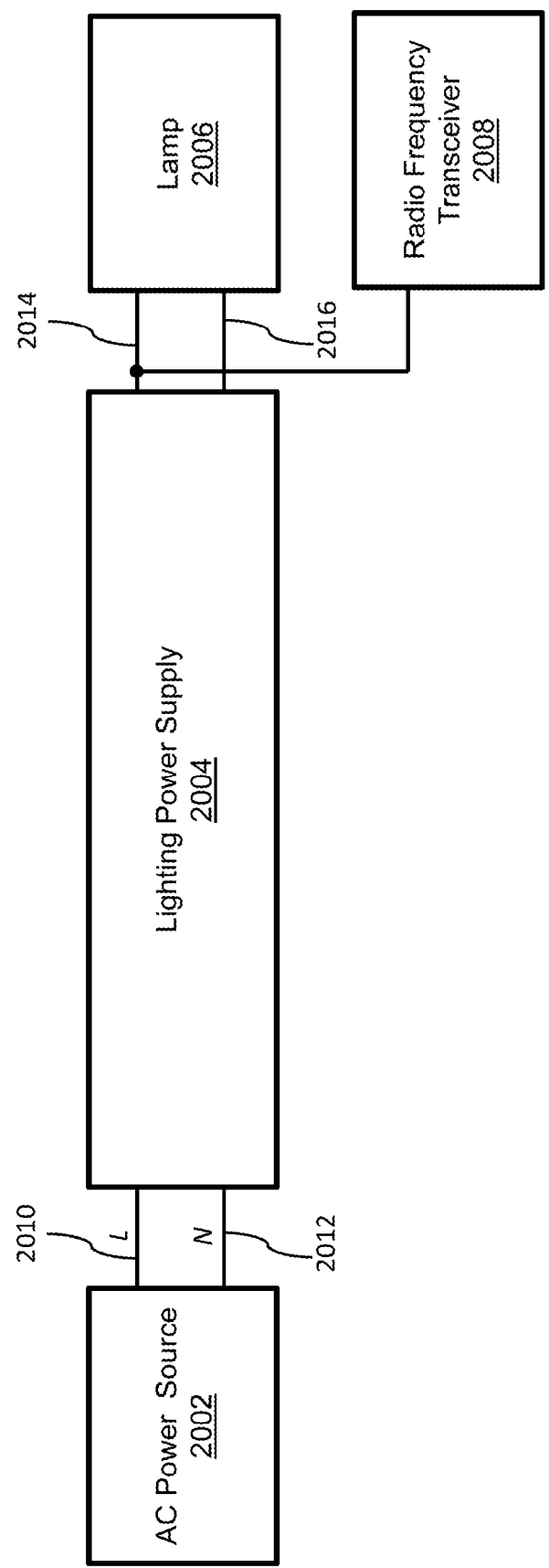
FIG. 20A depicts an RF capability of a VLC+RF node powered by a connection to the lighting-conditioned power of a light in accordance with various embodiments of the invention.
Figure 20B:
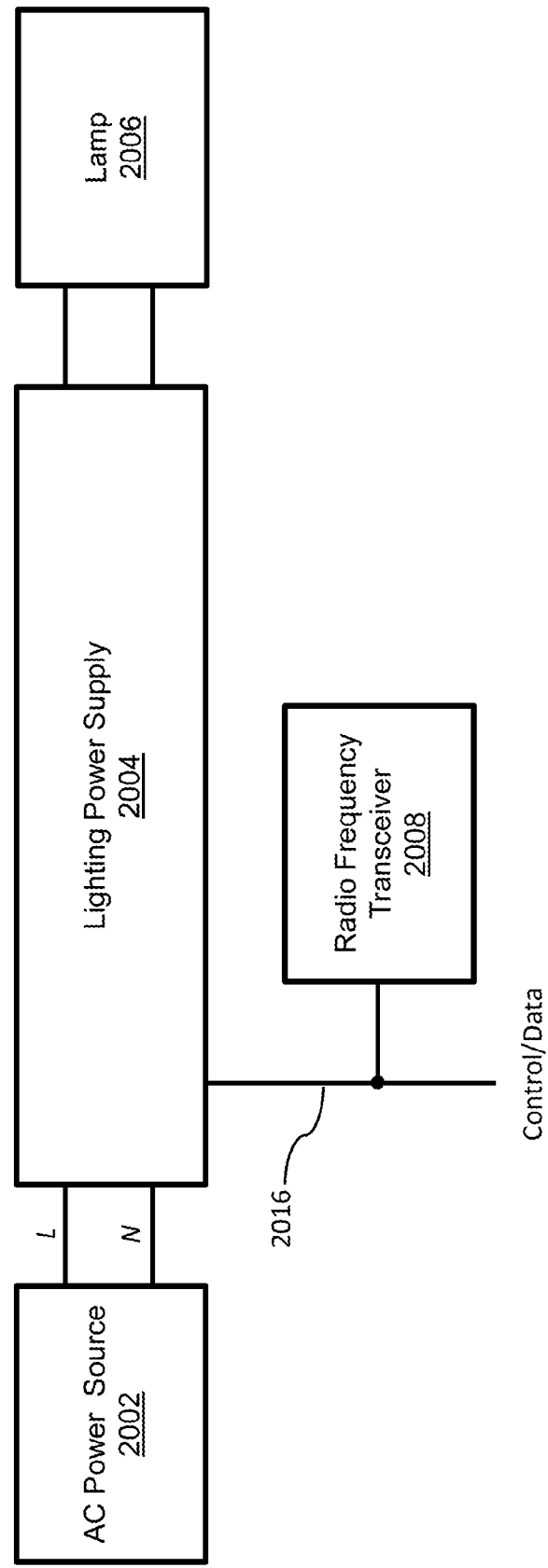
FIG. 20B depicts an RF capability of a VLC+RF node powered by a separate connection to the internal power supply of a light in accordance with various embodiments of the invention.
Figure 20D:
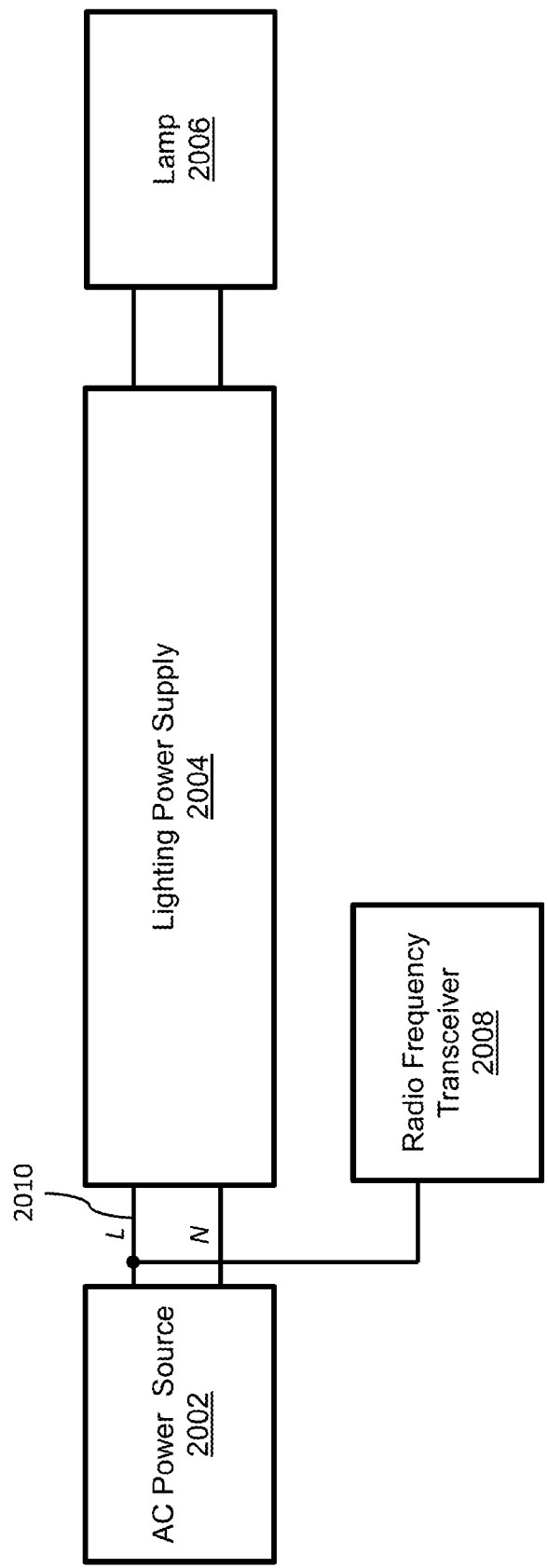
FIG. 20D depicts an RF capability of a VLC+RF node powered by attachment to the line wire of an AC power source of a light in accordance with various embodiments of the invention.

FIG. 20A depicts an illustrative arrangement for powering some capabilities of a VLC+RF light 2000 according to various embodiments. The light 2000 includes an AC power source 2002 (e.g., mains wiring), a lighting power supply 2004, an LED lamp 2006, and an RF transceiver 2008. In various embodiments the lamp 2006 may be of another type (e.g., incandescent), powered arrangements for mechanically directing the lamp may also be included, and the lighting power supply 2004 may include circuitry for output modulation of the lamp 2006. The AC power source 2002 provides a line conductor 2010 and a neutral conductor 2012 to the light power supply 2004 and the light power supply provides a live wire 2014 and ground wire 2016 to the lamp 2006. The lighting power supply 2004 may include an energy storage capability (e.g., a battery and/or capacitor) that enables the lamp 2006, the RF transceiver 2008, or both, along with other devices included within a VLC+RF unit, to continue functioning without interruption during power glitches or outages, up to a time determined by the energy storage limits of the power supply 2004. Alternatively or additionally, the RF transceiver 2008 may contain an energy storage capability. In FIG. 20A, the RF transceiver 2008 is powered by connection to the live wire 2014 (e.g., by insertion at the lamp installation point of a socket extender that breaks out power for the RF unit); in FIG. 20B, by connection to the lighting power supply via a bus 2016 that may carry combined power and control/data signaling; in FIG. 20C, by connection to the neutral wire of the AC mains (in which case the RF transceiver 2008 may contain an internal power supply); and in FIG. 20D, by connection to the line wire of the AC mains.

It is generally advantageous to piggyback the powering of the RF capability of a VLC+RF light onto the arrangements for powering the light, as depicted in FIGS. 20A-20D, since in typical working spaces (e.g., retail stores) mains power is architecturally supplied for a lighting system regardless of intent to install a VLC or VLC+RF system. In various other embodiments, the RF transceiver may be entirely battery-powered, or powered by harvesting acoustic, RF, and/or optical energy from its environment (e.g., an RF transceiver capability of a light may be powered by a photovoltaic cell illuminated by the light itself and/or adjacent lights and/or daylighting, enabling the RF transceiver to be installed simply by attaching it to the ceiling near a light). Without limitation, all such powering arrangements—wired, battery-powered, ambient-energy-powered, or any combination thereof—are contemplated and within the scope of the invention.

FIGS. 21A-21D schematically depict the principles of packet communication between RF nodes of an illustrative VLC+RF mesh 2100 and the control of lights in the mesh by such communication according to various embodiments. The illustrative VLC+RF mesh depicted in FIGS. 21A-21D features six nodes. In this illustrative embodiment, each node may resemble the radio frequency communication enabled light for transmitting modulated light 1100 of FIG. 11; that is, each node comprises an RF transceiver capability, a light source, and a VLC modulation capability. In various embodiments, nodes may have capabilities other than or additional to those of light 1100 in FIG. 11, and may vary in capability within the mesh (e.g., some nodes may possess only RF communications capabilities while some may have both RF and VLC capabilities).

Figure 21B:
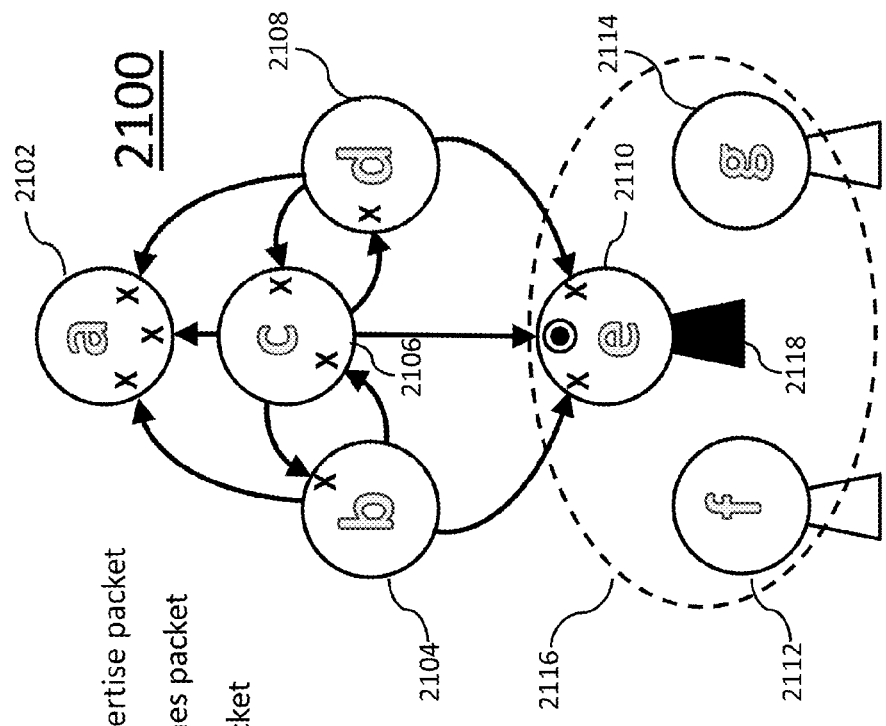
FIG. 21B schematically depicts an illustrative VLC+RF mesh in a second state of packet transmission in accordance with various embodiments of the invention.

In the illustrative embodiment, the RF transceiver capability of the nodes in FIGS. 21A-21D is of the digital packet type; that is, each RF transceiver broadcasts bits sequentially according to some physical modulation scheme, and the transmitted bits constitute groups or "packets" of fixed or, in some realizations, variable length. The bits of each packet, as shall be clarified in for one illustrative embodiment in FIG. 22, are divided schematically into a string of contiguous fields or sub-groups. The packet fields may include information identifying the packet itself, the transmitter of the packet (e.g., "Node a"), and the intended recipient of the packet (e.g., "all nodes," "Node c," "all nodes in Group Two"); commands (e.g., "turn off your light"); data collected by sensors (e.g., temperature); and other information. The broadcast of some packets may be required by an RF interoperability standard, such as the Bluetooth standard; other packets, while conforming to the standard, may be transmitted optionally, and may enwrap information in a manner that constitutes a communications channel. In broadcasting, required packets (e.g., Bluetooth advertisement packets) will preferably be given broadcast priority, and optional packets will be broadcast opportunistically.

The mesh 2100 of FIGS. 21A-21D operates in a waterfall or non-routed fashion: that is, each node transmits packets to all nodes within physical range and receives packets from all nodes within range, and rebroadcasts and/or acts upon the packet, subject to certain rules, to all nodes within range. Some of the rules governing responses to received packets are as follows:

1) When not broadcasting a packet, listen for packets. (This implies alternate broadcasting and listening. In various embodiments where the RF capability of a light includes at least one each of an RF transmitter antenna and receiver antenna, broadcasting and listening may proceed simultaneously.)
2) If a packet is detected, extract its identifier (a.k.a., packet ID or identifying information).
3) Store the packet ID in local memory (e.g., the RAM of light 1100 in FIG. 11). Also store the packet ID if originating the packet.
4) Compare received packet ID to packet IDs already in local memory, if any.
5) If the packet ID matches one found in memory, classify the received packet as "seen" and "kill" it: that is, do not act upon any command it contains and do not rebroadcast it.
6) If the packet ID does not match any in memory, examine the packet to see if it contains commands addressed to the receiving node (e.g., "turn on the light").
7) If the packet does not contain commands addressed to the receiving node, take no action beyond rebroadcasting the packet.
8) If the packet does contain a command addressed to the receiving node, then "consume" the packet: that is, (a) execute the command and (b) retransmit the packet if and only if the packet is also addressed to other nodes, e.g., if the packet is addressed to a group of nodes.
9) If the packet ID does not match any packet IDs found in local memory and is not consumable by the local node, place the packet in the broadcast queue (i.e., broadcast or "advertise" the packet at the earliest opportunity).
10) Retire each packet ID in local memory after it has been there a certain period of time (e.g., 2 seconds). This permits packet IDs to be re-used after, at minimum, the specified retirement age times the number of nodes in the mesh. Re-using of packet IDs is advantageous because (a) otherwise demand for RAM might become large and (b) packet IDs are specified by a fixed number of bits in a packet field and are therefore finite in number, so when unique packet IDs are exhausted one must either cease broadcasting or re-use IDs.

It will be clear to persons versed in the science of network communications that the above rules are necessary and sufficient to assure that packets first broadcast by any node of the mesh will be communicated to every other node in the mesh and will cease to be rebroadcast by nodes in the mesh after a number of broadcast events not greater than the number of nodes in the mesh and potentially much smaller. It will also be clear that these rules are exemplary and that in various other embodiments, rule sets differing in various particulars from the example given, and likely more extensive, would also enable the practical operation of a packet-type, unrouted VLC+RF mesh (e.g., a BLE mesh). All such variations are contemplated and within the scope of the invention, as is the use of network topologies (e.g., bus, ring, star, tree) other than the illustrative mesh topology of FIGS. 21A-21D.

In the illustrative mesh 2100, each node's RF capability includes or consists essentially of a single antenna that may only transmit or receive at any given time: a node therefore listens for packets except when it is transmitting a packet.

While transmitting, a mesh may miss (be deaf to) a packet broadcast by one or more other nodes. Although this potentially allows packets to disappear prematurely from the mesh, in various embodiments the VLC+RF mesh may incorporate at least two features that adequately mitigate the problem of packet-dropping: (1) for a given packet to be dropped by a mesh comprising asynchronous nodes, all nodes within receiving range of all other nodes broadcasting that packet must attempt transmission of that packet (or some other) simultaneously, and this is highly unlikely in an asynchronous mesh; and (2) as described further hereinbelow, a packet definition standard may permit the inclusion of a response command that requires a receiving node to transmit a confirmation packet back through the mesh. Failure by a mesh controller node to receive a response packet may trigger presumption of a packet drop—loss either of the original packet or of the confirmation packet—and thus rebroadcast of the original packet. This process may be repeated until a timeout is reached and a network failure flag is raised or until packet receipt is confirmed.

In FIGS. 21A-21D, the progress of a single packet through an illustrative VLC+RF mesh 2100 is schematically illustrated. The packet (not shown) is either delivered to Node a 2102 from a device or network outside the mesh or is constructed within Node a 2102 by appropriate devices comprised by the node; or, a packet may originate within any other node in the mesh 2100. In the case illustrated, Node a 2102 broadcasts (advertises) the packet. In FIGS. 21A-21D, receipt of a packet broadcast by a node is indicated by an arrow drawn between the broadcasting node and the receiving node; e.g., in FIG. 21A, the broadcast from Node a 2102 is received by Node b 2104, Node c 2106, and Node d 2108. No other nodes in the mesh 2100 are within physical receiving range of Node a 2102. At the head of each arrow denoting successful transmission, a mark within the receiving node denotes the fate of packet: (1) A check-mark indicates that the node simply re-broadcasts the packet, (2) a bull's-eye indicates that the node consumes the packet (which may or may not entail rebroadcasting), and (c) an "X" indicates that the node kills the packet.

Figure 21A:
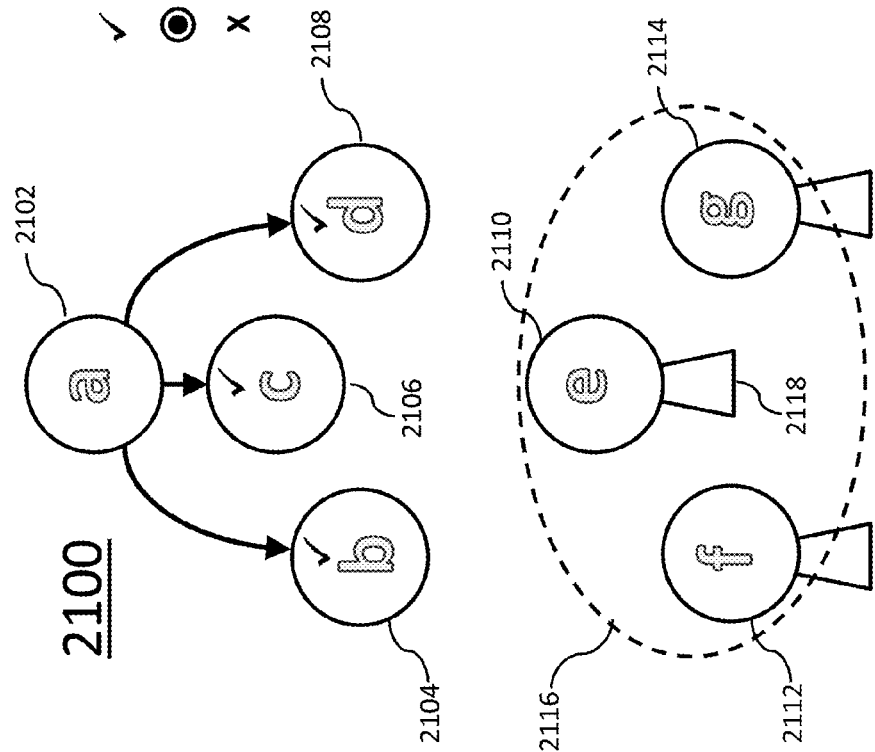
FIG. 21A schematically depicts an illustrative VLC+RF mesh in a first state of packet transmission in accordance with various embodiments of the invention.
Figure 22:
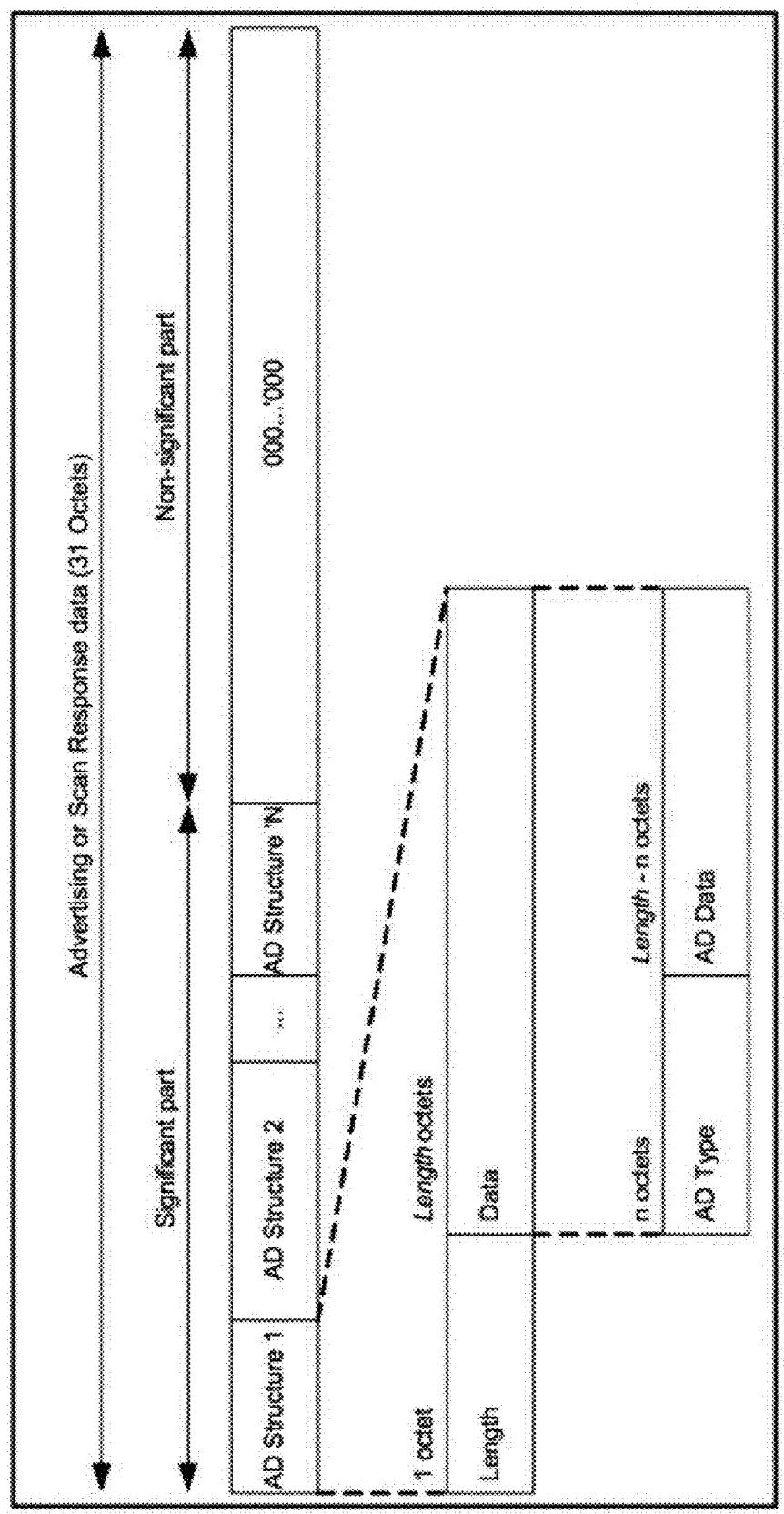
FIG. 22 depicts the structure of an illustrative digital RF packet in accordance with various embodiments of the invention.

In FIG. 21A, Node e 2110, Node f 2112, and Node g 2114 constitute a group, Group One 2116, within the mesh 2100 (e.g., lights in a particular section of a retail space). The packet protocol of mesh 2100 enables commands be broadcast through the mesh 2100 that are executed by all nodes in Group One 2116 and by no others; nodes in a Group may also be individually addressed and controlled. In the state of mesh operation depicted in FIG. 21A, the light capability of Node e 2110, Node f 2112, and Node g 2114 is On, as indicated by open cones attached to the nodes of Group One 2114 (e.g., cone 2118). The illustrative packet transmitted by Node a 2102 is addressed to the nodes of Group One 2116 and contains a command to turn off the lights.

In FIG. 21A, the broadcast from Node a 2102 has been received by Node b 2104, Node c 2106, and Node d 2108. None of these nodes find the packet ID in memory, nor find that they are addressed by the packet. They therefore rebroadcast the packet, as indicated by the checkmarks in the node symbols.

FIG. 21B depicts the results of rebroadcast of the packet by Node b 2104, Node c 2106, and Node d 2108. In this illustrative mesh, the nodes are presumed to be operating in a non-synchronous manner so that packet collision (simultaneous broadcast of a packet by more than one node) is rare enough to be neglected. Node a 2102 receives the broadcasts of Node b 2104, Node c 2106, and Node d 2108; Node b 2104 receives the broadcast of Node c 2106; Node b 2104 and Node d 2108 are too far apart to receive each other's broadcasts; Node c 2106 receives the broadcasts of Node b 2104 and Node d 2108; and Node d 2108 receives the broadcast of Node c 2106. All packets received by these four nodes are killed, because all nodes find the ID of this packet in their "seen" list. Node e 2110 is the only node in Group One 2116 within receiving range of any of the first four nodes in the mesh (a-d) and receives transmissions from Node b 2104, Node c 2106, and Node d 2108. In this illustrative case it is posited that Node c 2106 is the first of these three nodes to rebroadcast the packet; therefore, Node e 2110 first sees the packet as broadcast by Node c 2106, places the packet ID in memory, and kills the packets redundantly received from Node b 2104 and Node d 2108.

Since Node e 2110 is in Group One 2116, to which the packet is addressed, upon examining the packet Node e finds a command addressed to itself and its fellow group members. Node e 2110 therefore consumes the packet, i.e., turns off its light and puts the packet on its broadcast queue. In FIG. 21B, the turning off of the light capability of Node e 2110 is represented by blackening in of the cone 2118.

FIG. 21C depicts a subsequent state of operation of the mesh 2100 in which Node e 2110 has rebroadcast the packet. This broadcast is received by all nodes in the mesh 2100 except Node a, which is too distant to receive it. The packet is killed by Node b 2104, Node c 2106, and Node d 2108, as these have already seen the packet, but it is consumed by Node f 2112 and Node g 2114, which turn off their lights (as indicated by blackening in of the cones 2120).

FIG. 21D depicts the final stage in the history of the packet, which is rebroadcast by Node f 2112 and Node g 2114. All nodes in Group One 2116 receive this broadcast packet but all identify it as "seen" and kill it. Thereafter, the packet is no longer broadcast by any node in the network; also, its intended function (control of the lights in Group One 2116) has been accomplished. Similar propagation of various packet types containing data, commands, and the like, whether in this illustrative network or in more extensive networks, may be readily envisaged.

Typically, one node in the mesh 2100 is denoted a "mesh controller," which has unique authority (within a given mesh) to issue commands, receive data, and communicate with a device, mesh, or network outside the mesh. The mesh controller node may be a VLC+RF node or another Bluetooth-capable device (e.g., phone, laptop, server, joint Bluetooth+WiFi device). In various embodiments, as is clarified further hereinbelow with reference to FIG. 22, a packet may contain a "command response" field that, set to an active state, instructs addressee nodes to transmit packets acknowledging receipt and execution of the command packet or returning data to the mesh controller. For example, if Node a 2102 of FIGS. 21A-21D were designated a mesh controller, and the packet transmitted in the illustrative packet history included an active command response flag, the state of operation of FIG. 21D would be followed by transmission of response packets by the three nodes of Group One 2116, which response packets would contain information confirming the dousing of the Group's lights and which would cease to propagate through the mesh 2100 only after having been consumed by Node a 2102. In general, a mesh controller may poll other nodes in a mesh 2100 for a range of information, including the operational state of its various capabilities, sensor data, ID data, LED operational history (e.g., current, voltage), ambient temperature, and the like. Also, a mesh controller may issue commands changing both RF and VLC identity codes and other operational parameters of nodes or changing the operational states of lights and RF transceivers, and may demand confirmation of the receipt and execution of such commands, and may communicate with devices, meshes, servers, networks, and the like outside the mesh.

Commands propagated throughout the mesh from a mesh controller may enable a number of functions, all of which are intended and within the scope of the invention. Without limitation, these include (a) light brightness control (on, off, dimming, flashing, VLC message programming, etc.), directional control of lights equipped with mechanical activators, retrieval of data from sensors, and retrieval of data collected by the RF capability of the mesh from mobile devices, tags, other nodes, and the like.

In various embodiments, provision is made for automatic specification of a mesh controller node, either upon system startup or in the event of failure of the designated mesh controller node; alternatively or additionally, the mesh may be configured to operate autonomously in one or more pre-determined default modes in the event that a mesh controller ceases to operate. For example, in the absence of commands from a mesh controller, the mesh nodes may be programmed to broadcast VLC beacon ID information and keep the lights on until further notice, and record sensor data in RAM in a wraparound fashion that records a moving window of most-recent readings.

FIG. 22 depicts an illustrative packet structure 2200 for a VLC+RF mesh according to various embodiments that employ some forms of the Bluetooth standard for RF communication. Typically, a Bluetooth device is required to transmit packets containing constrained, self-identifying content on a regular basis. Other packets may be transmitted optionally by the device. In various embodiments, the optional packets, herein termed VLC+RF packets, may be structured to perform the functions of mesh control, illumination control, VLC control, tag sensing, sensor reporting, mobile device detection, and other as described elsewhere herein. The following paragraphs describe the structure of VLC+RF packets employed by the RF aspect of a VLC+RF mesh according to various embodiments.

Each VLC+RF packet may be 31 bytes long, where a byte is defined as 8 bits (an octet). Each packet may be an Advertising packet (i.e., a packet containing identification or command information) or a Scan Response packet (i.e., a packet containing data solicited by a controller, including information about receipt of Advertising packets, execution of commands therein, etc.); Advertising and Command Response packets differ in function and content, but not in format. Each packet comprises a Significant Part and a Nonsignificant Part; the Significant Part may occupy the whole of the packet. Within the Significant Part or packet payload may be broken down into a collection of Advertisement Data (AD) Structures, each, as indicated in FIG. 22, composed of a single byte specifying the length of the AD Structure, a single byte specifying the AD Structure type, and some number of bytes of AD Data. Type identifiers for AD Structures are typically assigned numbers by the Bluetooth Special Interest Group.

In a preferred embodiment, the VLC+RF packet contains a single AD Structure that may occupy up to the whole 31 bytes of the packet; this maximizes the non-overhead payload content of the packet. Thus, of the 31 packet bytes, 1 is occupied by the AD Length specification byte, 1 is occupied by the AD Type specification byte, and up to 29 bytes are occupied by a Mesh Message. The AD Type specification byte is set to 0xFF, the Bluetooth code for "Manufacturer Specific Data." To distinguish a Mesh packet from other Manufacturer Specific Advertising Data packets that may be sent (e.g., to mobile devices in the working space of the VLC+RF system), each Mesh Message will begin with a fixed Mesh-Specific Sequence (MSS) of 2 bytes, fixed at some arbitrary value (e.g., 0xB1BC).

The remainder of the Mesh Message (up to 27 bytes) consists of encrypted packet contents. Encryption prevents unauthorized users from taking control of the VLC+RF mesh and its functions (e.g., turning lights on and off) or harvesting information from the mesh. Nodes will decrypt a packet if they determine that it is not on their Seen list, and examine its contents to see if they are an addressee of the packet. Encryption may be by a variety of cryptographic techniques: in one embodiment, a reversible cryptographic hash is employed. A portion of the encrypted packet contents (e.g., 2 bytes), possibly up to and including the entire encrypted packet contents is employed as a quasi-unique packet identifier ("quasi"-unique because although the number of possible M-bit strings is large for nontrivial M, it cannot be infinite—hence the need for ID re-use as discussed hereinabove with reference to FIGS. 21A-21D). This packet identifier may be the string employed by nodes for identifying packets as seen or not-seen, as discussed hereinabove with reference to the illustrative mesh of FIGS. 21A-21D.

The pre-encrypted or decrypted portion of the packet payload consists of (a) an octet of 8 1-bit flags, (b) the 3-byte ID code of the VLC+RF node originating the packet, (c) the 3-byte ID code of the addressee, which may be either a single node or a group of nodes, and (d) a Mesh Payload of up to 18 bytes length containing Commands and Parameters.

The AD structure of the VLC+RF packet is as follows, where N 31 is the number of bytes in the AD Structure:

| AD STRUCTURE MAP | | | | | | |
|---|---|---|---|---|---|---|
| Length Specifier | AD Type Specifier | Message-Specific Sequence | Flags Byte | Source Address | Destination Address | Mesh Payload |
| value = N | 0xFF | 0xB1BC | flags | Node ID | Node or Group ID | Command + Parameters |
| 1 byte | 1 byte | 2 bytes | 1 byte | 3 bytes | 3 bytes | ≤20 bytes |

The functions of the Flags Byte bits are defined as follows:

| FLAGS BYTE MAP | | | | | | | |
|---|---|---|---|---|---|---|---|
| Group Response | Reserved | Reserved | Reserved | Channel ID | Channel ID | Channel ID |
| bit 7 | bit 6 | bit 5 | bit 4 | bit 3 | bit 2 | bit 1 | bit 0 |

The functions of the Flags Byte bits are further explained as follows: (1) Bit 7, the Group bit is 0 if the destination address field is an individual node address, or 1 if the destination addressee field denotes a group number (where Group Address 0 denotes indiscriminate broadcast). (2) Bit 6, the Response bit, is 0 if the receiving node should not generate a response packet, and 1 if the receiving node should generate a response packet. (3) Bits 0-2, the three-bit Channel ID field, enable the specification of 8 (=$2^3$) channels. Each "channel" may be reserved for the use of a particular mesh. Thus, if the physical broadcast and reception spaces of nearby meshes (e.g., on adjacent floors of a building) overlap, traffic may still be segregated between the meshes by use of the Channel ID field. Each node in each mesh is programmed during system commissioning with its own Channel ID, and if a received packet contains another Channel ID, the node kills the packet.

The Command field and Parameters within the Mesh Payload field may be designated as follows: (1) A single byte may be devoted to specifying a Command; this allows the definition of 256 (=$2^8$) distinct Commands, which is ample for the operation of a VLC+RF mesh in various embodiments. Examples of Command field values include Set Mesh Controller Node ID, Response Packet (signifying that this packet is a response packet), Set Light Brightness Level, Blink Light, Set VLC Beacon ID, Device Data Channel (signifying that the packet payload consists of data being transmitted on a virtual channel above the packet layer), and others. (2) Parameters may contain data of any kind, including RF node IDs, VLC node IDs, light brightness level specifiers, portions of multi-packet commands, data for transmission to mobile devices in the service space, and a variety of other control, commissioning, and communications data. The Parameters field enables the VLC+RF packet protocol to act (as is common for packet protocols) as the basis for a structure of one or more virtual data channels that convey messages broken into fragments for transmission in packets. The bit rate of such virtual channels must always be less than the physical bit rate of the packet layer, but there are few constraints on the informational character of such virtual channels, which may include field definitions, error correction, encryption, packet structure, and any other features capable of embodiment in a digital data stream.

Packet life cycle has already been partly described with reference to FIGS. 21A-21D. In various embodiments, two numerical parameters are defined for the whole RF capability of the mesh (e.g., programmed into the nonvolatile memory of all RF nodes) during commissioning of the mesh, namely (1) ADV_PER_PKT and (2) ADV_SEEN_TIME_LIMIT. ADV_PER_PKT is the number of times a mesh packet will be advertised by each mesh node (e.g., once), if the packet is to be advertised. ADV_SEEN_TIME_LIMIT is the number of seconds after receipt (e.g., two) that a packet ID expires (i.e., is deleted from the packet ID stack in node memory). ADV_PER_PKT constrains the amount of traffic across the mesh that will be entailed by the transmission of each packet; ADV_SEEN_TIME_LIMIT tends to constrain the lifetime of a packet in the mesh (although transmission through node rings and other cases, for sufficiently large meshes, could enable packets to ring through the mesh even after ADV_SEEN_TIME_LIMIT has expired). Decreasing either or both parameters tends to decrease the probability that a packet will be dropped; increasing either or both parameters tends to increase the lifetime of each packet in the mesh and so limit the effective bandwidth of the mesh as a whole.

It will be clear to a person familiar with the science of network communications that the foregoing packet and mesh specifications may in various embodiments be varied in many particulars without substantively altering the capabilities and applications of a VLC+RF described herein.

FIG. 23 depicts the illustrative employment of a VLC+RF mesh 2300 as a communications range extender or "digital wire" for mobile and other devices (e.g., a phone 2302) in the service area of the mesh, according to various embodiments. As noted above with reference to FIG. 22, the packet level of a VLC+RF mesh 2300 may be used to support one or more virtual channels. Given appropriate design of such a channel, according to principles and methods that will be familiar to persons acquainted with the science of communications, a VLC+RF mesh 2300 may therefore be employed as a digital wire or range extender that enables an RF-equipped device (e.g., a Bluetooth-equipped mobile device, such as phone 2302) in the vicinity of the mesh 2300 to communicate with a distant device (e.g., a personal computer 2304, server 2306, or other device 2308) through the mesh 2300 without any necessity for the RF-equipped device 2302 to implement the mesh packet protocol. For example, a Bluetooth-equipped mobile telephone may establish contact, following normal Bluetooth protocol steps, with the BLE capability of a node (e.g., Node A 2310) in the VLC+RF mesh 2300. Some or all nodes in the mesh 2300, including Node A 2310, are equipped to recognize and broadcast non-mesh Bluetooth packets. Upon receiving a non-mesh packet from the mobile device 2302, Node A 2310 wraps the non-mesh packet's content into one or more mesh packets and broadcasts the one or more packets using, in an illustrative embodiment, the packet protocol described above with reference to FIG. 22 and addressing the packet or packets to the mesh controller node 2312. The packet propagates to the mesh controller node 2312, which in this example is in communication with the Internet 2314 via a WiFi link (i.e., the mesh controller node is a multi-radio device). The mesh controller node 2312 unwraps the mobile device's Bluetooth packet content from the mesh packet and transmits it to the Internet 2314, which may in turn communicate with other devices 2304, 2306, 2308. Any response addressed to the mobile device 2302 reaches the mesh controller 2312, which wraps the response content into one or more mesh packets and broadcasts the one or more packets across the mesh 2300 to Node A 2310 (or to all nodes in Node A's group, or to all nodes in the mesh 2300) which unwrap the packet and broadcast its contents as a standard Bluetooth packet for possible receipt by the mobile device 2302. In other illustrative scenarios, the mobile Bluetooth-equipped device 2302 communicates with another Bluetooth-equipped device (not shown) in the working space, or in another mesh, or elsewhere transparently through the VLC+RF mesh 2300. In brief, a mobile device 2302 need not know that the mesh 2300 is there, yet the VLC+RF system transparently supports communications of the mobile device 2302 with other devices.

Further embodiments, features, and capabilities are described below.

In various embodiments, powering of RF tags and other devices in the working space of the VLC+RF system may be achieved by harvesting of RF energy from RF transmissions of the system, from illumination provided by the system, or from acoustic energy provided by the working area environment and/or by an acoustic (e.g., ultrasonic) capability of the VLC+RF system. Recent technological developments have increasingly enabled the harvesting of very small quantities of electromagnetic or mechanical energy from environments. For example, all receiving antennae intrinsically collect broadcast electromagnetic energy, which may be utilized for its information content, its energy content, or both. Also, piezoelectric and electromechanical devices (e.g., piezoelectric films and microelectromechanical devices) can convert acoustic energy to electrical energy, which likewise may provide information, energy, or both. Photoelectric devices can harvest energy from light for either sensing or power. One or more of these energy-harvesting modalities may be employed in devices. In various embodiments, a VLC+RF system powers one or more energy harvesting devices (EHDs) in its working area by broadcasting one or more of (a) ordinary Bluetooth signals in a nondirectional manner, (b) Bluetooth signals in a directional manner, e.g., as described hereinabove with reference to FIG. 7, (c) non-communicative RF signals matched to the receiving capabilities of EHDs, (d) ultrasonic signals matched to the matched to the receiving capabilities of EHDs, (e) VLC illumination and/or noncommunicative illumination, and (f) infrared VLC and/or noncommunicative illumination in a manner matched to the receiving capabilities of EHDs. RF powering of EHDs is preferred because RF waves, unlike light and ultrasound, readily pass through most objects and materials commonly found in the intended working spaces of such a system; moreover, RF direction of energy (e.g., by phased array beam steering or mechanical beam steering, as described hereinabove with reference to FIG. 7) may allow more energetically higher-efficiency powering of EHDs whose locations are known. EHDs may be stationary or mobile, and without limitation may include RF product tags, sensors, and LEDs.

Reference is now made to FIG. 24A, which schematically depicts an illustrative system 2400 in which a lighting mesh 2402 features a capability for communication with radio-powered EHDs, e.g., a tag 2404. Radio broadcasts from or more nodes of the mesh 2402 may be received by one or more tags 2404. Each tag 2404, in this illustrative embodiment, includes or consists essentially of an antenna 2406, an energy-storing capability (e.g., a capacitor) 2408, and an information processing capability 2410. The tag antenna 2406 is capable of both receiving radio waves, whether from nodes of the network 2402 or from other sources, and of transmitting radio waves, as symbolized by the two sets of ripple lines 2412 associated with the antenna 2406. When the antenna 2406 receives radio waves, some of which may be transmitted by one or more nodes in the mesh 2402, some of the energy in those waves is stored in the energy-storing capability 2408. When a sufficient amount of energy has been stored by the storage capability 2408, the information processing capability 2410 may be powered for some interval. Its functions may include recording data received through the antenna 2406 and transmitting information (e.g., an ID code of the tag 2404) through the antenna 2406. Transmissions by tags may be received by nodes in the network 2402, enabling location detection of tags and/or by other tags. In various embodiments, tags may in general perform all the functions of continuously-powered nodes in the main network 2402, as well as tag-specific functions, enabling the tags to function as a passively-powered secondary network, or extension of the continuously powered network 2402. EHDs of various capabilities (not shown) may be present within the system 2400. In various other embodiments, EHDs may harvest forms of energy additional to or other than radio waves; radio waves may be spatially directed toward EHDs by nodes of the network 2402; and other capabilities may be included or omitted.

A technique for estimating the positions of tags, nodes, and other components in communication with a lighting mesh and that may be enabled by RF capable modulating beacon lights is RF signal-based triangulation to determine an approximate position of a mobile device. This approximate position may be further narrowed through the use of the modulated beacon light data from lights in proximity to the approximate position. In various embodiments, RF position determination may employ received signal strength indicator (RSSI), a measurement of the power present in a received radio signal, to determine the location of an RF-capable mobile device. Since RF energy per unit area received from an omnidirectional transmitter such as most mobile devices employ drops by the inverse square of distance, RF transceivers closer to the cell phone will measure stronger RSSI for the advertising packets. Alternatively or additionally, a mobile device may make RSSI measurements of broadcasts from one or more RF capable modulating beacon lights, which measurements may then be used to estimate the device's position by triangulation, possibly taking into account non-omnidirectionality of RF transceiver broadcasts. Either the raw RSSI measurements or a position estimate calculated by the mobile device itself from those measurements may be reported by the device to a server, back end, or controller through the RF capability of the VLC+RF mesh or via another channel with which the mobile device is in contact (e.g., a cell phone network). In another illustrative embodiment, BLE advertising packets broadcast by a cell phone are detected by one or more RF transceivers of a VLC+RF mesh. The RF transceivers are preferably located in a common plane (e.g., the ceiling of a store): however, RSSI may be used for mobile device position estimation even if RF transceiver locations are non-coplanar if their three-dimensional locations are accurately known. These measurements may be reported through the mesh, or via the mobile device employed as a gateway, or via one or more other mobile devices or nodes employed as gateways, to a mesh controller node or computer that contains software capable of algebraically estimating transmitter location from the RSSI measurements. RSSI measurements at a single moment, or over a short interval, may be used by the VLC+RF mesh and associated computing devices for position estimation of broadcasting device. Repeated position estimates by such means enable the estimation of transmitter dynamics (velocity, acceleration) and movement history. Doppler measurements at a single moment, or over a short interval, may alternatively or additionally be used in estimating device dynamics.

RSSI measurements, similarly reported to and analyzed by a computer within the mesh or in communication with it, may also be used by RF transceivers of a VLC+RF mesh to estimate their own relative positions. In a preferred embodiment, the RF transceivers are located in a common plane (e.g., the ceiling of a store), increasing the likelihood of a unique solution for the location of a multiplicity of RF transceivers given their mutual observations of RSSI. In various embodiments, RF transceivers may transmit packet or non-packet signals during a commissioning process or other process of net geometry determination based on mutual RSSI measurements: the broadcast of such signals (e.g., packets, pings, sinusoids, ramped sinusoids) may be controlled on a node-by-node basis through the VLC+RF mesh in a manner that increases the informational content of a set of RSSI measurements. The results of an RF net geometry determination may be combined computationally with the results of a visible-light net geometry determination based on, e.g., results of "fingerprinting" measurements of light beacon intensity, RSSI, or other measurable features of wave fields within the working space. The results of an RF and/or VLC net geometry determination may also be used, in a directed-type network, to set up routing tables for network nodes.

Figure 24B:
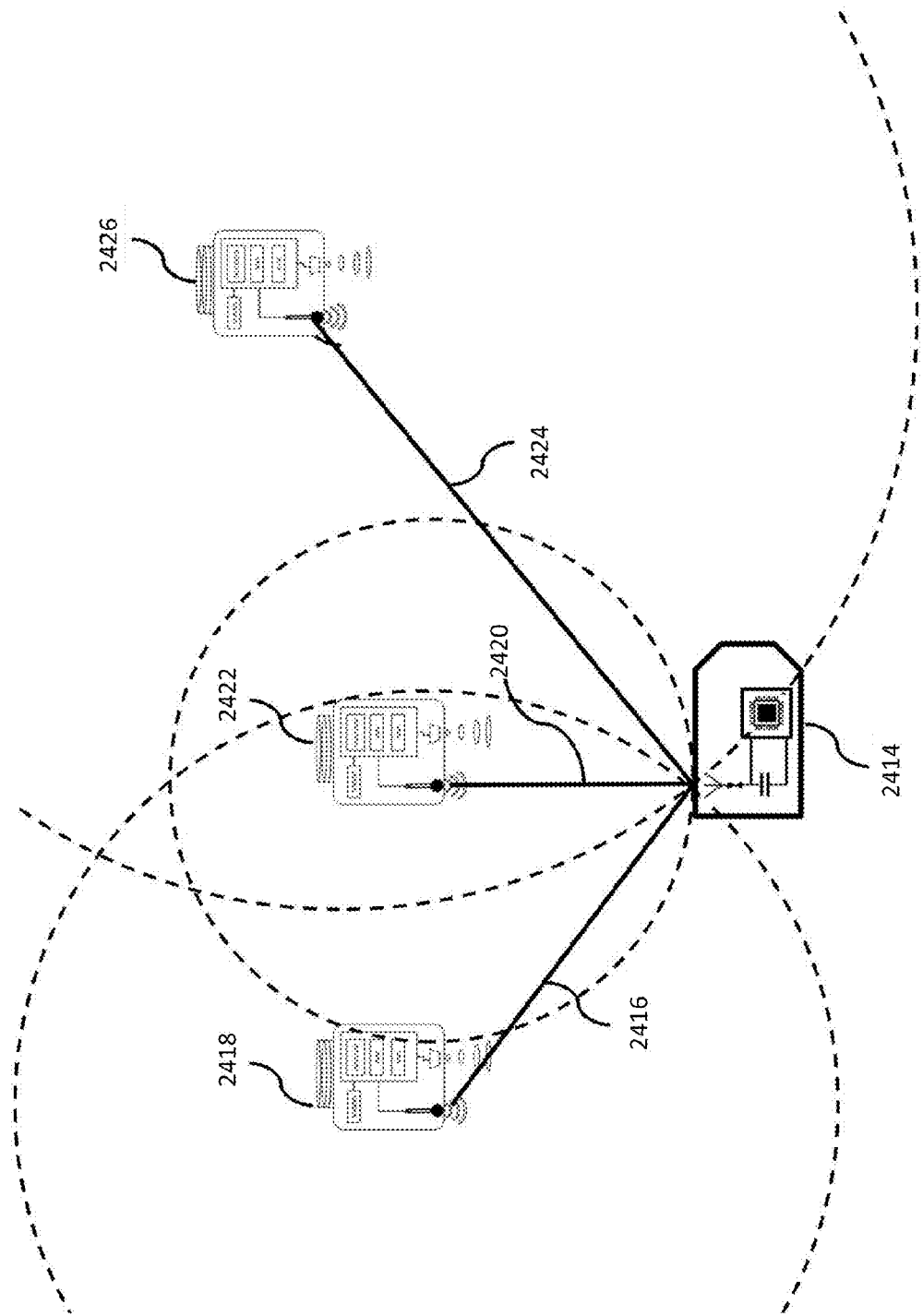
FIG. 24B depicts position estimation of passively powered tags using received radio signal strength indication in accordance with various embodiments of the invention.

FIG. 24B is a schematic depiction of tag location estimation using RSSI in the illustrative system 2400 of FIG. 24A. In FIG. 24B, a tag 2414 in the working space transmits a packet containing a tag ID. The ID may be distinctive to the particular tag, or to a class of tags, or have other significance. The radio waves transmitted by the tag 2414 will travel a first distance 2416 to a first node 2418, a second (shorter) distance 2420 to a second node 2422, and a third distance 2424 to a third node 2426. The nodes 2418, 2422, 2426 are arranged in a non-collinear fashion (not in a straight line) and are equipped with an RSSI detection capability. RSSI magnitude measured by each node will depend on the distance from the transmitting tag to the node. Presuming that all tags transmit with equal signal strength, all tags at distance 2420 from node 2422 (indicated by a dashed circle centered on the antenna of node 2422) will be measured at a unique RSSI by node 2422. Similarly, a given RSSI uniquely determines tag radius for nodes 2418 and 2426 (also indicated by dashed circles, shown in part and centered on their respective nodes). There is only one point of intersection for the three RSSI radii, namely, the location of the antenna of tag 2414. Thus, RSSI measurements by three or more non-collinear nodes may be used to calculate the position of a node. In various embodiments, angle-of-arrival information from two or more nodes may be used alternatively or additionally to calculate tag location. In various embodiments, tags may use RSSI measurements of pulses from multiple network nodes to calculate their own position, and/or to supplement position calculations by mesh nodes.

Several geometrical constraints are now noted. Two spheres whose centers are separated by a distance greater than the difference of their radii and not greater than the sum of their radii intersect along a circle. Two RSSI (i.e., radii) measurements therefore do not suffice to disambiguate the location of a mobile device: the mobile device might be anywhere on a circle determined by the two measured distances and the locations of the nodes measuring them. Moreover, three or more spheres having collinear centers can always be positioned so that all intersect on a circle. Thus, even when three or more radii are measured, collinear RSSI-measuring nodes can produce ambiguous location estimates for a mobile device. Finally, all arrangements of intersecting spheres having coplanar centers intersect at points, or along circles, that are symmetrical above and below the plane. There is thus always ambiguity in location estimates derived from a coplanar set of RF nodes about whether the detected transmitter is above or below the plane. All such ambiguities may be avoided in various embodiments by providing that a system using RSSI measurements for location estimation comprises at least four RF nodes, one of which is non-coplanar with the others. For example, in a system comprising a three or more coplanar nodes in a ceiling, one or more out-of-plane Disambiguation Nodes can also be installed. Each such node will always be more proximate to or distant from a mobile device that is below or above the ceiling plane, thus eliminating ambiguity.

FIG. 25 is a schematic depiction of tag location estimation in the illustrative system 2400 of FIG. 24. In FIG. 25, an environmental sensor 2500 in the working space includes or consists essentially of an antenna capability 2502, an energy storage capability (e.g., a battery) 2504, an information processing capability 2506, and one or more sensors 2508 which may be modular in nature (e.g., may be plugged in to customize the capabilities of the sensor 2500) and may sense properties such as sound, nonacoustic vibration, light, RF signals, gasses, and other. Three modular sensors 2508 are depicted as generic transducers in the illustrative sensor 2500 of FIG. 25. Multiple sensors may be present and may communicate with the mesh 2402. In various embodiments sensors may be powered by batteries, harvested environmental energy, or both, and may also function as tags, and position determination of sensors may be performed as described above with reference to "tags."

Figure 26:
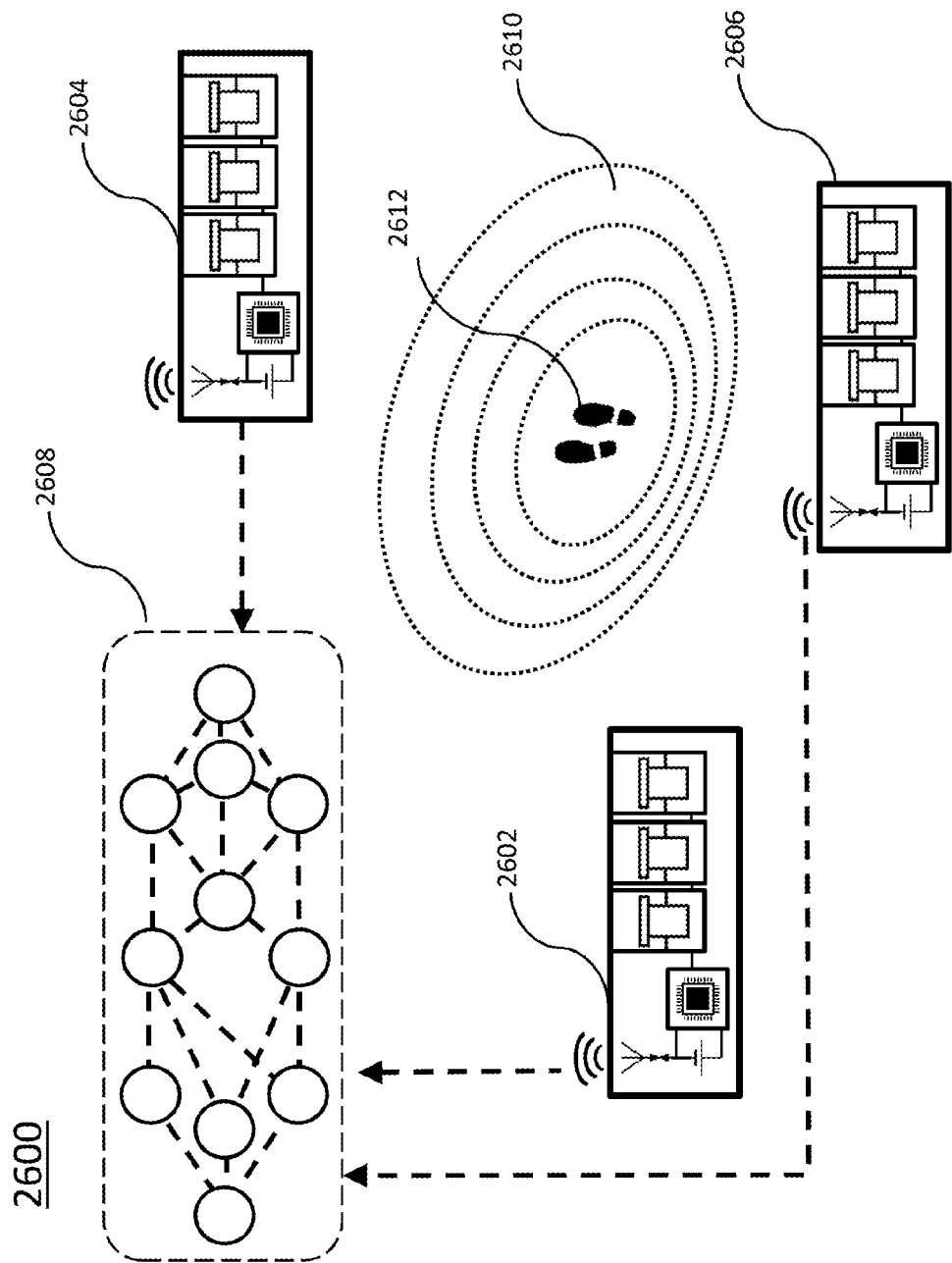
FIG. 26 depicts the use of tomographic footfall detection by sensors communicating with a lighting mesh in accordance with various embodiments of the invention.

RF position estimation of passive (EHD) tags and/or sensors linked to assets—e.g., merchandise, robots, furniture, clothing—within a working space maybe be used by the VLC+RF mesh for asset position mapping, inventorying, theft detection, and related purposes. Alternatively or additionally, battery-powered sensors or asset-linked tags may communicate with the mesh. In an illustrative embodiment, the VLC+RF system is used as a backbone network for network tracking as follows: EHD or battery-powered modules comprising an RF capability regularly broadcast BLE packets that (a) contain encrypted data based on sensors variously comprised by modules such as temperature, humidity, CO or $CO_2$ or other gas levels, occupancy, RF spectrum monitoring, audio recording, brightness sensing, floor vibration, and other; and that, (b) when received by one or more VLC+RF nodes, enable the location of module through RSSI triangulation on the module. In this example, a generic base module having an RF capability allows for the physical plug-in of multiple sensor modules for customization. The sensing network—i.e., modules plus VLC+RF mesh—is managed via a cloud-based system accessed through the web via a representational state transfer (REST) application programming interface (API). Asset tracking by a back end may be enabled by communication between the mesh and the tag modules. Firmware updating and other control of tag modules may also be managed through the mesh. Such a system may enable simultaneous asset spatial tracking, inventorying, space usage characterization, environmental characterization, theft detection, and other data-driven functions FIG. 26 is a schematic depiction of portions of an illustrative system 2600 in which sensors are employed to support position estimation for users of a working space. Sensors 2602, 2604, 2606 are in contact with the floor of space served by a lighting mesh network 2608. Vibrations 2610 from footfalls 2612 transmitted through the floor (plane of the figure)—potentially from more than one walker, or from a wheelchair in motion, or from other forms of human or machine motion—may be sensed by appropriate vibration transducers of the sensors 2602, 2604, 2606. Sensor information may be transmitted by the sensors 2602, 2604, 2605 to the mesh 2608 and thence to a back end or computing device (not shown) capable of estimating the location of the footfalls 2612 through tomographic techniques (e.g., techniques similar to those known and used in the science of seismic tomography). User location information from floor-vibration tomography may be used alternatively to, or to enhance, location user location information derived from mobile devices carried by users as described elsewhere herein.

A single microcontroller in a VLC+RF node may be programmed to perform all light modulation and RF communication capabilities using timed routines or functions. The microcontroller may be configured to constantly broadcast and receive an RF signal while also ensuring that the modulation of the light (e.g., on/off state) is properly operated so as to provide the right modulation light function while avoiding human visible flicker in the light output.

An alternate configuration may include a separate in-line RF communication module that may be disposed in-line with a modulating beacon light. This combination may allow each physical combination of RF capability and modulating light capability to achieve capabilities that are similar to the integrated embodiment described, such as in FIG. 11 above.

Various embodiments of the present invention incorporate RF devices (e.g., the Broadcom BCM4358 802.11ac WiFi 2×2 Multiple Input Multiple Output chip, and similar devices capable of BLE transceiving) that intrinsically determine Angle of Arrival (AOA) information for received RF signals. Such information may be used, independently of VLC and RSSI information, to estimate the position of a mobile device. In an illustrative case, such estimation is performed as follows:

1) Upon reception of a signal from the user's mobile device, the RF capability of a VLC+RF node measures AOA of the signal and sends that information, along with the node's own distinctive ID information, back to the mobile device via the standard BLE protocol.

2) The mobile device accumulates (and time-correlates, based on reception time) these Angle-of-Arrival+ID data sets from one, two, or more nodes in the lighting system.

3) The mobile device computes a location estimate from at least two Angle-of-Arrival+ID data sets transmitted to the mobile device by mesh nodes. For example, the device may group the three (closest in time) AOA measurements from distinct nodes and use these angles, along with the known locations of the nodes as determined from their IDs, to form a two- or three-dimensional position estimate of the mobile device. In an illustrative two-dimensional (planar) case, if two nodes have measured an AOA of a broadcast from a mobile device, one may draw a line passing through each node at the measured angle, whereupon the intersection of the two lines estimates the location of the mobile device. A similar approach can be used for three-dimensional position estimates using AOA measurements and known node locations from three or more nodes.

4) A position estimate based on AOA information may be augmented by positional estimation using RSSI measurements, VLC beaconing, and other sources of positional information (e.g., inertial measurements). For example, it will be clear to persons familiar with the science of probability and statistics that Bayes's Theorem may be used to make an optimal position estimate based on multiple sources of positional information. In a Bayesian approach, the position estimate is a 2D or 3D random variable having some prior distribution (distribution of uncertainty prior to the receipt of first data or additional data), with new AOA, RSSI, and VLC positional information constituting "evidence" that is used to update the prior. The posterior distribution (updated prior) of mobile device position may then be used as a prior distribution for a new, iterative round of estimation as additional evidence becomes available. Such an approach may maximize the likely accuracy of position estimates in a position estimation system gathering positional information from multiple modalities. In various other embodiments, non-Bayesian methods of combining positional information from two or more sources, or from a time series of measurements, are employed.

In another illustrative embodiment, which may be implemented alternatively or additionally to the case just described, a mobile device measures AOA of packets broadcast by two or more RF nodes in a VLC+RF mesh and receives distinctive ID information from those nodes. Physical node locations derived from the ID information, combined with the AOA measurements, enable the mobile device to mathematically estimate its own location. In another illustrative embodiment, a mobile device measures AOA and IDs for node broadcasts, while nodes simultaneously measure AOA and ID for the mobile device, and all these data are combined algorithmically, whether by a computational capability of the nodes, a node controller, the mobile device, or another device, into a single position estimate for the mobile device. Such an estimate may be combined with positional estimate information from other modalities. Moreover, as discussed hereinabove for RSSI measurements, nodes in a mesh may use mutual AOA measurements in order to produce or augment information about mesh node geometry. Such information may be used to assist or automate commissioning or updating of a mesh map, routing tables, etc.

Figure 27:
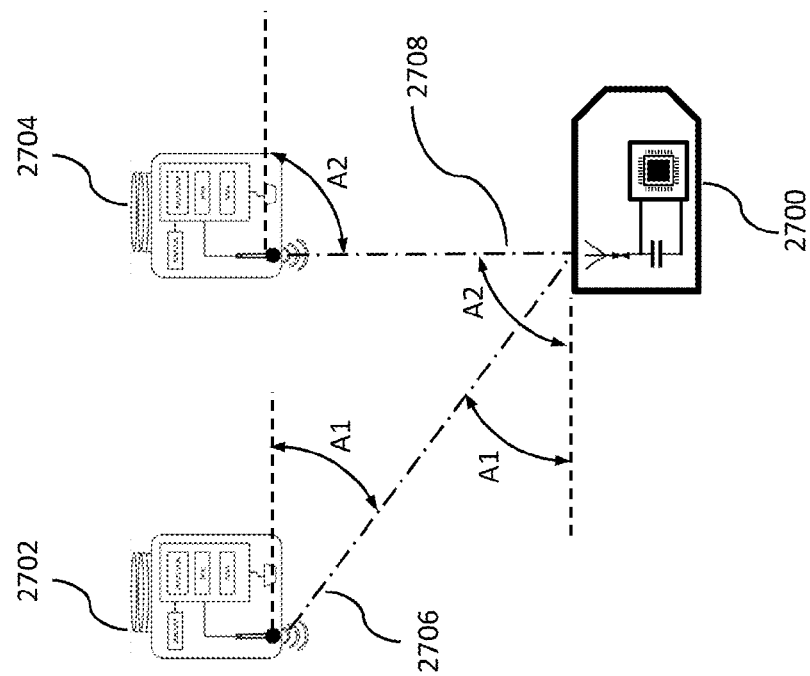
FIG. 27 depicts the use of Angle of Arrival information to assist position estimation of a mobile device in accordance with various embodiments of the invention.

FIG. 27 is an schematic depiction of an illustrative method of position estimation of a tag 2700, similar to tag 2404 of FIG. 24, using an AOA capability of two nodes 2702, 2704 of known location within a lighting mesh (not otherwise shown), or of tag 2700, or of both. In one mode of operation, a signal or series of signal (e.g., packet) is transmitted by the tag 2700 and arrives at the nodes 2702, 2704. The AOA of the tag signal at node 2702 is A1 (depicted in FIG. 27) and the AOA of the tag signal at node 2704 is A2. Angle A1 defines a line 2706 on which the node 2702 and the tag 2700 both lie; similarly, angle A2 defines a line 2708 on which the node 2704 and the tag 2700 both lie. The intersection of the lines 2706, 2708 approximates the location of the tag 2700. Alternatively or additionally, the nodes 2702, 2704 emit pulses that are detected by tag 2700, which possesses an AOA capability. By the law of opposite interior angles, tag 2700 also measures AOAs of A1 and A2 and may therefore calculate (or transmit to a server the AOA information from which may be calculated) lines 2706, 2708 and their intersection, i.e., the location of tag 2700. AOA measurements made within a reasonably close time interval by all three devices—nodes 2702, 2704 and tag 2700—may be combined to produce a more accurate position estimate. In various other scenarios, more than one node and more than one tag may send and receive signals used for AOA position estimation. In various embodiments, the role of the tag 2700 of FIG. 2700 may be played by a sensor, mesh node, or any other device whose signals are capable of AOA detection by mesh nodes, or which can sense signals emitted by mesh nodes and possesses an AOA capability of its own. Tags, sensors, mesh nodes, and other intercommunicating devices in the lighting system may all, potentially, collect and share information that contributes to the position estimation of space users and physical assets.

Coordination of light function may be accomplished via RF enabled modulatable lights. This may allow for certain lights to temporarily produce a particular modulation signal, emit a particular color, and the like. In a retail environment, such a temporary use may be used to indicate a special offer or otherwise bring a shopper's attention to a particular position in the retail space. Likewise, information, offers, content, and the like could be transmitted from RF enabled lights to nearby mobile devices, thereby effectively providing in-store notification of certain specials, and the like without requiring a formal site-wide customer accessible WiFi network or relying on external private wide area network use (e.g. cellular networks).

Figure 28:
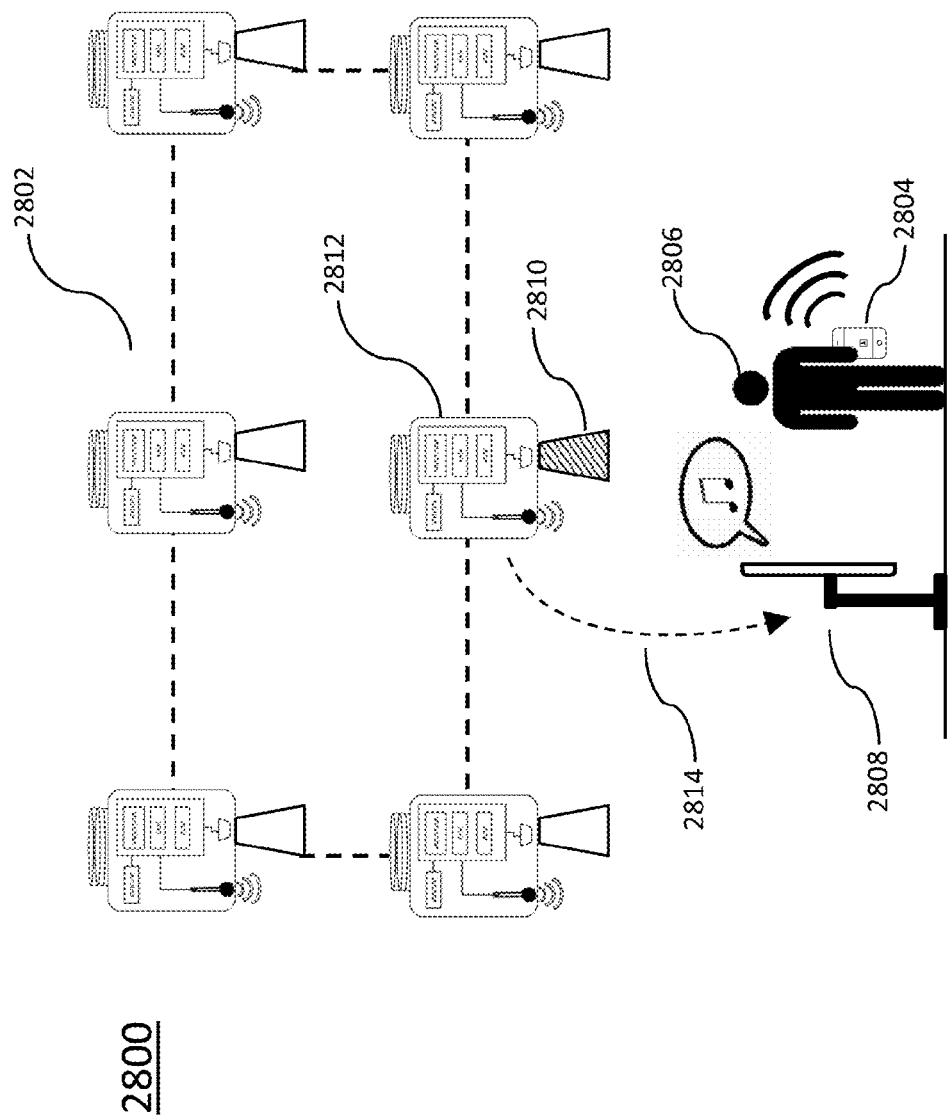
FIG. 28 depicts the coordination of the lighting capability of a mesh with user location in accordance with various embodiments of the invention.

FIG. 28 is a schematic depiction of an illustrative system 2800 including or consisting essentially of a lighting mesh 2802 that has a coordination of lighting function capability.

Mesh 2802 senses the presence of a mobile device 2804 and approximates its location (e.g., by VLC, RSSI, or another technique as described herein). The back end (not shown) of the mesh determines that the device user 2806 is in the vicinity of a display screen 2808. Through the mobile device 2804, the back end pushes to the user 2806 an invitation to view content on the screen 2808. The user 2806 indicates interest, whereupon the light 2812 emitted by the light 2810 most proximate to the user 2806 is dimmed by a command transmitted through the mesh and directed specifically to the light 2812. (In FIG. 28, undimmed light is indicated by a white trapezoid under a light, and dimmed light is indicated by a cross-hatched trapezoid under a light.) The mesh also transmits a signal 2814 to the display screen indicating that it is to display certain content appropriate to the user 2806. This is an illustrative of many similar employments of a network of RF enabled position determining lights having coordination of lighting function capability that may described.

A network of RF enabled position determining lights may enable light-to-light coordination. Functions such as synchronized modulation, phase locked modulation, duplicated modulation signal broadcasting to strengthen a particular modulation ID signal, simultaneous modulation to reduce destructive interference, and the like may be implemented. Control of any one light or a group of lights may help with trouble conditions, such as directing emergency personnel to a position in a large warehouse type store to assist a person in need of medical help.

An application, such as a smart phone application, may be used to facilitate configuring and optionally controlling a lighting setup for a location. To prevent random programmers from taking control of the lighting setup, security measures, such as encryption and multi-factor authentication may be used. Such an application may depict a visual map of a lighting setup so that accessing (e.g. via a touch screen) any of the lights in the map may allow the user to control the selected light (e.g. cause it to visibly blink, turn off, turn on, stop broadcasting a modulation signal, run a diagnostic or setup function, and the like).

Modulated light position determination may be combined with RF position determination in an integrated LED-based light and user-specific profile data to inform a content server of a position of a nearby mobile device/user. In an illustrative embodiment, the content server may then deliver user-targeted content to a nearby screen (e.g. advertising screen) that is proximal to the determined position of the mobile device/user. Alternatively or additionally, the content server may deliver user-targeted content to other media (e.g., speakers) proximal to the determined position of the mobile device/user or to one or more mobile devices of the user. Position determination may be used to direct personnel to the assistance of a user in the working space: e.g., personnel may be equipped with mobile devices that inform them of a real-time, mesh-enabled position estimate of a mobile device user who has requested personal attention, and so be enabled to rendezvous with the user even if the user's position changes after the personnel are dispatched.

Bluetooth networking capabilities that facilitate rapid delivery across a network of a high priority information packet may be exploited in a network of RF enabled modulating beacon lights to ensure rapid delivery of content (e.g., advertisements) from a server through the light-based RF network to a user's mobile device that is connected to the light-based RF network.

Commissioning of a newly-installed or revised lighting network may be facilitated by capabilities of a VLC+RF mesh. For example, in a commissioning process where a commissioner carrying a mobile device assigns location information to specific ceiling lights, and has just assigned a location to a light, the commissioner may wish to identify a next light for commissioning. However, a plethora of lights may be candidates. Via the RF capability of a VLC+RF mesh, the commissioner may request that candidate lights in their vicinity and proximate to the light just commissioned be made to blink. By means of RSSI measurements reported through the mesh to a back end, proximity of candidate lights to the light just commissioned can be determined, narrowing the field of candidates and speeding the commissioning process. FIG. 29 is a schematic depiction of aspects of a commissioning process of a lighting mesh 2900. The locations of some or all of the nodes of the mesh 2900 are not initially known. A commissioner 2902 carries a mobile device 2904 and wishes to associate a physical location with a next light in the mesh (e.g., the light 2906). Having previously commissioned a nearby node 2908, the commissioner 2902 sends a command (through, e.g., an RF capability of their mobile device 2904) to flash lights in the vicinity of the nearby node 2908. By means of RSSI measurements of node 2908 and possibly other nodes, the back end of the mesh knows that light 2906 is near the node 2908 and causes the light 2906 to flash (indicated by striped trapezoid under light 2906). The commissioner then knows which light is the next to commission, and determines a physical location for the light (e.g., using indoor survey equipment). The physical location of light 2906 is then associated by the back end of the mesh with that light and the commissioner may proceed to associate physical location data with other lights in the mesh. In various operating scenarios and various embodiments, other procedures may be followed for light commissioning assisted by an RSSI capability and other RF capabilities of lights.

In various RF communications systems, such as some standards proposed for cell phones, IDs broadcast by mobile devices are changed randomly to prevent unwanted location monitoring (surveillance) of mobile device users. However, such random periodic ID shifting may defeat location tracking desired by a user, e.g., a user who has installed an enterprise-specific app enabling their device to communicate with an in-store location detection system. The RF capability of a VLC+RF mesh may enable location tracking of a user despite random ID shifting. For example, a BLE-capable mobile device with random periodic ID shifting will advertise a given ID a number of times before changing its ID. Pairing one or more spatially correlated location and movement estimates (VLC, RF, or both) with a series of RF ID receptions may enable the probabilistic (e.g., Bayesian) assignment of a consistent device identity to a transmitter despite random periodic ID shifting. Such position tracking will tend to be made more accurate by VLC-based, higher-resolution position estimates of the mobile device, typically dependent on software voluntarily installed on the user's device and therefore mitigative of privacy concerns. Location-based services and information may therefore continue to be delivered to a customer participating in a location tracking system.

FIGS. 30A, 30B, and 30C schematically depict an illustrative use of location tracking to permit continuous track of a user whose mobile device periodically and randomly changes its media access control (MAC) address. FIG. 30A depicts a first operational state of a mesh 3000 at a Time 1, at which the position of a device 3002 broadcasting a certain MAC address, MAC Address 1, has been estimated by the back end (not depicted) of mesh 3000. Around the position estimate of Time 1 a circle of radius R may be defined. FIG. 30B depicts a second operational state of the mesh 3000 at a Time 2, some specific interval after Time 1. In FIG. 30B, in the time elapsed between Time 1 and Time 2 the device 3000 has changed its MAC address to MAC Address 2. A device detection and position estimate at Time 2 by the mesh 3000 finds that the device broadcasting MAC Address 2 is less than radius R from the Time 1 estimate of the position of device 3002, which broadcast MAC Address 1. Consequently, the back end of mesh 3000 re-identifies device 3002 as the broadcaster of MAC Address 2. FIG. 30C depicts an occasion on which a device broadcasting MAC Address 1 is not detected within radius R of the Time 1 location estimate for device 3002; rather, a device 3004 broadcasting MAC Address 2 is detected farther than radius R from the Time 1 location estimate for device 2002. Consequently, the back end of system 3000 does not identify device 3004, the broadcaster of MAC Address 2, as the original device 3002; correctly or not, the back end identifies the broadcaster 3004 of MAC address 2 (in the case of FIG. 30C) as a distinct device from device 3002 of FIG. 30A. In various embodiments, the procedure used to identify device continuity with changing MAC address or other broadcast identifier may differ in its details; e.g., a more computation-intensive, Bayesian, multi-data-source method may be employed to estimate broadcaster identities.

Techniques for the broadcast and detection of at least locally unique identifiers for VLC beacon sources are shown and described in, for example, U.S. Ser. No. 13/369,144, filed on Feb. 8, 2012, U.S. Ser. No. 13/369,147, filed on Feb. 8, 2012, U.S. Ser. No. 13/422,591, filed on Mar. 16, 2012, U.S. Ser. No. 13/435,448, filed on Mar. 30, 2012, U.S. Ser. No. 13/445,019, filed on Apr. 12, 2012, U.S. Ser. No. 13/446,506, filed on Apr. 13, 2012, U.S. Ser. No. 13/446,520, filed on Apr. 13, 2012, and U.S. Ser. No. 13/526,781, filed on Jun. 19, 2012, the entire disclosure of each of which is incorporated by reference herein. Methods for the broadcast and detection of at least locally unique identifiers for RF transceivers are shown and described herein.

Hashing may include a unique mapping of a digital string to a data string of fixed size. A networked server may be configured to generate the unique location identifier from the first and second plurality of identifiers. The mobile device may transmit the first and second plurality of identifiers to the networked sever. A networked server may be configured to receive the unique location identifier from the mobile device. The unique location identifier may be unique to one light or is common to a plurality of lights.

Herein, wireless RF communication is on occasion denoted by reference to "Bluetooth," but any wireless communication means may be similarly employed and all such are implicitly intended, subject to constraints arising from variations in capability, wherever "Bluetooth" and related terms are used. Examples of wireless RF communication means intended herein, without limitation, include Bluetooth, Bluetooth-Low-Energy (BLE), WiFi, Enhanced NFC, WiMax, 3G, 4G, and the like. Also herein, lighting systems described as embodying "VLC" and similar capabilities may minimally possess only an illumination capability, not necessarily a visible-light communications capability, in some or all lights.

Also herein, the term "positioning system" and similar terms refer inclusively to systems that perform functions additional or alternative to determining the position of a mobile device in a working space. Examples of such additional or alternative functions, without limitation, include determining the orientation and/or state of motion of a mobile device in a served space; gathering and/or exchanging information about the distribution of magnetic fields, RF signals, illumination, or other measurable quantities throughout a working space; communicating operational commands, sensed data, queries, maps, identifying information, marketing and sales information, and other information with, between, or through mobile or stationary devices in the working space; wirelessly supplying electrical power to stationary or mobile devices in the working space; and using stationary or mobile devices as gateways through which to access other devices or networks, such as an intranet or the Internet. Also herein, the term "indoor" (e.g., in "indoor positioning system") is understood to include all relatively local areas or volumes, whether partly or wholly contained inside a building or not, that may be served by a VLC+RF positioning system.

Having described one embodiment of the invention, it will be apparent to those of ordinary skill in the art that other embodiments incorporating the concepts disclosed herein may be used without departing from the spirit and scope of the invention. The described embodiments are to be considered in all respects as only illustrative and not restrictive.

What is claimed is:

1. A lighting device, comprising:
   a radio frequency transceiver configured to transmit signals to and receive signals from other lighting devices in a network;
   a light source for providing illumination;
   a memory device storing data and programming instructions; and
   a processor coupled to the transceiver, the light source and the memory device, wherein the processor, when executing the programming instructions, is configured to perform functions, including functions to:
      output a request message to the other lighting devices in the network, the request message requesting a reply message from each of the other lighting devices in the network;
      receive a reply message from each of the other lighting devices in the network, wherein each received reply message includes a respective lighting device identifier of the respective other lighting device that transmitted the respective reply message;
      retrieve a respective lighting device identifier from each of the received reply messages, generate a list of lighting device identifiers in use in the network; and
      in response to the generated list of lighting device identifiers used in the network, adopt an unused lighting device identifier as the lighting device identifier of the lighting device for use in the network.

2. The lighting device of claim 1, wherein the processor, when executing the programming instructions, is further configured to perform functions, including functions to:
   transmit the adopted lighting device identifier to a network controller node or server.

3. The lighting device of claim 2, wherein the processor, when executing programming instructions, is further configured to perform functions, including functions to:
   in response to transmitting the adopted device identifier, receive from the network controller node or the server configuration data over the network using the adopted device identifier; and
   configure the lighting device according to the configuration data enabling operation of the lighting device in the network.

4. The lighting device of claim 1, wherein the processor, when executing programming instructions, is further configured to perform functions, including functions to:
   determine that the lighting device is a new lighting device to the network;
   in response to the new lighting device determination, replace a previously assigned lighting device identifier with the adopted lighting device identifier.

5. The lighting device of claim 1, wherein the request message is a Bluetooth standard compliant advertising packet for broadcast to all of the other lighting devices of the network via the radio frequency transceiver for communication as a message through the network.

6. The lighting device of claim 1, wherein the processor, when executing the programming instructions, is further configured to output the request message in response to an initial receipt of electrical power.

7. The lighting device of claim 1, wherein the processor, when executing programming instructions, is further configured to perform functions, including functions to:
   determine a location of the lighting device based on signals received from the other lighting devices in the network.

8. The lighting device of claim 1, wherein:
   the radio frequency transceiver is further configured to:
      measure a received signal strength of signals received from at least three lighting devices of the other lighting devices in the network; and
   the processor, when executing the programming instructions, is further configured to:
      obtain the received signal strength measurements of at least three lighting devices of the other lighting devices in the network from the radio frequency transceiver;
      select, based on the obtained received signal strength measurements, device identifiers corresponding to the at least three lighting devices of the other lighting devices;
      provide the selected device identifiers to a back end server; and
      receive an indoor location position determination identifying the position of the lighting device in the indoor location from the back end server based on the selected device identifiers of the at least three lighting devices of the other lighting devices in the network.

9. The lighting device of claim 1, wherein the processor, when executing programming instructions, is further configured to perform functions, including functions to:
   commence operation of the lighting device using the adopted device identifier as a commissioned device with the other lighting devices in the network.

10. A method comprising:
    outputting, by a processor of a lighting device, a request message via a radio frequency transceiver to other lighting devices in a network, the request message requesting a reply message from each of the other lighting devices in the network, the reply message including a respective identifier of each of the other lighting devices;
    receiving a reply message from each of the other lighting devices in the network, wherein each received reply message includes a lighting device identifier of a respective lighting device of the other lighting device that transmitted the respective reply message;
    retrieving a respective lighting device identifier from each of the received reply messages;
    generating a list of device identifiers in use in the network using the retrieved respective lighting device identifiers; and
    in response to the generated list, adopting a device identifier that is unused in the network as a device identifier of the lighting device.

11. The method of claim 10, further comprising:
    transmitting the adopted device identifier to a network controller node or server.

12. The method of claim 11, further comprising:
    in response to transmitting the adopted device identifier, receiving configuration data over the network using the adopted identifier; and
    configuring the lighting device according to the configuration data enabling operation of the lighting device as a commissioned device in the network.

13. The method of claim 10, further comprising:
    determining that the lighting device is a new lighting device in the network;
    in response to the new lighting device determination, replacing a previously assigned device identifier with the adopted lighting device identifier.

14. The method of claim 10, wherein the adopted device identifier is a device identifier different from a default identifier assigned to the lighting device.

15. The method of claim 10, wherein the request message is a Bluetooth standard compliant advertising packet for broadcast to all of the other lighting devices of the network via the radio frequency transceiver for communication as a message through the network.

16. The method of claim 10, wherein outputting the request message is in response to an initial receipt of electrical power.

17. The method of claim 10, further comprising:
    determining a location of the lighting device based on signals received from the other lighting devices in the network.

18. The method of claim 10, further comprising:
    measuring by the radio frequency transceiver a received signal strength of signals received from the other lighting devices in the network;
    obtaining by the processor the received signal strength measurements of the other lighting devices in the network from the radio frequency transceivers;
    selecting, based on a magnitude of the obtained received signal strength measurements, device identifiers corresponding to the other lighting devices that are nearest to the lighting device;
    providing the selected device identifiers to a network controller or a back end server; and
    receiving an indoor location position determination identifying the position of the lighting device in the indoor location from the network controller or the back end server.

19. The method of claim 10, wherein prior to generating the list of lighting device identifiers used in the network, the method further comprising:
    waiting a predetermined time interval, wherein the predetermined time interval is long enough to provide all of the other lighting devices in the network time to respond to transmit a reply message.

20. The method of claim 10, wherein outputting the request message by the lighting device is in response to an initial receipt of electrical power by the lighting device.

* * * * *